US009871430B2

(12) United States Patent
Ohno et al.

(10) Patent No.: US 9,871,430 B2
(45) Date of Patent: Jan. 16, 2018

(54) INSERTION METHOD OF U-SHAPED CONDUCTORS

(71) Applicant: HONDA MOTOR CO., LTD., Tokyo (JP)

(72) Inventors: Kenichi Ohno, Tochigi (JP); Yutaka Matsumoto, Tochigi (JP); Shinichi Kawano, Tochigi (JP); Daisuke Ueno, Tochigi (JP)

(73) Assignee: HONDA MOTOR CO., LTD, Tokyo (JP)

( * ) Notice: Subject to any disclaimer, the term of this patent is extended or adjusted under 35 U.S.C. 154(b) by 248 days.

(21) Appl. No.: 14/488,363

(22) Filed: Sep. 17, 2014

(65) Prior Publication Data
US 2015/0074985 A1   Mar. 19, 2015

(30) Foreign Application Priority Data

Sep. 18, 2013   (JP) .................................. 2013-193298

(51) Int. Cl.
*H02K 15/00* (2006.01)
*H02K 15/06* (2006.01)
*H02K 15/04* (2006.01)

(52) U.S. Cl.
CPC ....... *H02K 15/064* (2013.01); *H02K 15/0414* (2013.01); *Y10T 29/49009* (2015.01); *Y10T 29/532* (2015.01)

(58) Field of Classification Search
CPC .... H02K 15/0428; H02K 3/12; H02K 15/064; H02K 15/0056; H02K 15/085; Y10T 29/49009; Y10T 29/49012; Y10T 29/49073
USPC ......... 29/596, 597, 598, 605, 606, 732, 745, 29/840
See application file for complete search history.

(56) References Cited

U.S. PATENT DOCUMENTS

| 6,862,796 B2* | 3/2005 | Kato .................. H02K 15/0037 242/599.1 |
| 6,910,257 B1* | 6/2005 | Gorohata ........... H02K 15/0428 242/599.1 |
| 2011/0099797 A1 | 5/2011 | Mishina et al. | |

FOREIGN PATENT DOCUMENTS

| JP | 2011-097791 | 5/2011 |
| JP | 2013-102569 | 5/2013 |
| WO | 2013/153594 | 10/2013 |

OTHER PUBLICATIONS

Japanese Office Action dated Jan. 27, 2015, Application No. 2013-193298, 2 pages.

* cited by examiner

*Primary Examiner* — Thiem Phan
(74) *Attorney, Agent, or Firm* — Rankin, Hill & Clark LLP

(57) ABSTRACT

Provided are an insertion method and an insertion apparatus for efficiently and reliably inserting a plurality of coil elements aligned in a ring shape into respective slots of a stator core. In an insertion method of inserting, the insertion method includes a coil element alignment process S3 of forming an assembly body 50 by assembling the plurality of coil elements 40 in a ring shape in the state where the turn portions 42 alternately overlap each other, a supporting process S42 of supporting the assembly body 50 by using the turn portions 42, and an insertion process S45 of allowing the assembly body 50 and the stator core 60 to be close to each other and inserting the leg portions 41 of the coil elements 40 of the assembly body 50 into the slots 61.

4 Claims, 39 Drawing Sheets

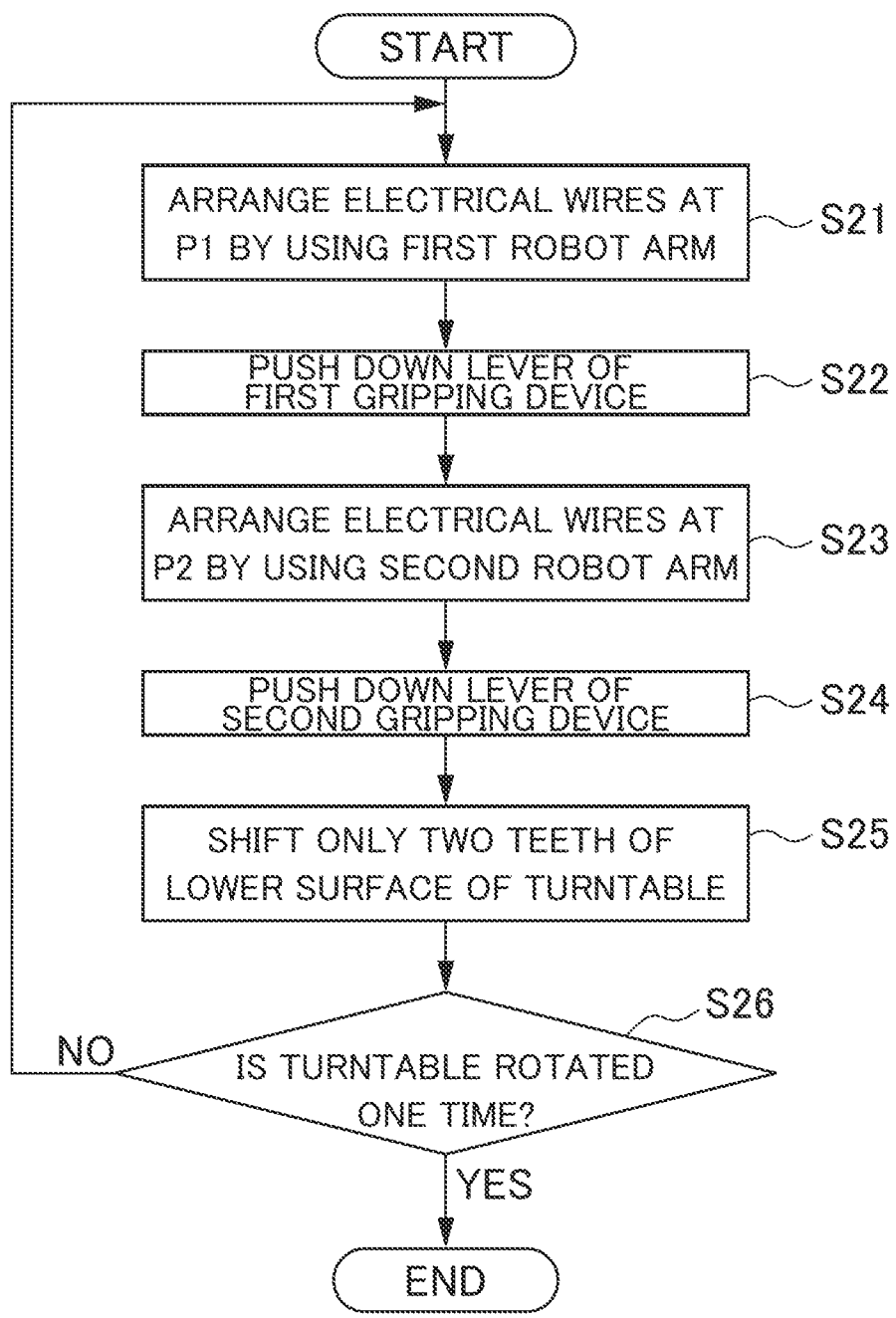

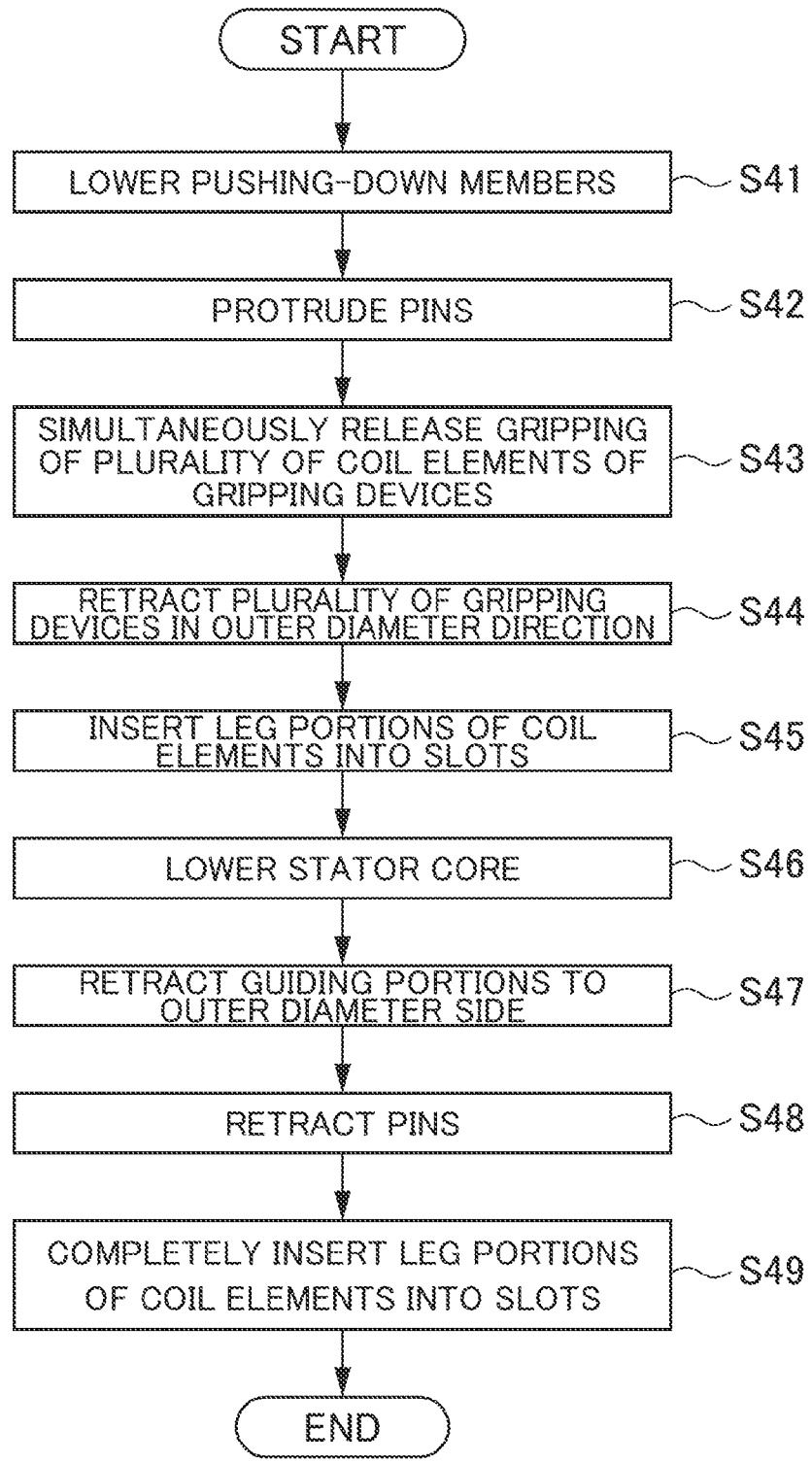

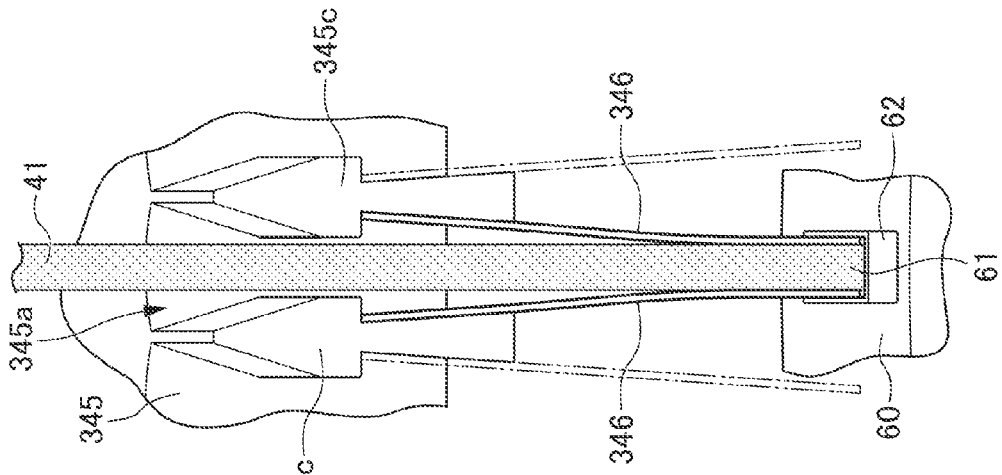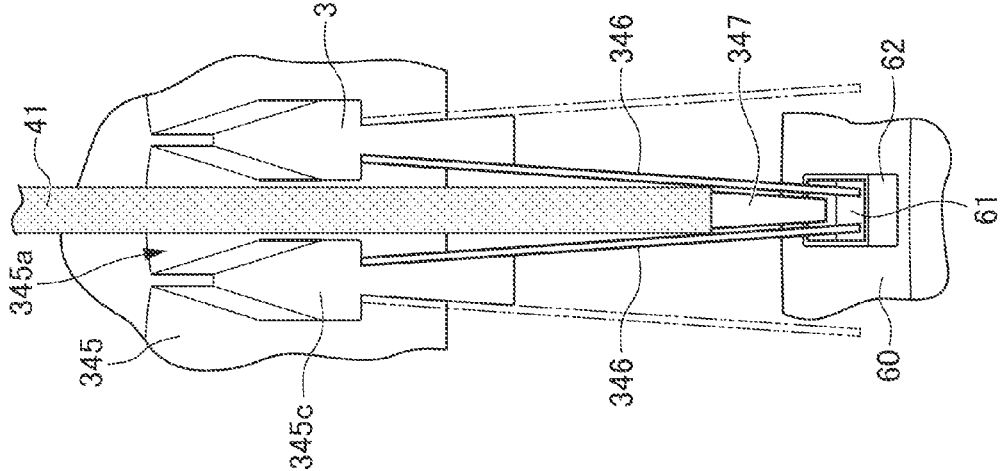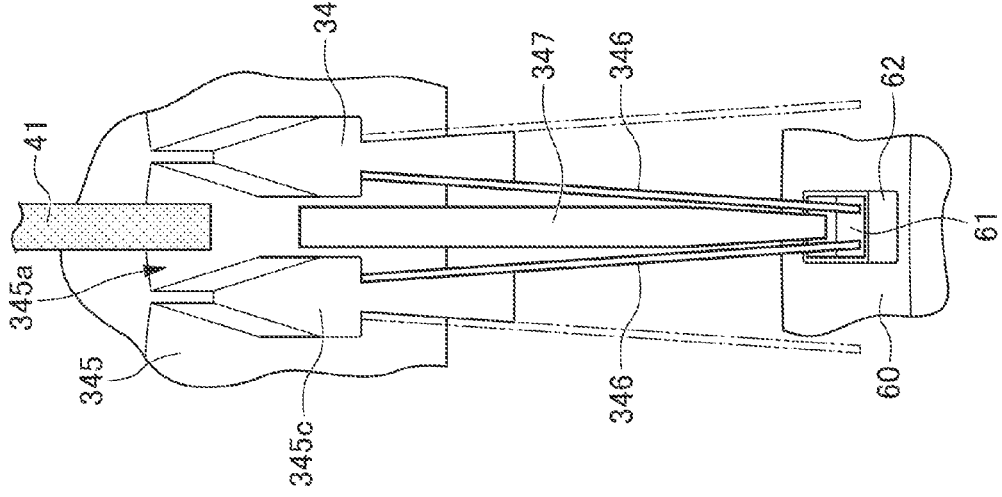

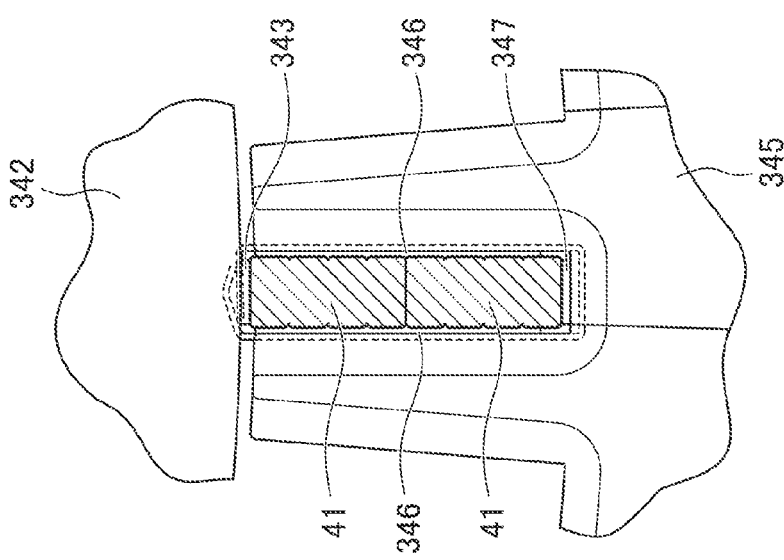
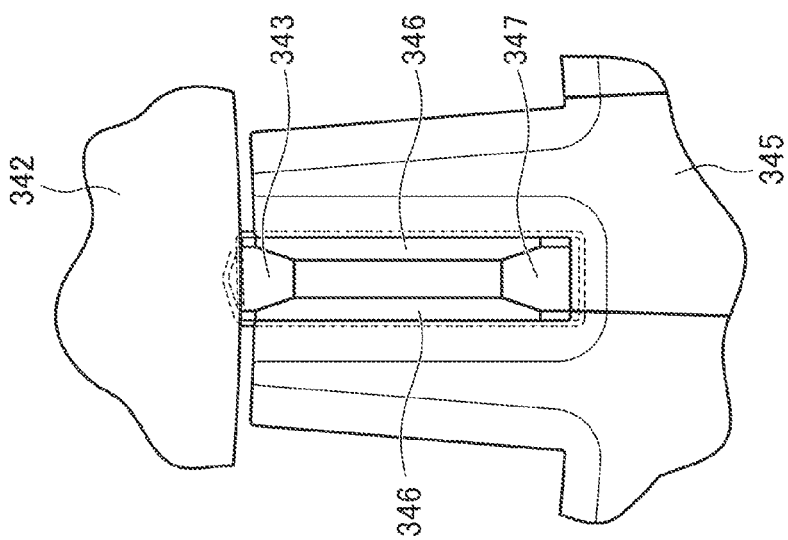
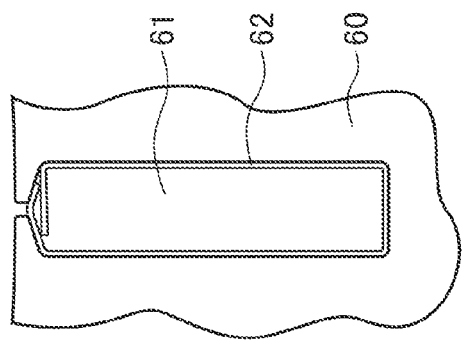

INSERTION METHOD OF U-SHAPED CONDUCTORS

This application is based on and claims the benefit of priority from Japanese Patent Application No. 2013-193298, filed on 18 Sep. 2013, the content of which is incorporated herein by reference.

BACKGROUND OF THE INVENTION

Field of the Invention

The present invention relates to an insertion method and an insertion apparatus. More particularly, the present invention relates to an insertion method and an insertion apparatus for inserting substantially U-shaped electrical conductors, each of which is constructed with a turn portion installed at a substantially apex portion and linearly-shaped leg portions installed at two ends of the turn portion, into slots arranged in a ring shape in a stator core.

Related Art

For example, stator coils of a rotary electric machine are formed as follows. First, a plurality of electrical conductors molded in a substantially U shape is aligned repeatedly in a ring shape in the circumferential direction. Next, leg portions of each of the electrical conductors aligned in a ring shape are inserted into slots arranged in a ring shape in a stator core. Next, the ends of the adjacent leg portions are connected to each other. Accordingly, the stator coils of the rotary electric machine are formed. As a technique for inserting the leg portions of each of the electrical conductors aligned in a ring shape into the slots arranged in a ring shape in the stator core, there is disclosed an insertion apparatus for inserting a plurality of electrical conductors into slots of a stator core, which is previously placed, by placing the plurality of substantially U-shaped electrical conductors around a cylindrical jig, and after that, by raising the jig (for example, refer to Patent Document 1).

[Patent Document 1] Japanese Unexamined Patent Application, Publication No. 2011-97791

SUMMARY OF THE INVENTION

On the other hand, a technique is considered of inserting a plurality of electrical conductors aligned in a ring shape into respective slots of a stator core by gripping the electrical conductors with a plurality of gripping devices and lowering the electrical conductors. In this case, if the grip on the leg portions of the electrical conductors with the gripping devices is released, there is a concern that the electrical conductors may fall. In addition, if the grip on the leg portions of the electrical conductors with the gripping devices is not released, there is a problem that the electrical conductors may not be inserted into the slots.

The present invention was made to solve the above-described problems, and an object of the invention is to provide an insertion method and an insertion apparatus for efficiently and reliably inserting a plurality of electrical conductors aligned in a ring shape into the respective slots of a stator core.

(1) An insertion method of inserting substantially U-shaped electrical conductors (for example, coil elements 40 to be described below), each of which is constructed with a turn portion (for example, turn portion 42 to be described below) installed at a substantially apex portion and linearly shaped leg portions (for example, leg portions 41 to be described below) installed at two ends of the turn portion, into slots (for example, slots 61 to be described below) aligned in a ring shape in a core (for example, stator core 60 to be described below), the insertion method including: an assembling process (for example, S3 to be described below) of forming an assembly body (for example, assembly body 50 to be described below) by assembling the plurality of electrical conductors in a ring shape in the state where the turn portions alternately overlap each other; a supporting process (for example, S42 to be described below) of supporting the assembly body by using the turn portions; and an insertion process (for example, S45 to be described below) of allowing the assembly body and the core to be close to each other and inserting the leg portions of the electrical conductors of the assembly body into the slots.

According to the invention of (1), in the assembling process, the assembly body is formed by assembling the plurality of electrical conductors in a ring shape in the state where the turn portions alternately overlap each other, in the supporting process, the assembly body is supported by using the turn portions, and in the insertion process, the assembly body and the core are allowed to be close to each other, and then, the leg portions of the electrical conductors of the assembly body are inserted into the slots.

According to this, in the supporting process, the assembly body can be supported by using the turn portions, and after that, in the insertion process, the assembly body and the core can be allowed to be close to each other so that the leg portions of the electrical conductors of the assembly body can be inserted into the slots. In this manner, in the supporting process, the assembly body can be supported by using the turn portions so that the leg portions of the electrical conductors of the assembly body are in a free state.

Accordingly, it is possible to efficiently and reliably insert the plurality of electrical conductors aligned in a ring shape into the respective slots of the core.

(2) The insertion method described in (1), in which in the supporting process, while pressing members (for example, pushing-down members 311 to be described below) are in contact with the turn portions, pins (for example, pins 322 to be described below) are inserted so that the turn portions are supported.

According to the invention of (2), in the supporting process, while the pressing members are in contact with the turn portions, the pins are inserted so that the turn portions are supported. According to this, in the supporting process, the assembly body can be supported by supporting the turn portions so that the leg portions of the electrical conductors of the assembly body are in the free state.

(3) The insertion method described in (2), in which in the supporting process, in the state where the pressing members are in contact with the turn portions, the pins are inserted.

According to the invention of (3), in the supporting process, in the state where the pressing members are in contact with the turn portions, the pins are inserted so that the pins of which distances relative to the pressing members are adjusted can be optimally inserted into the turn portions, and the shape of the assembly body can be maintained at the time of insertion of the pins.

(4) The insertion method described in any one of (1) to (3), in which in the insertion process, insertion is performed while outer circumferential portions of the turn portions are supported.

According to the invention of (4), in the insertion process, the insertion is performed while the outer circumferential sides of the turn portions are supported so that the shape of the assembly body can be maintained even though resistance occurs at the time of insertion.

(5) An insertion apparatus (for example, stator manufacturing apparatus 1 to be described below) which inserts substantially U-shaped electrical conductors (for example, the coil elements 40 to be described below), each of which is constructed with a turn portion (for example, the turn portion 42 to be described below) installed at a substantially apex portion and linearly shaped leg portions (for example, the leg portions 41 to be described below) installed at two ends of the turn portion, into slots (for example, the slots 61 to be described below) installed in a ring shape in a core, the insertion apparatus including: an assembling mechanism (for example, gripping device 230 to be described below) which forms an assembly body (for example, the assembly body 50 to be described below) by assembling the plurality of electrical conductors in a ring shape in the state where the turn portions alternately overlap each other; a supporting mechanism (for example, pin protruding mechanism 320 to be described below) which supports the assembly body by using the turn portions; and a pressing mechanism (for example, coil element pushing-down mechanism 310 to be described below) which allows the assembly body supported by the supporting mechanism and the core to be close to each other.

According to the invention of (5), the same functions and effects as those of the invention of (1) can be obtained.

(6) The insertion apparatus described in (5), in which the pressing mechanism includes pressing members (for example, the pushing-down members 311 to be described below) which are in contact with the turn portions, and the supporting mechanism includes pins (for example, the pins 322 to be described below) which are inserted into the turn portions in the state where the pressing members are in contact.

According to the invention of (6), the same functions and effects as those of the invention of (3) can be obtained.

(7) The insertion apparatus described in (6), in which outer circumference support portions (for example, annular projections 311a to be described below) which support the outer circumferential sides of the turn portions are arranged in outer circumferential portions of the pressing members.

According to the invention of (7), the same functions and effects as those of the invention of (4) can be obtained.

According to the present invention, it is possible to provide an insertion method and an insertion apparatus for efficiently and reliably inserting a plurality of electrical conductors aligned in a ring shape into respective slots of a stator core.

BRIEF DESCRIPTION OF THE DRAWINGS

FIG. 5A is a partially transparent top view, and FIG. 5B is a partially transparent side view.

FIG. 6A is a partially transparent top view, and FIG. 6B is a partially transparent side view.

FIG. 17 is a flowchart illustrating operations of a coil element arrangement process according to the embodiment.

FIG. 28 is a flowchart illustrating operations of a coil element insertion process according to the embodiment.

FIGS. 34A to 34C are diagrams for explaining the operations of a guiding plate and a pair of the first spreader plates and the second spreader plate according to the embodiment.

FIGS. 35A to 35C are diagrams for explaining the operations of a guiding plate and a pair of the first spreader plates and the second spreader plate according to the embodiment.

DETAILED DESCRIPTION OF THE INVENTION

Hereinafter, embodiments of the present invention will be described in detail with reference to the drawings.

Configuration of Stator Manufacturing Apparatus

Figure 1:
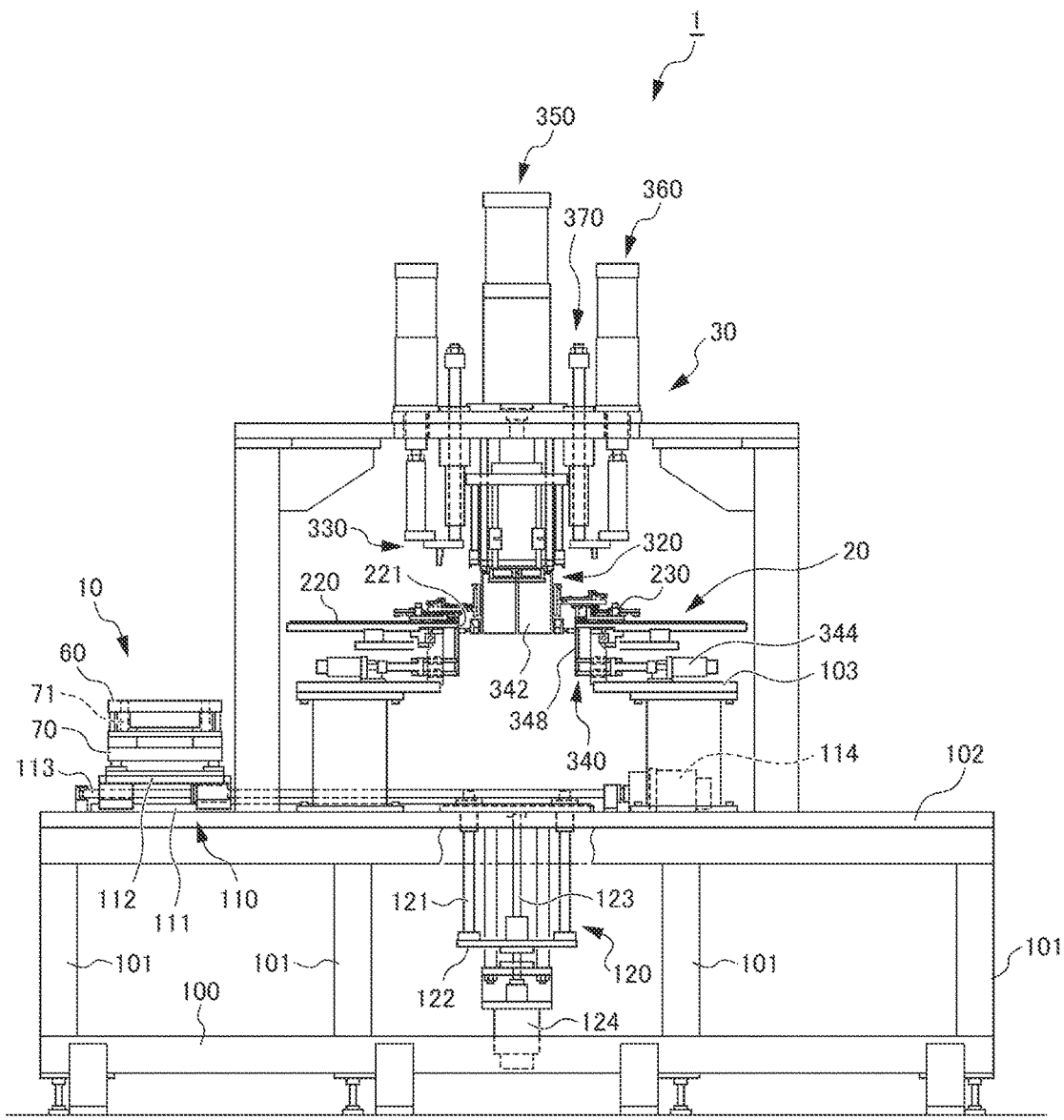
FIG. 1 is a front view illustrating a stator manufacturing apparatus according to an embodiment of the present invention.
Figure 2:
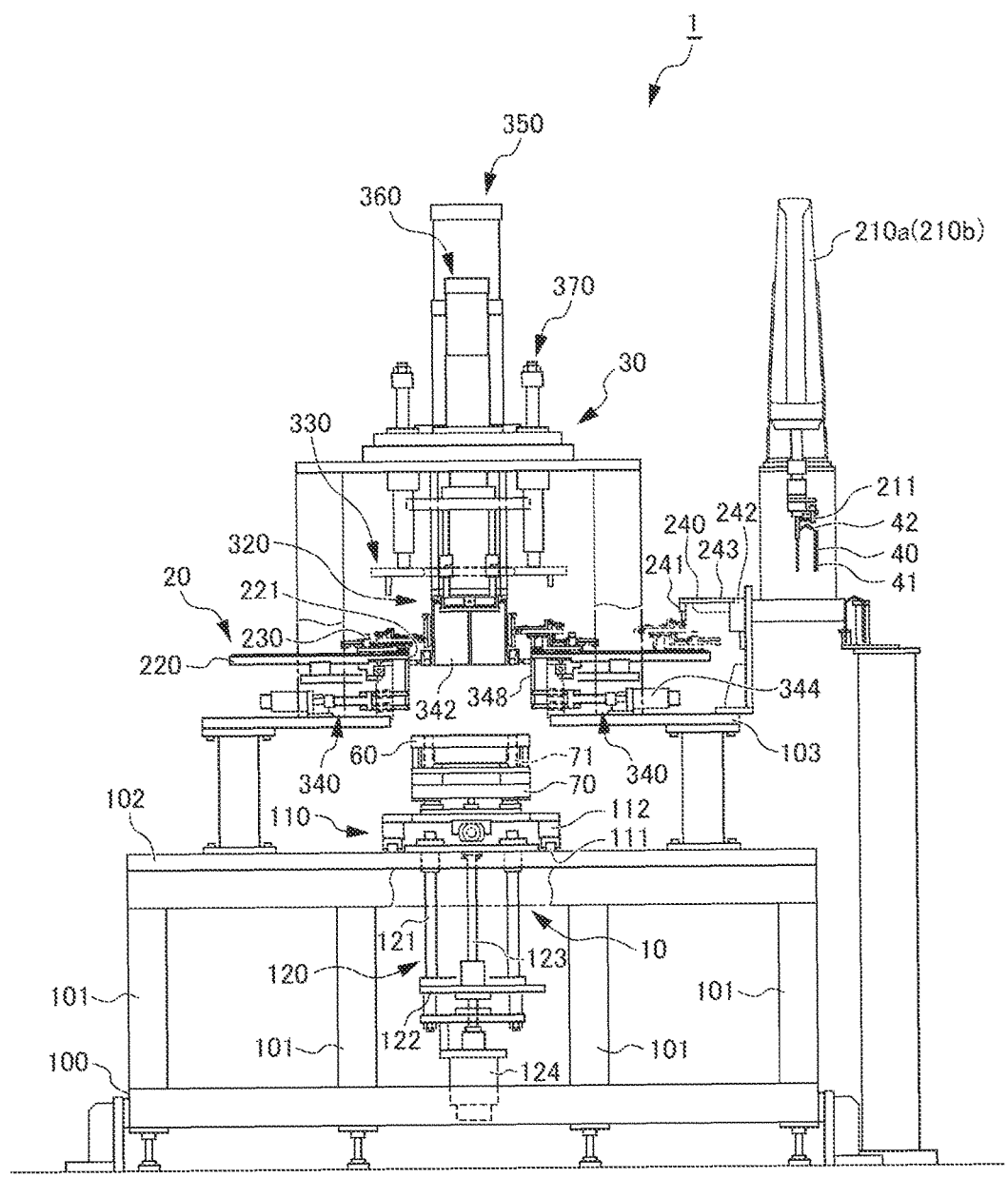
FIG. 2 is a side view illustrating the stator manufacturing apparatus according to the embodiment.
Figure 3:
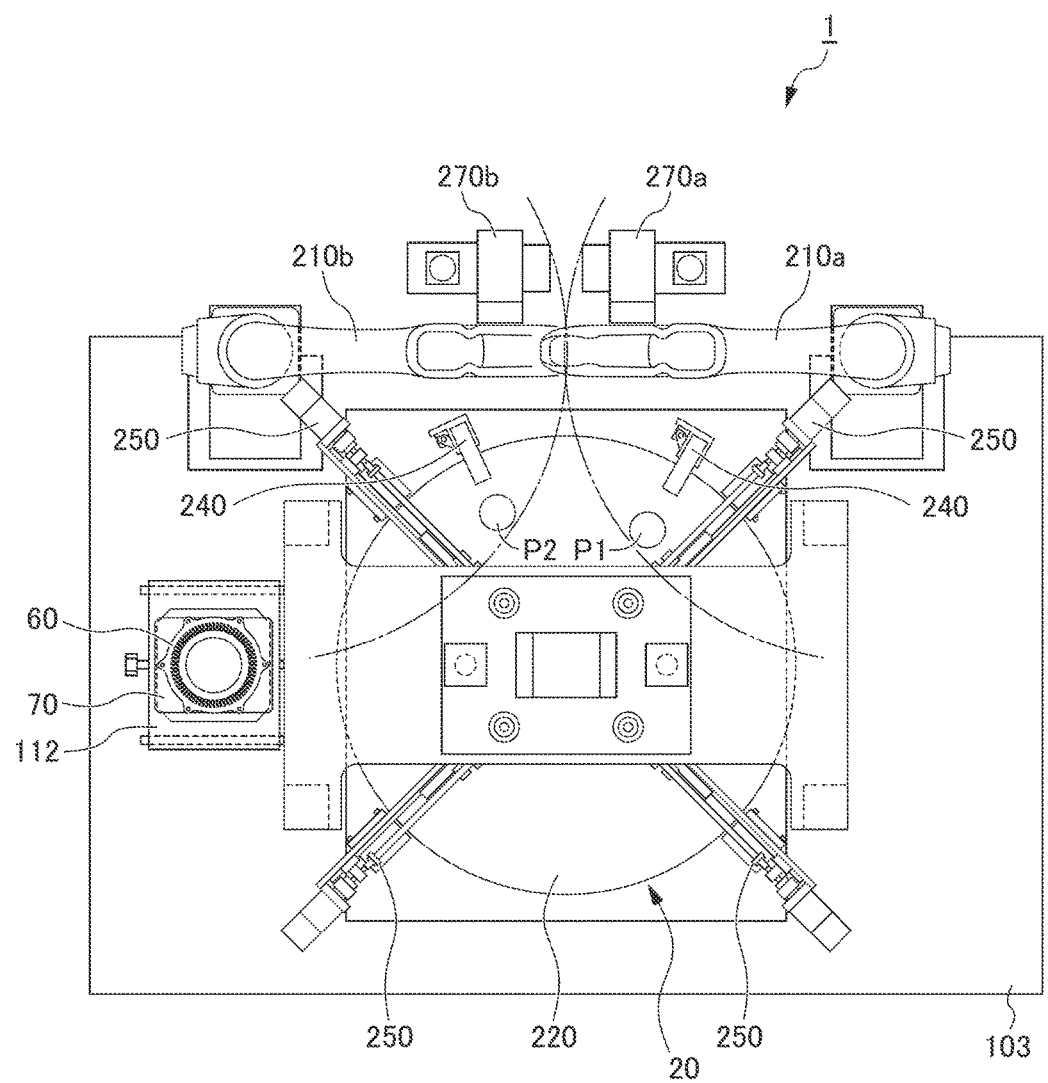
FIG. 3 is a top view illustrating the stator manufacturing apparatus according to the embodiment.

FIG. 1 is a front view illustrating a stator manufacturing apparatus 1 according to an embodiment. FIG. 2 is a side view illustrating the stator manufacturing apparatus 1 according to the embodiment. FIG. 3 is a top view illustrating the stator manufacturing apparatus 1 according to the embodiment.

The stator manufacturing apparatus 1 includes a stator core transport device 10, a coil element alignment device 20, and a coil element insertion device 30.

The stator manufacturing apparatus 1 manufactures a stator by molding substantially U-shaped coil elements 40 from linearly-shaped electrical conductors on a rear surface of the apparatus, arranging the plurality of molded coil elements 40 in a ring shape by using the coil element alignment device 20, forming an assembly body 50 by assembling the plurality of coil elements 40 arranged in a ring shape by moving the coil elements 40 in the direction of reducing the diameter of the ring shape by using the coil element alignment device 20, and inserting leg portions 41 of the coil elements 40 of the formed assembly body 50 into respective slots 61 of a stator core 60 by using the coil element insertion device 30.

Herein, the coil elements 40 for a rotary electric machine where stator coils are formed by inserting the coil elements 40 into the respective slots 61 of the stator core 60 of the rotary electric machine and the joining end portions thereof to each other are used as the coil elements 40 as the electrical conductors.

In addition, the stator core 60 includes the plurality of slots 61 aligned in a ring shape. An insulating sheet 62 is disposed to be adhered to the inner wall of each of the slots 61. The insulating sheet 62 avoids contact between the coil elements 40 and the stator core 60.

In the stator manufacturing apparatus 1, the stator core transport device 10 is arranged on a base 100, the coil element alignment device 20 is arranged above the stator core transport device 10, and the coil element insertion device 30 is arranged at the central portion of the coil element alignment device 20.

The base 100 includes a plurality of pillar-shaped base leg portions 101 and a rectangular flat portion 102 supported by the base leg portions 101. The flat portion 102 is positioned at the height of the operator's waist.

Next, each device will be described.

Configuration of Stator Core Transport Device 10

The stator core transport device 10 transports a fixed jig 70 of the stator core 60 to the coil element insertion device 30 installed at the center of the stator manufacturing apparatus 1.

The stator core transport device 10 includes a horizontal direction transport mechanism 110 and a lift mechanism 120.

The horizontal direction transport mechanism 110 is installed to be extended in the range from the front-left-side end portion of the stator manufacturing apparatus 1 to the center where the coil element insertion device 30 is positioned on the flat portion 102 of the base 100.

The horizontal direction transport mechanism 110 includes slide rails 111 which are installed from the front-left-side end portion of the stator manufacturing apparatus 1 to the center where the coil element insertion device 30 is positioned on the flat portion 102 of the base 100, a transport mount 112 which has a rectangular hole at the center thereof and which is moved while engaged with the slide rails 111 with the jig 70 to which the stator core 60 is fixed being mounted thereon, a ball screw mechanism 113 which allows the transport mount 112 to be engaged with the slide rails 111 and moves the transport mount 112 in the horizontal direction, and a servo motor 114 which is arranged to be closer to the front right side of the stator manufacturing apparatus 1 than the slide rails 111 to rotate the ball screw mechanism 113.

After the operator mounts the jig 70 to which the stator core 60 is fixed on the transport mount 112 at the front-left-side end portion of the stator manufacturing apparatus 1, the horizontal direction transport mechanism 110 allows the transport mount 112 driven by the servo motor 114 to be engaged with the slide rails 111 and transports the transport mount 112 to the center of the stator manufacturing apparatus 1. In addition, after the plurality of coil elements 40 is inserted into the stator core 60 as fixed to the jig 70, the horizontal direction transport mechanism 110 transports the transport mount 112 on which the jig 70 is mounted from the center to the front-left-side end portion of the stator manufacturing apparatus 1.

Herein, the jig 70 which fixes the stator core 60 is maintained in the state where the stator core 60 is lifted up to a support wall 71 having a vertical hole. According to this, when the leg portions 41 of the coil elements 40 of the assembly body 50 are inserted into the respective slots 61, the stator core 60 fixed to the jig 70 can be maintained in the state where the leg portions are suspended to the vertical holes without the tips of the leg portions 41 interfering with the jig 70.

The lift mechanism 120 is installed to be extended from the center of the stator manufacturing apparatus 1 in the up/down direction of the flat portion 102 of the base.

The lift mechanism 120 includes four rods 121 which penetrate through four corners of the hole formed in the transport mount 112 and push the jig 70 to which the stator core 60 is fixed upward from the transport mount 112 of the horizontal direction transport mechanism 110, a fixing plate 122 which fixes the lower ends of the four rods 121 under the flat portion 102 of the base 100, a ball screw mechanism 123 which moves the fixing plate 122 in the up/down direction, and a servo motor 124 which rotates the ball screw mechanism 123.

The lift mechanism 120 raises the jig 70 to which the stator core 60 is fixed on the transport mount 112 transported at the center of the stator manufacturing apparatus 1 by the horizontal direction transport mechanism 110 upward to the coil element insertion device 30 installed at the center of the stator manufacturing apparatus 1 by the four rods 121 according to the movement of the ball screw mechanism 123 driven by the servo motor 124. In addition, the lift mechanism 120 lowers the four rods 121 so that the jig 70, to which the stator core 60 inserted with a plurality of the coil elements 40 is fixed, is mounted on the transport mount 112.

Configuration of Coil Element Alignment Device 20

The coil element alignment device 20 forms the assembly body 50 by aligning the plurality of coil elements 40 in the circumferential direction to arrange the coil elements 40 in a ring shape with respect to the central axis C1 and, after that, by moving and assembling the plurality of coil elements 40 in the direction of reducing the diameter of the ring shape.

The coil element alignment device 20 includes two robot arms 210a and 210b, a turntable 220, a plurality of gripping devices 230, and two switch devices 240. In addition, the coil element alignment device 20 includes four driving mechanisms 250 and a table driving device 260.

As illustrated in FIGS. 2 and 3, the two robot arms 210a and 210b are articulated arms arranged at the rear surface side of the stator manufacturing apparatus 1 and have hands 211 for gripping the coil elements 40 at the distal ends thereof.

The two robot arms 210a and 210b grip the coil elements 40.

Herein, the coil element 40 is a substantially U-shaped coil element where an S-shaped portion is molded in a chevron shape so that a substantially apex portion thereof is installed as a turn portion 42 and the linearly shaped leg portions 41 are installed at the two ends of the turn portion 42 by bending and twisting a substantially central portion of the S-shaped portion constructed with four linear rectangular coil wire materials. The coil elements 40 are molded from the two coil molding devices 270a and 270b installed in the rear portion of the stator manufacturing apparatus 1.

The two robot arms 210a and 210b grip the coil elements 40 from the two coil molding devices 270a and 270b and supply and arrange the coil elements 40 to the two arrangement points P1 and P2 on the turntable 220.

The turntable 220 integrally rotates the plurality of gripping devices 230 arranged in a ring shape.

The turntable 220 has a shape of a disc having a circular hole 221 at the center thereof.

The circular hole 221 at the center of the turntable 220 is defined to correspond to the diameter of the stator core 60, for example, to have a diameter slightly larger than the diameter of the stator core 60. The stator core 60 is installed, and the coil element insertion device 30 for inserting the leg portions 41 of the coil elements 40 of the assembly body 50 formed by assembling the plurality of coil elements 40 aligned by the coil element alignment device 20 into the respective slots 61 of the stator core 60 is arranged under the circular hole 221. According to this, the leg portions 41 of the coil elements 40 of the assembly body 50 aligned in a ring shape by the coil element alignment device 20 are inserted into the respective slots 61 of the stator core 60 by the coil element insertion device 30.

Figure 4A:
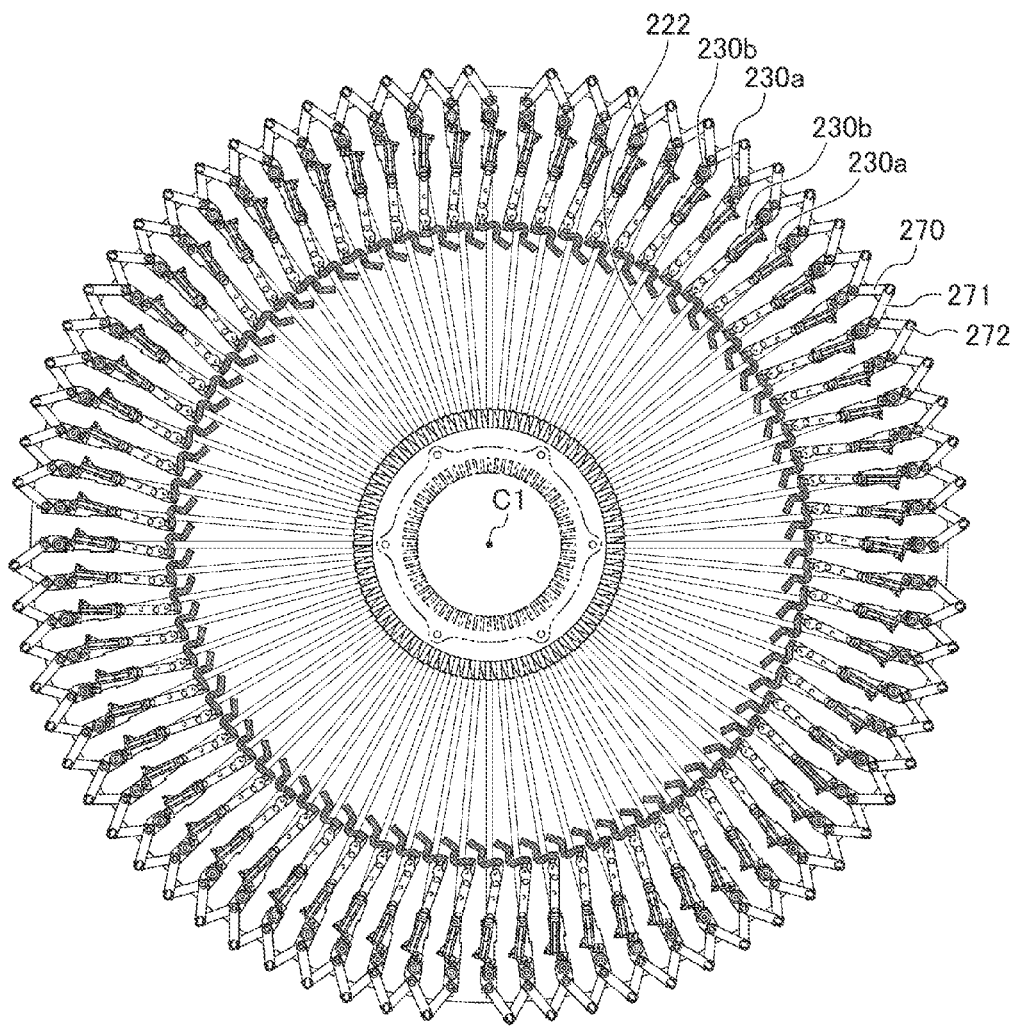
FIGS. 4A and 4B are diagrams illustrating a plurality of gripping devices according to the embodiment.
Figure 4B:
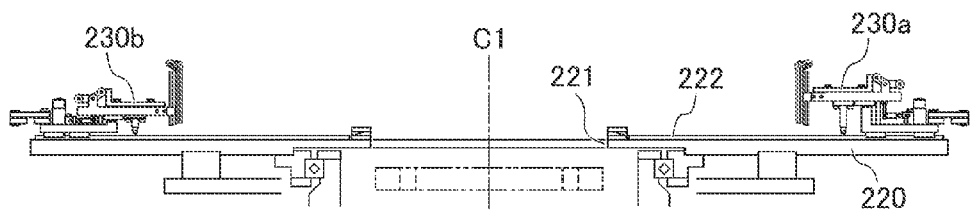

FIGS. 4A and 4B are diagrams illustrating the plurality of gripping devices 230 according to the embodiment.

The plurality of gripping devices 230 holds lower portions of the one-side leg portions 41 of the coil elements 40 arranged by the two robot arms 210a and 210b. As illustrated in FIG. 4A, the plurality of gripping devices 230 is arranged in a ring shape on the turntable 220. More specifically, the plurality of gripping devices 230 is engaged with the respective slide rails 222 installed to be extended radially on the turntable 220 to be movable in the radial direction by the driving forces of the four driving mechanisms 250 (refer to FIG. 3).

As illustrated in FIG. 4B, the plurality of gripping devices 230 is configured so that the heights of the adjacent gripping devices 230 are arranged to be alternately shifted in the axial direction (height direction) of the central axis C1 of the circular ring. More specifically, the plurality of gripping devices 230 is arranged to be alternately shifted in the axial direction of the central axis C1 in order for the gripping devices 230 not to interfere with each other when the plurality of gripping devices 230 is advanced and assembled in the inner diameter direction by the slide rails 222. In FIG. 4B, a first gripping device 230a is illustrated in the right side of the figure, and a second gripping device 230b is illustrated in the left side of the figure.

The plurality of gripping devices 230 includes two types of gripping device, that is, the first and second gripping devices 230a and 230b which are moved by the driving forces exerted from the driving mechanisms 250 and of which heights are different from each other in the axial direction of the central axis C1.

The first gripping device 230a is high, the second gripping device 230b is lower than the first gripping device 230a, and the first and second gripping devices 230a and 230b are arranged to be alternately aligned in the circumferential direction.

As illustrated in FIG. 3, the first gripping device 230a receives the coil element 40 from the first robot arm 210a at the arrangement point P1 of the front right side of the stator manufacturing apparatus 1. The second gripping device 230b receives the coil element 40 from the second robot arm 210b at the arrangement point P2 of the front left side of the stator manufacturing apparatus 1.

As illustrated in FIG. 4A, with respect to the plurality of gripping devices 230, the adjacent gripping devices 230 are linked with link mechanisms 270. With the link mechanisms 270, the second gripping device 230b adjacent to the first gripping device 230a is linked with the first gripping device 230a, and the second gripping device 230b linked with the first gripping device 230a is linked with the adjacent first gripping device 230a. In this manner, the plurality of adjacent gripping devices 230 is sequentially linked so that the gripping devices 230 are driven according to the driving of the driving mechanisms 250.

Figure 5A:
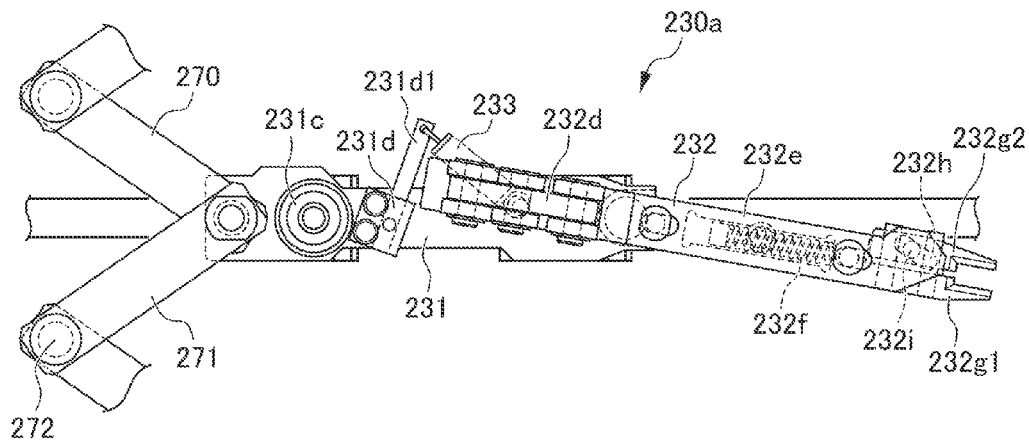
FIGS. 5A and 5B are diagrams illustrating a first gripping device according to the embodiment.
Figure 5B:
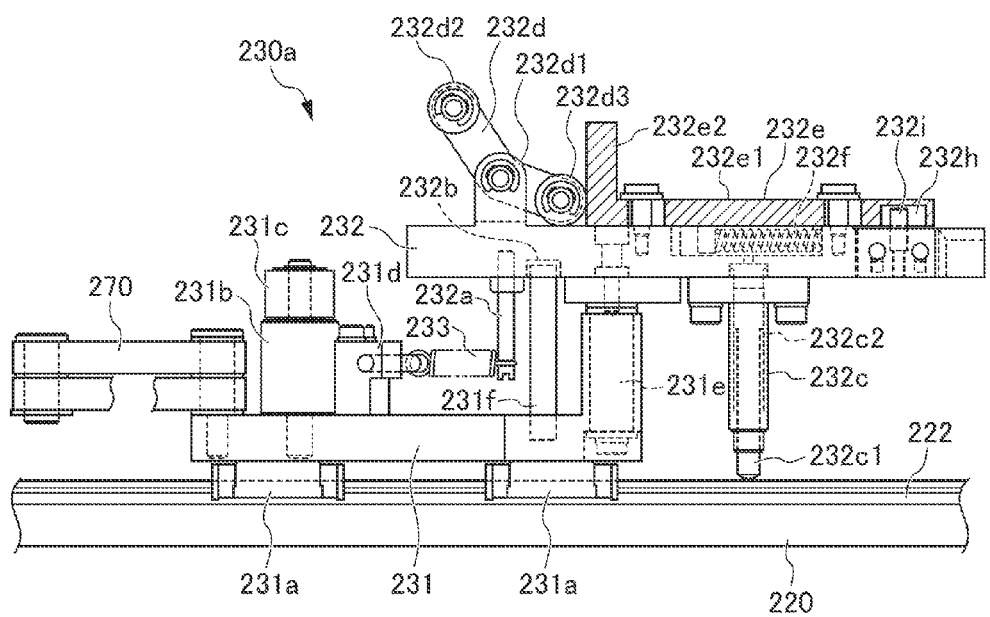
Figure 6A:
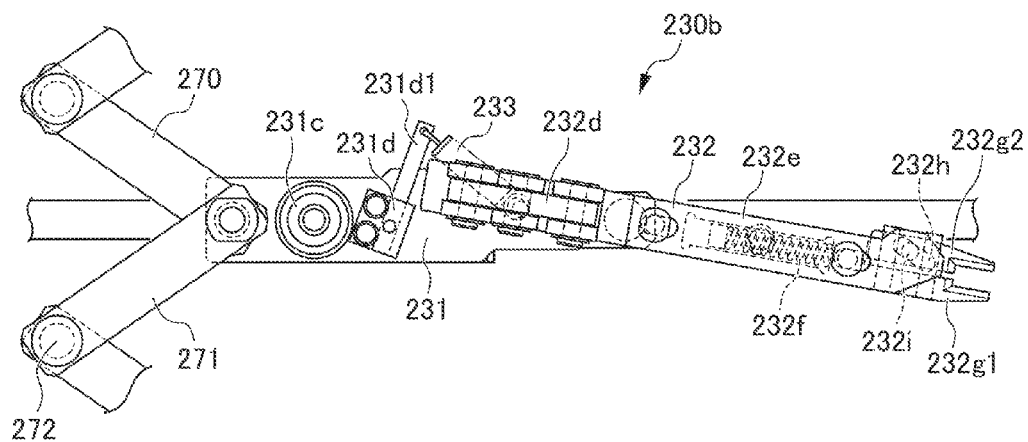
FIGS. 6A and 6B are diagrams illustrating a second gripping device according to the embodiment.
Figure 6B:
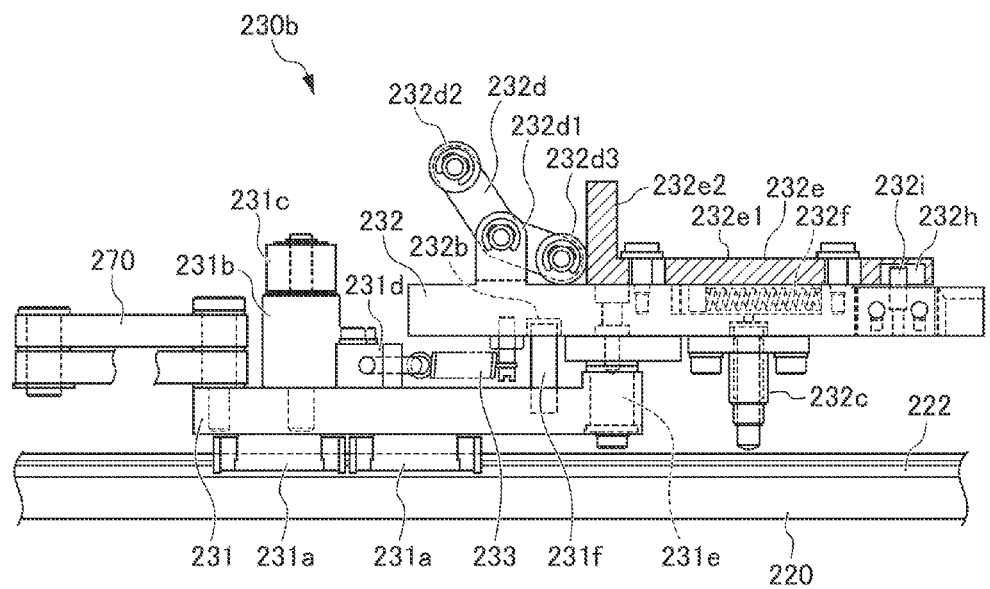

FIGS. 5A and 5B are diagrams illustrating the first gripping device 230a according to the embodiment, FIG. 5A is a partially transparent top view, and FIG. 5B is a partially transparent side view. In addition, FIGS. 6A and 6B are diagrams illustrating the second gripping device 230b according to the embodiment, FIG. 6A is a partially transparent top view, and FIG. 6B is a partially transparent side view.

Herein, the first and second gripping devices 230a and 230b constituting the plurality of gripping devices 230 have the same configuration and have only the difference in that the heights in the axial direction of the central axis C1 are different. Therefore, the first gripping device 230a is described as an example with reference to FIGS. 5A and 5B; and regarding the second gripping device 230b illustrated in FIGS. 5A and 5B, the same components are denoted by the same reference numerals and the description thereof is not provided.

As illustrated in FIGS. 5A and 5B, the first gripping device 230a includes a main body 231 attached to the link mechanism 270 and an upper branch portion 232 where a pair of claws 232g1 and 232g2 attached to the distal end side of the main body 231 are installed.

The main body 231 is a bar-shaped member having a rectangular cross section, and two slide guides 231a are installed which are engaged with the slide rails 222 at the bottom surface to be aligned in the radial direction in a shape of a recess, a weight portion 231b which is installed on the base-end-side upper surface to match the weight balance of the gripping devices 230a, a roller 231c which is installed at the upper end portion of the weight portion 231b, a spring post 231d which is more adjacent to the distal end side than the weight portion 231b, a rotation shaft 231e parallel to the ring-shaped central axis C1 extended upward from the distal end side upper surface, and a bush 231f which is arranged between the spring post 231d and the rotation shaft 231e to define the movable range of the upper branch portion 232.

The spring post 231d includes a fixing piece 231d1 which is extended to the left side or to the distal end direction toward the central axis C1 to fix the spring 233.

The upper branch portion 232 is attached to the upper end of the rotation shaft 231e and is extended to the distal end side. Installed in the upper branch portion 232 are a spring post 232a which is arranged at the base end side, a hole 232b to which the bush 231f is loosely fitted at the lower surface and which has a diameter larger than that of the bush 231f, a pin 232c which is extended downward to be slidable in the up/down direction on the distal-end-side lower surface and is positioned on the moving path of the gripping devices 230a, a lever 232d which is rotatably retained on the base-end-side upper surface and is bent at an obtuse angle, an L-shaped member 232e which is retained on the distal end side upper surface of the lever 232d capable of being advanced or withdrawn, a spring 232f which biases the L-shaped member 232e to the base end side, and a pair of claws 232g1 and 232g2.

A spring 233 is interposed between the main body 231 and the upper branch portion 232. The spring 233 is retained between the spring post 232a of the upper branch portion 232 and the spring post 231d of the main body 231 and biases the upper branch portion 232 to the right side toward the central axis C1 so that the gripped coil element 40 is biased to the direction opposite to the direction where the coil element 40 is to be rotated by a predetermined angle around the rotation shaft 231e parallel to the ring-shaped central axis C1. According to this, the upper branch portion 232 is inclined by 10° to the right toward the central axis C1 around the rotation shaft 231e parallel to the ring-shaped central axis C1 (refer to FIGS. 24A and 24B).

The pin 232c includes a shaft portion 232c1 which is slidable in the up/down direction, a holder 232c2 which surrounds the outer circumference of the shaft portion 232c1 and of which the upper end is fixed to the upper branch portion 232, and a spring (not shown) which biases the shaft portion 232c1 downward.

The lever 232d is attached to the upper branch portion 232 at the central portion 232d1 bent at an obtuse angle through a shaft fixed to two protrusion pieces which are installed to be separated from each other in the circumferential direction of the upper branch portion 232. The lever 232d includes rotatable rollers at a base end portion 232d2 and a distal end portion 232d3. With respect to the lever 232d, when the distal end portion 232d3 is raised to be higher than the central portion 232d1, the distal end portion 232d3 recedes to the base end side; and when the distal end portion 232d3 is lowered to be lower than the central portion 232d1, the distal end portion 232d3 is advanced to the distal end side.

The L-shaped member 232e includes a main piece 232e1 which is arranged on the upper surface of the upper branch portion 232 and is moved along the upper branch portion 232 in the radial direction, and a short piece 232e2 which protrudes upward from the base end portion of the main piece 232e1 and receives the function of the lever 232d transmitted from the switch device 240 to move the main piece 232e1. The main piece 232e1 has two holes through which the bolts fixed to the upper branch portion 232 penetrate and which define the movable range of the main piece 232e1 in the radial direction. A spring post which protrudes downward and is arranged inside the recess portion of the upper branch portion 232 is installed between the two holes of the main piece 232e1. According to this, the spring 232f attracts the spring post to the base end side so that the L-shaped member 232e is biased to the base end side. A long hole 232h which is inclined to the right toward the central axis C1 from the base end side to the distal end side is installed on the lower surface of the distal end portion of the main piece 232e1.

A pair of claws 232g1 and 232g2 includes a fixed claw 232g1 integrated with the upper branch portion 232 and a movable claw 232g2 separated from the upper branch portion 232. The movable claw 232g2 is arranged in a recess portion which is cut out in a shape larger than the movable claw 232g2 at the distal end of the upper branch portion 232. The fixed claw 232g1 and the movable claw 232g2 are connected to each other by arranging two shafts extending in the circumferential direction and the horizontal direction in the holes installed to be extended in the circumferential direction and the horizontal direction of the fixed claw 232g1 and the movable claw 232g2. A protrusion 232i which has a circular cross section is arranged in the long hole 232h of the L-shaped member 232e to be movable and is installed in the movable claw 232g2.

With respect to the movable claw 232g2, when the distal end portion 232d3 of the lever 232d is raised so that the L-shaped member 232e is biased to the base end side by the spring 232f, the long hole 232h of the L-shaped member 232e is moved to the base end side so that the protrusion 232i of the movable claw 232g2 is arranged at the distal end side which is shifted to the right toward the central axis C1 of the long hole 232h. According to this, the movable claw 232g2 is pressed to the left side wall surface of the long hole 232h, so that the chuck mechanism of the pair of claws 232g1 and 232g2 is in the pinching state so as to pinch the one-side leg portion 41 of the coil element 40. At this time, since the gripping device 230 is fixed to the short piece 232e2 of the L-shaped member 232e in the state where the distal end portion 232d3 of the lever 232d is raised to be higher than the central portion 233d1, the pinching state of the chuck mechanism can be maintained.

On the other hand, with respect to the movable claw 232g2, when the distal end portion 232d3 of the lever 232d is lowered so that the L-shaped member 232e is moved to the distal end side against the spring 232f, the long hole 232h of the L-shaped member 232e is moved to the distal end side so that the protrusion 232i of the movable claw 232g2 is arranged at the base end side which is shifted to the left toward the central axis C1 of the long hole 232h. As a result, the movable claw 232g2 is pressed to the right side wall surface of the long hole 232h so that the chuck mechanism of the pair of claws 232g1 and 232g2 is in the open state so as to release the one-side leg portion 41 of the coil element 40. At this time, since the gripping device 230a is fixed to the short piece 232e2 of the L-shaped member 232e in the state where the distal end portion 232d3 of the lever 232d is lowered to be lower than the central portion 232d1, the open state of the chuck mechanism can be maintained.

As illustrated in FIG. 4A, the link mechanism 270 includes a plate-shaped member 271 having the shape of a rod and a bolt 272. The link mechanisms 270 are configured so that the one end of the two plate-shaped members 271 is rotatably connected at the rear end of each of the gripping devices 230. In addition, the other end of the plate-shaped member 271 has a hole larger than the bolt 272. In the state where the shaft portion of the bolt 272 penetrates through the hole and a space is secured between the hole of the plate-shaped member 271 and the head of the bolt 272, the bolt 272 also penetrates through the hole of the plate-shaped member 271 joined to the adjacent gripping device 230. According to this, the plurality of plate-shaped members 271 is connected in a jagged shape so that link mechanisms 270 are formed to be rolled in a ring shape.

Therefore, the plurality of gripping devices 230 is driven according to the movement of the four gripping devices 230 in the radial direction by receiving the driving forces of the four driving mechanisms 250 so that the plurality of gripping devices 230 can be moved through the link mechanisms 270 in the radial direction. More specifically, in the case when the four driving mechanisms 250 move the gripping devices 230 receiving the driving forces in the outer diameter direction, the plate-shaped member 271 of the link mechanism 270 is inclined to the circumferential direction so that the plurality of gripping devices 230 is moved in the outer diameter direction. In addition, in the case when the four driving mechanisms 250 move the gripping devices 230 receiving the driving forces in the inner diameter direction, the plate-shaped member 271 is inclined to the radial direction so that the plurality of gripping devices 230 is moved in the inner diameter direction. According to this, the link mechanism 270 transmits the driving forces of the four driving mechanisms 250 to the plurality of gripping devices 230 in the state where the connected state is maintained.

Figure 7:
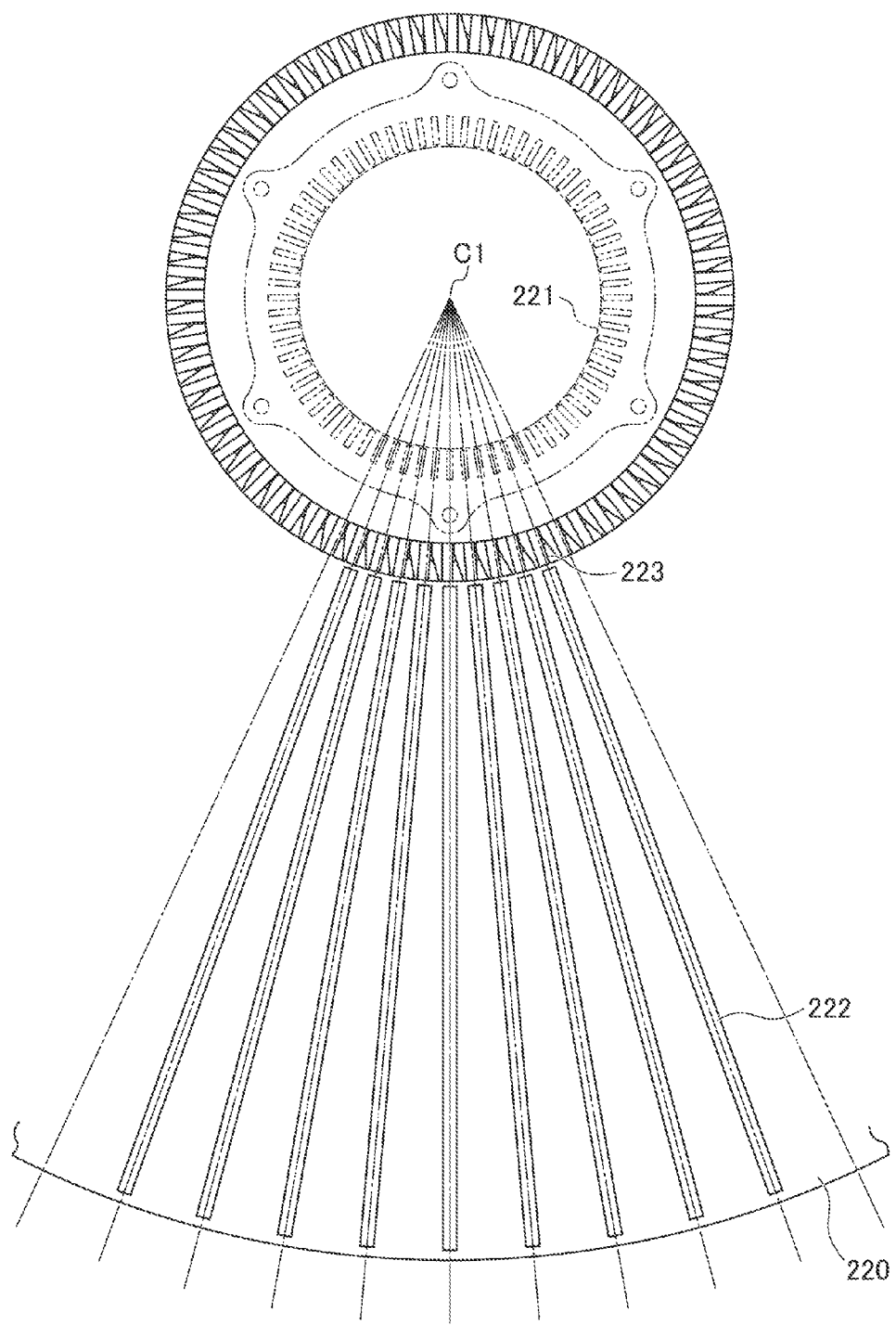
FIG. 7 is a diagram illustrating a state of the top surface of a turntable according to the embodiment.

FIG. 7 is a diagram illustrating the state of the top surface of the turntable 220 according to the embodiment.

On the top surface of the turntable 220, the plurality of slide rails 222 and the plurality of correction grooves 223 are formed.

The plurality of slide rails 222, the number of which is the same as the number of the plurality of gripping devices 230, is installed on the top surface of the turntable 220 and is extended radially in the radial direction. Herein, as illustrated in FIG. 5B, the two slide guides 231a, which are engaged with the slide rails 222 of the first gripping device 230a, are separated from each other. On the other hand, as illustrated in FIG. 6B, the two slide guides 231a, which are engaged with the slide rails 222 of the second gripping device 230b, are adjacent to each other. According to this, in the case when the plurality of gripping devices 230 is moved in the inner diameter direction, the plurality of gripping devices 230 can be densely assembled without interference between the slide guides 231a of the adjacent gripping devices 230 (refer to FIGS. 27A and 27B).

The plurality of correction grooves 223 is formed at the inner diameter sides of the plurality of slide rails 222 on the top surface of the turntable 220 to guide the pins 232c of the upper branch portions 232 of the gripping devices 230 just before the plurality of gripping devices 230 is assembled in the inner diameter direction. In other words, in the case when the plurality of gripping devices 230 is assembled in the inner diameter direction, the plurality of correction grooves 223 corrects the upper branch portion 232 by 10° to the left side toward the central axis C1 at the position where the interference between the adjacent gripping devices 230 does not occur. The plurality of correction grooves 223, the number of which is the same as the number of the plurality of slide rails 222, is aligned in the circumferential direction to be formed in a ring shape.

Figure 8:
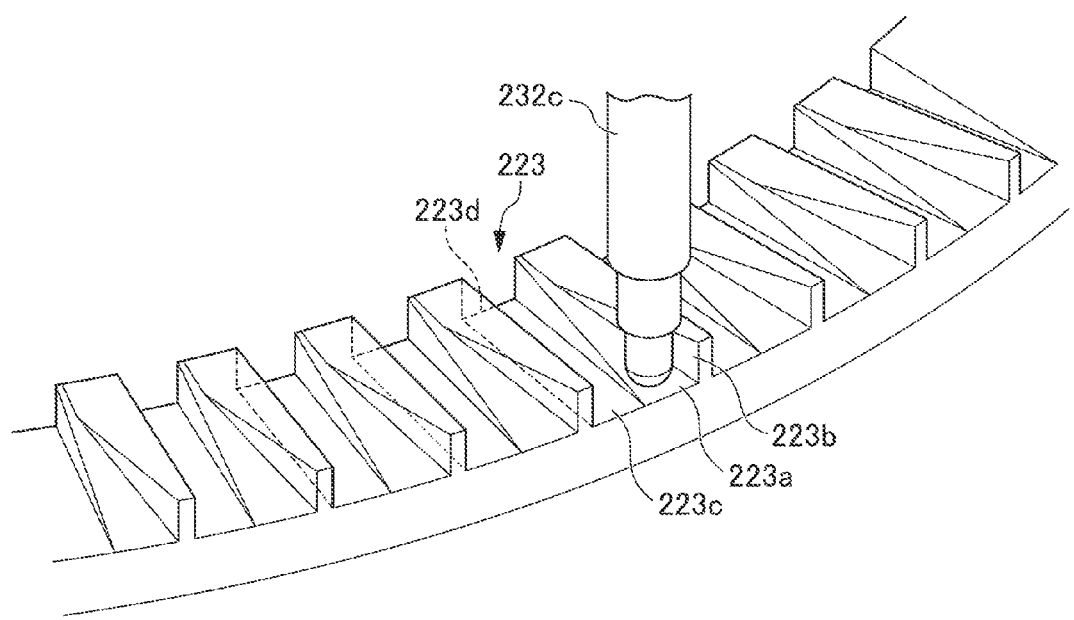
FIG. 8 is a perspective view illustrating correction grooves according to the embodiment as seen from the outer diameter side.

FIG. 8 is a perspective view illustrating the correction grooves 223 according to the embodiment as seen from the outer diameter side.

The correction groove 223 includes an inclined surface 223a which is formed on the extension line of the slide rails 222 toward the central axis C1 and ascends toward the central axis C1 and the width of which is narrowed as large as the central axis C1 side, a regulation wall surface 223b which is inclined in the radial direction toward the central axis C1 on the side wall of the right side toward the central axis C1 with respect to the inclined surface 223a and narrows the width of the inclined surface 223a as large as the central axis C1 side and which corrects the upper branch portion 232 of the gripping device 230 by 10° to the left side toward the central axis C1, and a bottom surface 223c which is formed at the left side toward the central axis C1 with respect to the inclined surface 223a and is formed to have an equal width and to be closer to the central axis C1 side than the regulation wall surface 223b at the height which is the same as the lowest position of the inclined surface 223a.

Herein, a raised overlaid portion 223d which constitutes the regulation wall surface 223b of other correction groove 223 positioned at the left side toward the central axis C1 is installed in the left side toward the central axis C1 with respect to the bottom surface 223c.

The bottom surface 223c has a length in the radial direction so that the interference between the adjacent gripping devices 230 does not occur when the plurality of assembled gripping devices 230 recedes in the outer diameter direction so that the biasing of the spring 233 is released from the regulation of the inclined surface 223a which is inclined to be raised and the upper branch portion 232 is biased by 10° to the right side toward the central axis C1.

The plurality of correction grooves 223 is provided so that the plurality of gripping devices 230 can be more easily assembled in the inner diameter direction, and thus, it is possible to miniaturize the coil element alignment device 20.

As illustrated in FIG. 2, the two switch devices 240 push down the base end portion 232d2 of the lever 232d of the gripping device 230.

The switch devices 240 are separate from the gripping devices 230, and the switch device 240 includes a pushing-down member 241, a drive unit 242, and a support frame 243. The pushing-down member 241 is separated upward from the turntable 220 to be arranged just above the base end portion 232d2 of the lever 232d of the first gripping device 230a and the second gripping device 230b which grip the respective coil elements 40 in the vicinity of the two arrangement points P1 and P2 where the two robot arms 210a and 210b arrange the coil elements 40. The drive unit 242 lowers the pushing-down member 241 by using a piston (not illustrated). The support frame 243 supports the pushing-down member 241 to be slidable in the up/down direction and has a spring for biasing the pushing-down member 241 upward so that the pushing-down member 241 is maintained at the up position.

When the two robot arms 210a and 210b grip the coil elements 40 from the respective two coil molding devices 270a and 270b and arrange the coil elements 40 at the two arrangement points P1 and P2 on the turntable 220, the two switch devices 240 push down the base end portion 232d2 of the lever 232d of the first gripping device 230a and the second gripping device 230b so that the coil elements 40 are gripped by the first and second gripping devices 230a and 230b. According to this, the two switch devices 240 operate the L-shaped member 232e according to the lever 232d to operate the L-shaped member 232e so that the first and second gripping devices 230a and 230b positioned at the arrangement points P1 and P2 grip the coil elements 40.

The switch devices 240 are separate from the gripping devices 230 and operate the L-shaped member 232e so that the gripping devices 230 can grip the coil elements 40 without individual driving sources. Therefore, the gripping devices 230 have inexpensive, simple, and small-sized configurations.

The four driving mechanisms 250 exert the driving forces to the plurality of gripping devices 230.

As illustrated in FIG. 3, the four driving mechanisms 250 are arranged at the four corners of the support table 103 which is installed on the flat portion 102 of the base 100 at the outer side of the turntable 220.

Figure 9:
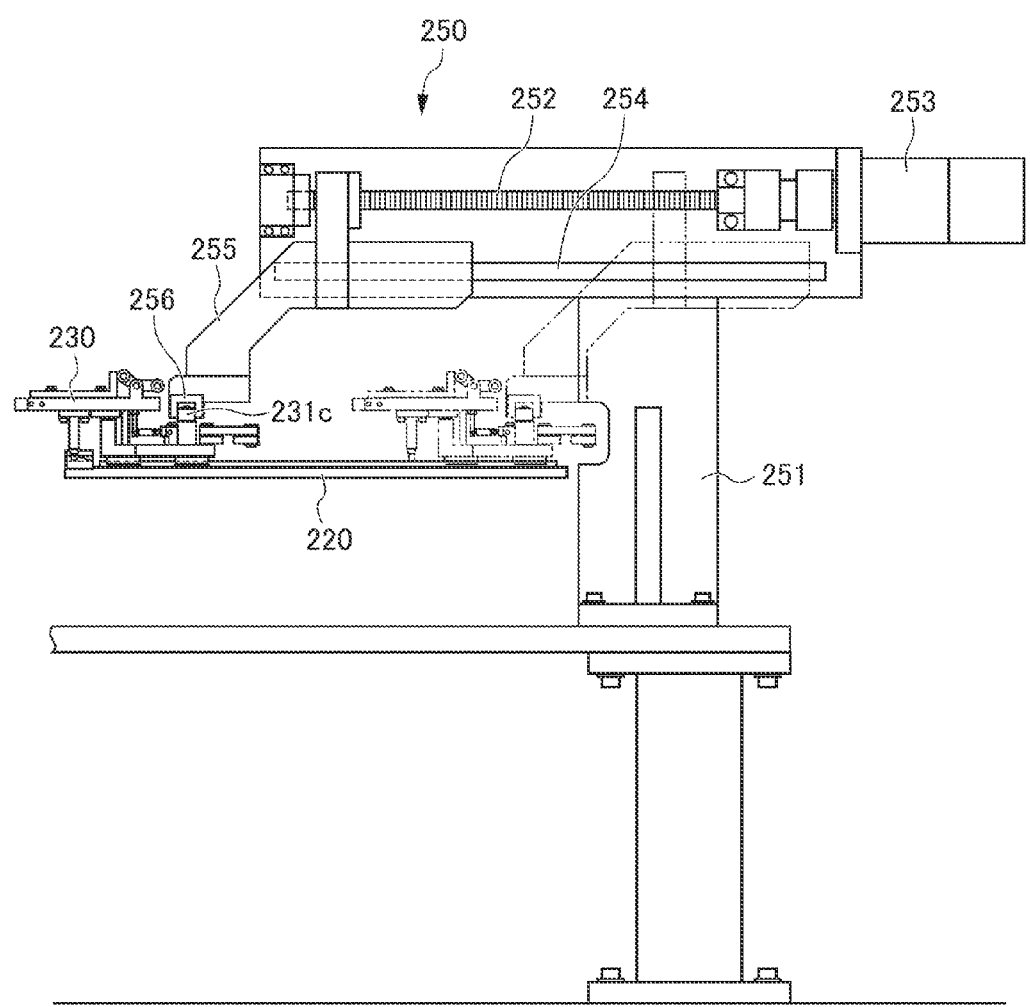
FIG. 9 is a side view illustrating a driving mechanism according to the embodiment.

FIG. 9 is a side view illustrating the driving mechanisms 250 according to the embodiment.

As illustrated in FIG. 9, the driving mechanisms 250 include a support base 251, a ball screw mechanism 252 which is supported by the support base 251, a servo motor 253 which drives the ball screw mechanism 252, a slide rail 254 which is parallel to the ball screw mechanism 252, and a plate 255 which is mounted on the ball screw mechanism 252 and the slide rail 254.

The plate 255 includes a recess portion 256 which is recessed downward. The recess portion 256 is configured so that the recess is continuously formed in the circumferential direction and both ends thereof are opened. The recess portion 256 is engaged with the roller 231c which is installed at the upper end portion of the weight portion 231b of the receded gripping device 230 so that the gripping device 230 and the driving mechanism 250 are connected to each other. According to this, the driving force of the driving mechanisms 250 is transmitted to the plurality of gripping devices 230. In this manner, the driving mechanisms 250 perform only the linear movement in the radial direction.

Figure 10:
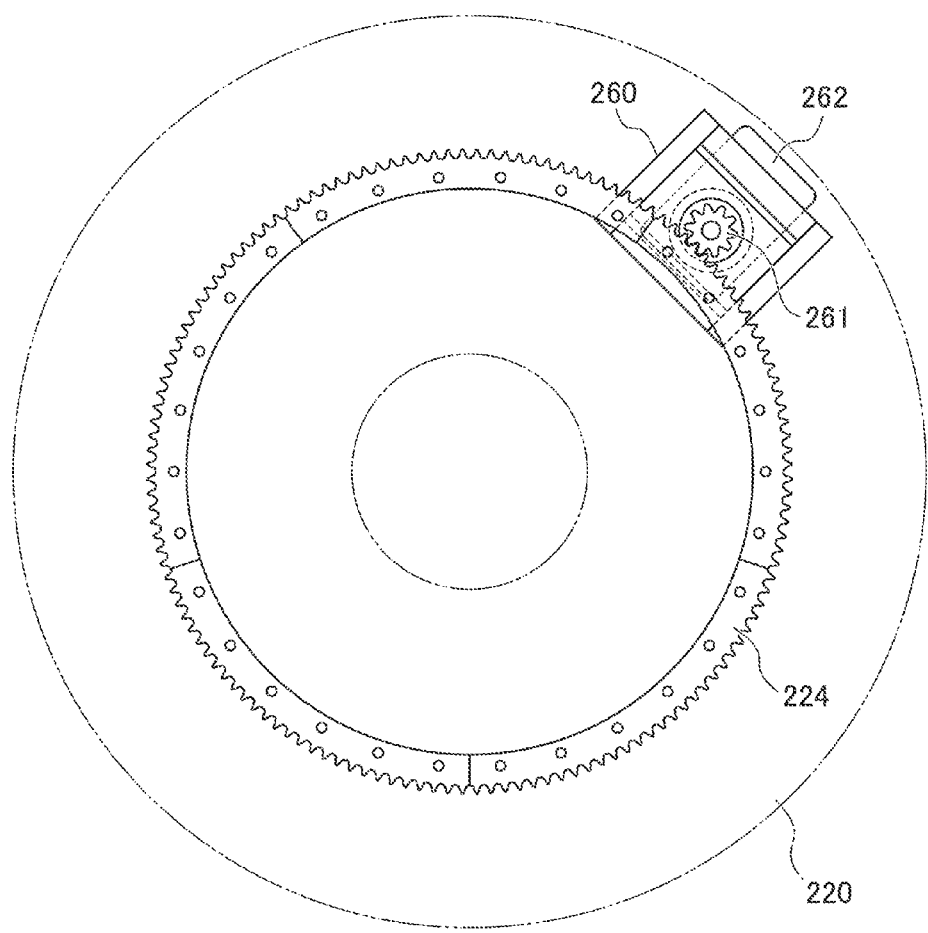
FIG. 10 is a diagram illustrating a table driving device according to the embodiment.

FIG. 10 is a diagram illustrating the table driving device 260 according to the embodiment.

As illustrated in FIG. 10, the table driving device 260 is installed on the lower surface of the turntable 220. The turntable 220 has teeth 224 carved in the circumferential direction in accordance with the number of the plurality of gripping devices 230 on the lower surface. The table driving device 260 includes a gear mechanism 261 which has teeth engaged with the plurality of teeth 224 of the lower surface of the turntable 220 and a servo motor 262 which drives the gear mechanism 261.

When the transfer of the coil elements 40 from the two robot arms 210a and 210b to the first and second gripping devices 230a and 230b is completed, the table driving device 260 drives the servo motor 262 to shift only the two teeth of the lower surface of the turntable 220. According to this, the same-type gripping devices 230a and 230b, one of which becomes empty from the first and second gripping devices 230a and 230b completing the gripping of the coil elements 40 and which do not yet grip the coil elements 40, are arranged at the two arrangement points P1 and P2 of the turntable 220.

In this manner, with respect to the two arrangement points P1 and P2, the first gripping device 230a grips the coil element 40 at the one, and the second gripping device 230b grips the coil element 40 at the other.

Herein, when the teeth 224 of the lower surface of the turntable 220 are shifted by 1 tooth by driving the servo motor 262, the rollers 231c which are engaged with the recess portions 256 of the plates 255 of the four driving mechanisms 250 are moved from the recess portions 256 in the circumferential direction in accordance with the movement of the gripping devices 230 in the circumferential direction according to the rotation of the turntable 220 so that the engagement of the rollers 231c and the recess portions 256 is released. Next, the gripping devices 230 having the rollers 231c are moved from the four driving mechanisms 250.

In addition, the gripping devices 230 adjacent to the gripping devices 230 which are moved from the four driving mechanisms 250 are moved to the four driving mechanisms 250. Next, the rollers 231c of the gripping devices 230 which are moved to the four driving mechanisms 250 are inserted into the recess portion 256 from the circumferential direction in accordance with the movement of the gripping devices 230 in the circumferential direction according to the rotation of the turntable 220 so that the rollers 231c and the recess portions 256 are engaged with each other.

Configuration of Coil Element Insertion Device

The coil element insertion device 30 inserts the leg portions 41 of the coil elements 40 of the assembly body 50 into the respective slots 61 of the stator core 60.

Figure 11:
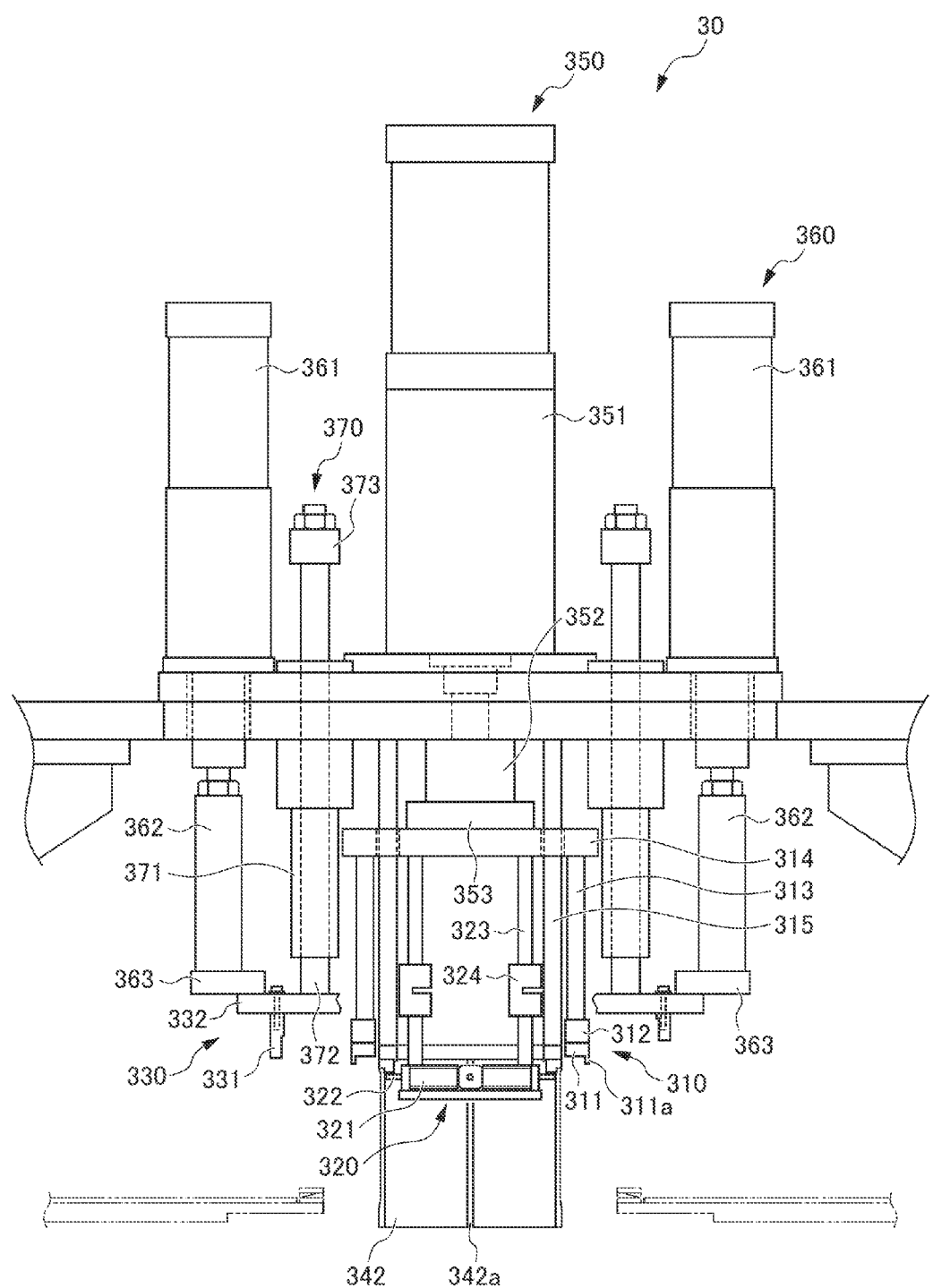
FIG. 11 is a front view illustrating a coil element insertion device according to the embodiment.

FIG. 11 is a front view illustrating the coil element insertion device 30 according to the embodiment.

The coil element insertion device 30 includes a coil element pushing-down mechanism 310, a pin protruding mechanism 320, a lever pushing-down mechanism 330, and a guiding device 340. In addition, the coil element insertion device 30 includes a cylinder mechanism 350 for the coil element pushing-down mechanism, two cylinder mechanisms 360 for the lever pushing-down mechanism, and four guiding mechanisms 370 for the lever pushing-down mechanism.

The coil element pushing-down mechanism 310 pushes down the assembly body 50 which is formed by assembling the plurality of coil elements 40 by using the coil element alignment device 20 to the lower position where the stator core 60 is positioned.

The coil element pushing-down mechanism 310 includes a pushing-down member 311, a lower annular portion 312 which is fixed to the upper surface of the pushing-down member 311, a plurality of support pillars 313 which is installed to be extended upward on the upper surface of the lower annular portion 312, an upper disc portion 314 which is joined to the upper ends of the plurality of support pillars 313, and a guide pillar 315 which penetrates through the upper disc portion 314 and guides the pushing-down member from the inner circumferential side.

The pushing-down member 311 has a ring shape having a diameter which is equal to the diameter of the assembly body 50 and includes an annular projection 311a which protrudes downward from the outer circumferential side of the lower surface and supports the outer circumferential side of the turn portions 42 of the coil elements 40 of the assembly body 50 from the outer diameter side.

The coil element pushing-down mechanism 310 is joined to the cylinder mechanism 350 for the coil element pushing-down mechanism.

The cylinder mechanism 350 for the coil element pushing-down mechanism includes a cylinder 351 which is arranged at the center of the stator manufacturing apparatus 1, a piston (not illustrated) which is installed to be reciprocatable inside the cylinder 351, a rod 352 which is joined to the piston, and a disc portion 353 which is installed at the distal end of the rod 352.

The disc portion 353 is configured so that the lower surface is joined to the upper surface of the upper disc portion 314 of the coil element pushing-down mechanism 310.

After the assembly body 50 is formed by assembling the plurality of coil elements 40 by using the coil element alignment device 20, the coil element pushing-down mechanism 310 drives a piston of the cylinder mechanism 350 for the coil element pushing-down mechanism to move the rods 352 downward so that the pushing-down member 311 descends. According to this, the lower surface of the lowered pushing-down member 311 is in contact with the turn portions 42 of the coil elements 40 of the assembly body 50 to press down the assembly body 50.

Figure 12:
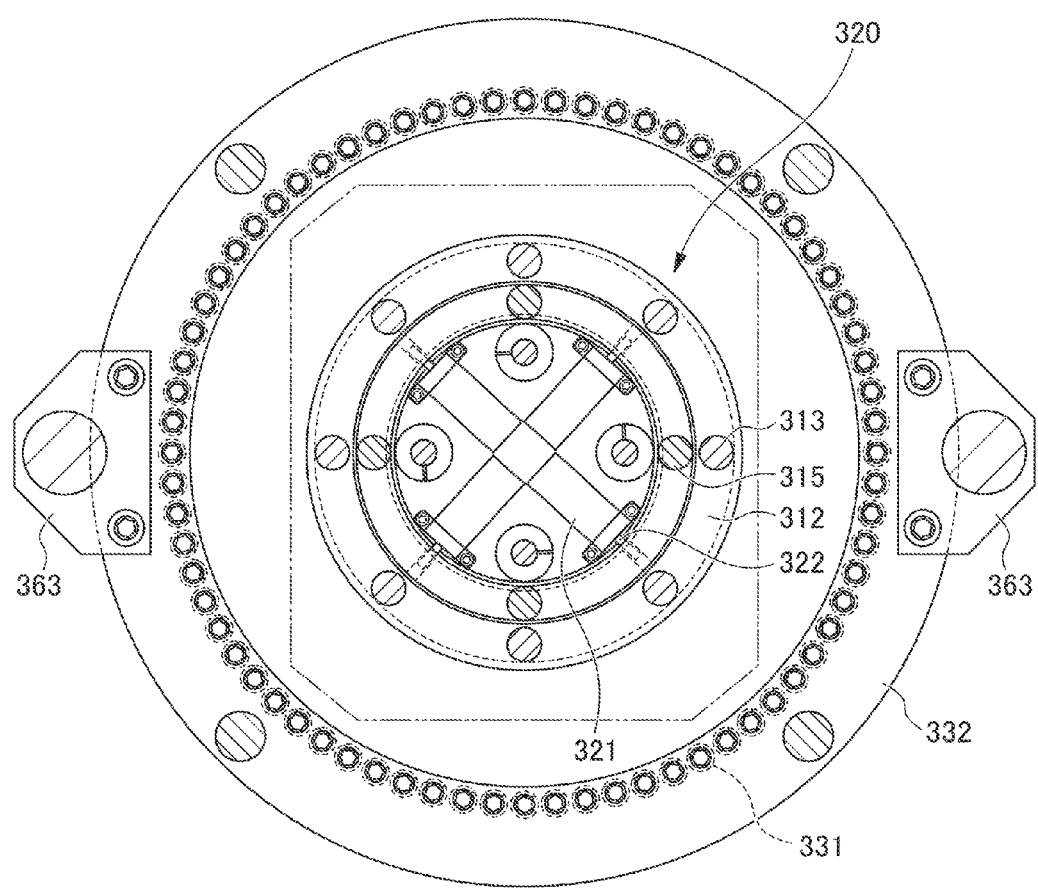
FIG. 12 is a top view illustrating a pin protruding mechanism according to the embodiment.

FIG. 12 is a top view illustrating the pin protruding mechanism 320 according to the embodiment.

The pin protruding mechanism 320 prevents the assembly body 50 pressed by the coil element pushing-down mechanism 310 from falling after the gripping of the plurality of gripping devices 230 is released.

The pin protruding mechanism 320 includes a disc-shaped pin protruding portion 321 the diameter of which is smaller than the diameter of the assembly body 50, four pins 322 which are separated every 90° to be retractable with respect to the center from the pin protruding portion 321, a plurality of support pillars 323 which is installed to be extended upward from the upper surface of the pin protruding portion 321 to the upper disc portion 314 of the coil element pushing-down mechanism 310, and a guide member 324 which is installed in the middle of the plurality of support pillars 323 to guide the outer circumference to the guide pillar 315 of the coil element pushing-down mechanism 310.

When the four pins 322 protrude in the outer diameter direction, the four pins 322 are in contact with the lower portions of the turn portions 42 of predetermined coil elements 40 of the assembly body 50 and insert the turn portions 42 into spaces with respect to the pushing-down member 311, and the assembly body 50 can be supported by supporting the turn portions 42 from the lower portions by using the shapes of the turn portions 42.

The relative distance from the pushing-down member 311 of the coil element pushing-down mechanism 310 is adjusted so that the pins 322 protrude at a predetermined timing when the pins 322 are in contact with the lower portions of the turn portions 42 of predetermined coil elements 40 of the assembly body 50 so that the pin protruding portion 321 is arranged to be low in accordance with the vertical width of the turn portions 42 of the coil elements 40 of the assembly body 50 on the lower surface of the pushing-down member 311.

In the case when the assembly body 50 is pushed down by the coil element pushing-down mechanism 310, the pin protruding mechanism 320 simultaneously protrudes the four pins 322 from the descended pin protruding portion 321 in the outer diameter direction at a predetermined timing.

According to this, the four pins 322 are inserted between the leg portions 41 of the plurality of coil elements 40 of the assembly body 50 to be in contact with the lower portions of the turn portions 42 of the predetermined coil elements 40 so that the assembly body 50 is supported from the lower side.

The lever pushing-down mechanism 330 simultaneously pushes down the distal end portions 232d3 of the levers 232d of the plurality of gripping devices 230 to simultaneously release the gripping of the plurality of gripping devices 230 on the coil elements 40.

The lever pushing-down mechanism 330 includes a plurality of pushing-down pins 331 and a circular ring portion 332 which is installed on the lower surface to support the plurality of pushing-down pins 331 in the state where the plurality of pushing-down pins 331 is directed downward.

The plurality of pushing-down pins 331, the number of which is equal to the number of the plurality of gripping devices 230, is installed on the lower surface of the circular ring portion 332 and is arranged to be aligned in the circumferential direction just above the distal end portions 232d3 of the levers 232d of the plurality of gripping devices 230 which is positioned to be assembled at the inner circumferential side of the turntable 220.

Among the plurality of pushing-down pins, the pushing-down pin which pushes down the distal end portion 232d3 of the lever 232d of the first gripping device 230a is shorter than the circular ring portion 332; the pushing-down pin 331 which pushes down the distal end portion 232d3 of the lever 232d of the second gripping device 230b is longer than the circular ring portion 332; and the plurality of pushing-down pins 331 is alternately aligned in the circumferential direction. The pushing-down pin 331 is configured so that the inner diameter sidewall is formed to be flat in accordance with the flat plane of the short piece 232e2 to prevent the pushing-down pin 331 from colliding with the short piece 232e2 of the L-shaped member 232e of each of the gripping devices 230 at the time of pushing down the distal end portion 232d3 of the lever 232d.

The lever pushing-down mechanism 330 is joined to the two cylinder mechanisms 360 for the lever pushing-down mechanism and the four guiding mechanisms 370 for the lever pushing-down mechanism.

The two cylinder mechanisms 360 for the lever pushing-down mechanism are arranged at the right and left portions with respect to the front surface of the stator manufacturing apparatus 1.

The cylinder mechanism 360 for the lever pushing-down mechanism includes a cylinder 361, a piston (not illustrated) which is installed to be reciprocatable inside the cylinder 361, a rod 362 which is joined to the piston, and a pressing portion 363 which is installed at the distal end of the rod 362.

The four guiding mechanisms 370 for the lever pushing-down mechanism are arranged to be closer to the central axis than the two cylinder mechanisms 360 for the lever pushing-down mechanism and to interpose the cylinder mechanism 360 for the lever pushing-down mechanism on the both side surfaces of the stator manufacturing apparatus 1. In this manner, the four guiding mechanisms 370 for the lever pushing-down mechanism are arranged so that the plurality of pushing-down pins 331 is set to simultaneously push down the distal end portions 232d3 of the levers 232d of the plurality of gripping devices 230 without rattling of the circular ring portion 332 caused by the driving forces of the two cylinder mechanisms 360 for the lever pushing-down mechanism.

The guiding mechanism 370 for the lever pushing-down mechanism includes a cylindrical holder 371, a rod 372 which is installed to be reciprocatable inside the holder 371, and a cushion 373 which is installed at the upper end of the rod 372.

The pressing portions 363 of the two cylinder mechanisms 360 for the lever pushing-down mechanism and the rods 372 of the four guiding mechanisms 370 for the lever pushing-down mechanism are joined to the upper surface of the circular ring portion 332 of the lever pushing-down mechanism 330.

After the pins 322 are protruded by the pin protruding mechanism 320 and the assembly body 50 is supported by the pins 322, the lever pushing-down mechanism 330 drives the piston of the cylinder mechanism 360 for the lever pushing-down mechanism to move the rods 362 downward so that the distal end portions 232d3 of the levers 232d of the plurality of gripping devices 230 are simultaneously pushed down by the plurality of pushing-down pins 331 to be lowered. According to this, the plurality of gripping devices 230 simultaneously releases the grip on the coil elements 40.

Figure 13:
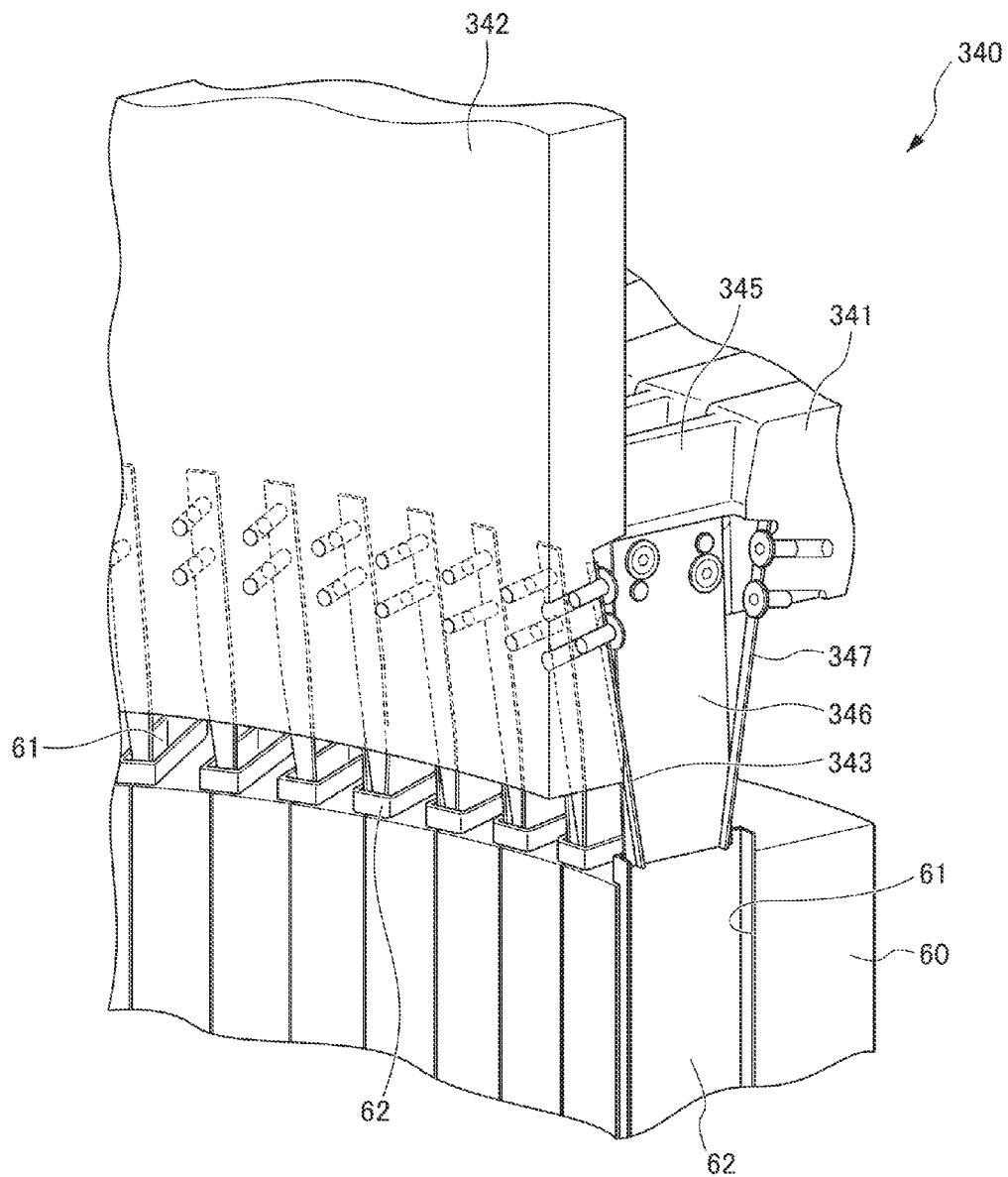
FIG. 13 is a perspective view illustrating a guiding device according to the embodiment.

FIG. 13 is a perspective view illustrating the guiding device 340 according to the embodiment.

The guiding device 340 inserts the leg portions 41 of the coil elements 40 of the assembly body 50 pushed down by the coil element pushing-down mechanism 310 into the respective slots 61 of the stator core 60. The guiding devices 340 are continuously arranged at the inner diameter side of the turntable 220 and under the turntable 220.

The guiding device 340 includes a support portion 341, an inner circumferential guide 342, a guiding plate 343, a slide mechanism 344, a guiding portion 345, a pair of first spreader plates 346, a second spreader plate 347, and an arch-shaped guide 348.

The support portion 341 is constructed with a ring-shaped frame and supports the slide mechanism 344 which supports the guiding portion 345.

As illustrated in FIG. 11, the inner circumferential guide 342 is installed to be extended downward from the guide pillar 315 and is formed in a cylindrical shape in the central portion of the support portion 341 to have a slit 342a which allows the pin 322 to be movable in the up/down direction in the state where the pin 322 penetrates through the slit 342a. The lower end of the inner circumferential guide 342 also serves as a stopper allowing the stator core 60 raised by the lift mechanism 120 of the stator core transport device 10 to be in contact so as to be fixed. The assembly body 50 formed by assembling the plurality of coil elements 40 aligned in a ring shape is in contact with the outer circumference of the inner circumferential guide 342.

As illustrated in FIG. 13, the guiding plate 343 is installed in the outer circumference of the inner circumferential guide 342, and the guiding plate 343 together with a pair of the first spreader plates 346 and the second spreader plate 347 is inserted into the slot 61 of the stator core 60 raised by the lift mechanism 120 of the stator core transport device 10.

The guiding plate 343 is joined to an inclined surface (surface further inclined in the outer diameter direction as it goes downward) formed in the lower portion of the inner circumferential guide 342. According to this, the guiding plate 343 is extended to be skewed downward to be lower than the lower end of the inner circumferential guide 342. The guiding plates 343 are installed corresponding to the inner short sides of the slots 61.

As illustrated in FIGS. 1 and 2, the slide mechanism 344 moves the divided guiding portions, which are divided plurally in the circumferential direction to constitute the 4-divided guiding portion 345, in the radial direction.

The slide mechanism 344 includes four cylinder mechanisms, two slide pins installed for each of the plurality of divided guiding portions, connection portions connecting the base ends (radial outer end) of the slide pins, and link mechanisms installed at the lower surface sides of the connection portions to link the adjacent connection portions.

The four cylinder mechanisms are arranged at equal intervals in the circumferential direction.

The cylinder mechanism includes a cylinder which is supported by a support portion, a piston which is installed to be reciprocatable inside the cylinder, a rod which is connected to the piston, and a joint portion which is installed at the distal end of the rod to be joined to the connection portion. The driving force of the cylinder mechanism is transmitted to the two slide pins through the joint portion, the connection portions, and the link mechanisms.

The two slide pins are installed in each of the plurality of divided guiding portions, and the distal ends are joined to each of the divided guiding portions. The slide pins are installed to be aligned in the up/down direction. The slide pins are configured so that the base ends (radial outer end) are connected to each other at the connection portions. The two slide pins receive the driving force of the cylinder mechanism to slide in the radial direction so that the two slide pins move the divided guiding portions in the radial direction.

More specifically, when receiving the driving force of the slide mechanism 344 toward the central axis C1, the slide pins slide in the inner diameter direction. According to this, the divided guiding portions are advanced in the inner diameter direction to be assembled.

In addition, when receiving the driving force of the slide mechanism 344 toward the outer diameter direction, the slide pins slide in the outer diameter direction against the biasing force of the spring. According to this, the divided guiding portions recede in the outer diameter direction to be dispersed.

The guiding portion 345 is slidable only in the inner and outer circumferential directions in the horizontal direction due to the slide mechanism 344 so that the configuration of the guiding portion 345 is simplified.

The guiding portion 345 guides the leg portions 41 of the coil elements 40 of the assembly body 50 which are lowered by the coil element pushing-down mechanism 310 to the respective slots 61 of the stator core 60.

The guiding portion 345 is installed in a ring shape and is divided into four portions in the circumferential direction. A support portion which shifts the position of the divided guiding portions upward from the position of the slide mechanism 344 is installed in the guiding portion 345.

Figure 14:
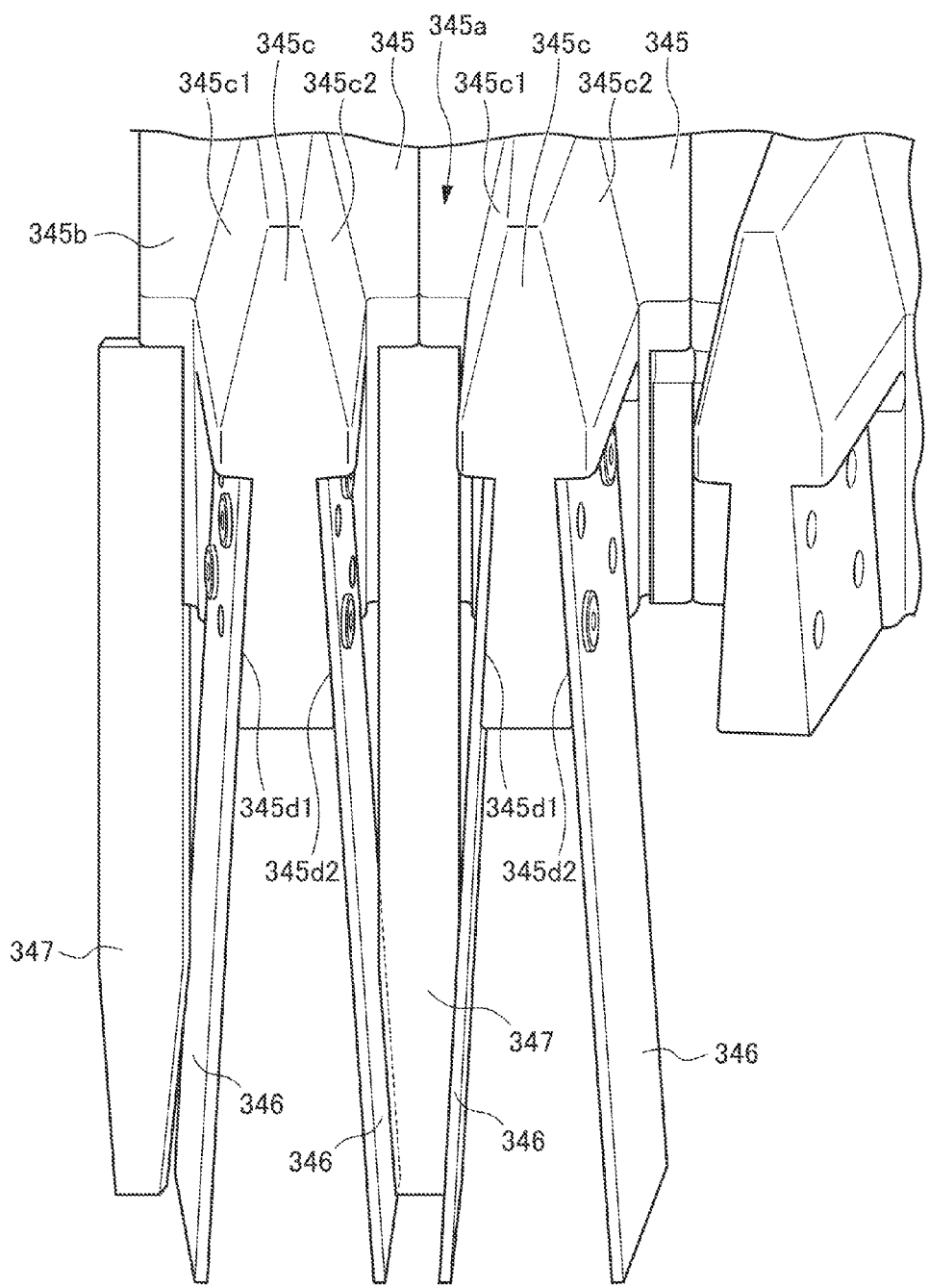
FIG. 14 is a perspective view illustrating a guiding portion and a pair of first spreader plates and a second spreader plate according to the embodiment.

FIG. 14 is a perspective view illustrating the guiding portion 345, a pair of the first spreader plates 346, and the second spreader plate 347 according to the embodiment.

The guiding portion 345 has a tapered structure 345a which is spread in the direction opposite to the insertion direction (downward) at the distal end side (inner diameter direction).

In addition, a pair of the first spreader plates 346 and the second spreader plate 347 are installed for each tapered structure 345a under the tapered structure 345a of the guiding portion 345. A pair of the first spreader plates 346 is installed corresponding to the long side of the slot 61 of the stator core 60, which has a rectangular cross section. In addition, the second spreader plate 347 is installed corresponding to the outer short side of the slot 61.

The tapered structure 345a of the guiding portion 345 is formed in such a manner that the protruding portions 345c, which have an arrow-shaped cross section and protrude from the distal end surfaces 345b of the divided guiding portions, are adjacent to each other. More specifically, since the upper side surfaces 345c1 and 345c2 of the protruding portion 345c are skewed to be spaced apart from each other as it goes downward, a tapered structure 345a is formed by the upper side surfaces 345c1 and 345c2 of the adjacent protruding portions 345c.

A pair of the first spreader plates 346 and the second spreader plate 347 are extended from the distal end of the guiding portion 345 in the insertion direction (downward). Herein, since the lower portion side surfaces 345d1 and 345d2 of the protruding portion 345c are skewed to be spaced apart from each other as it goes downward, a tapered structure which is spread in the direction opposite to the insertion direction (downward) is formed at the lower portion of the protruding portion 345c by the lower portion side surfaces 345d1 and 345d2 of the adjacent protruding portions 345c.

A pair of the first spreader plates 346 is joined to the lower portion side surfaces 345d1 and 345d2 of the protruding portion 345c so that a pair of the first spreader plates 346 is extended downward along the lower portion side surfaces 345d1 and 345d2. In other words, a pair of the first spreader plates 346 is extended to be skewed with respect to the insertion direction so as to be close to each other as it goes to the lower end side (downward).

Similarly, the second spreader plate 347 is also extended to be skewed with respect to the insertion direction so as to be close to the center of the slot as it goes to the lower end side (downward). The second spreader plate 347 is joined to an inclined surface (surface is further inclined in the inner diameter direction as it goes downward) formed in the lower portion of the distal end surface of the guiding portion 345. As illustrated in FIG. 13, the second spreader plate 347 and the guiding plate 343 of the inner circumferential guide 342 constitute a pair so as to be close to each other as it goes to the lower end side (downward).

In addition, the guiding plate 343 and the spreader plates 346 and 347 are formed to be flexible so that the lower end sides can be spread. The interval at the lower end side is formed to be smaller than the width of the insulating sheet 62 disposed inside the slot 61 of the stator core 60, and the interval at the upper end side is formed to be larger than the width of the leg portion 41 of the coil element 40.

Figure 16:
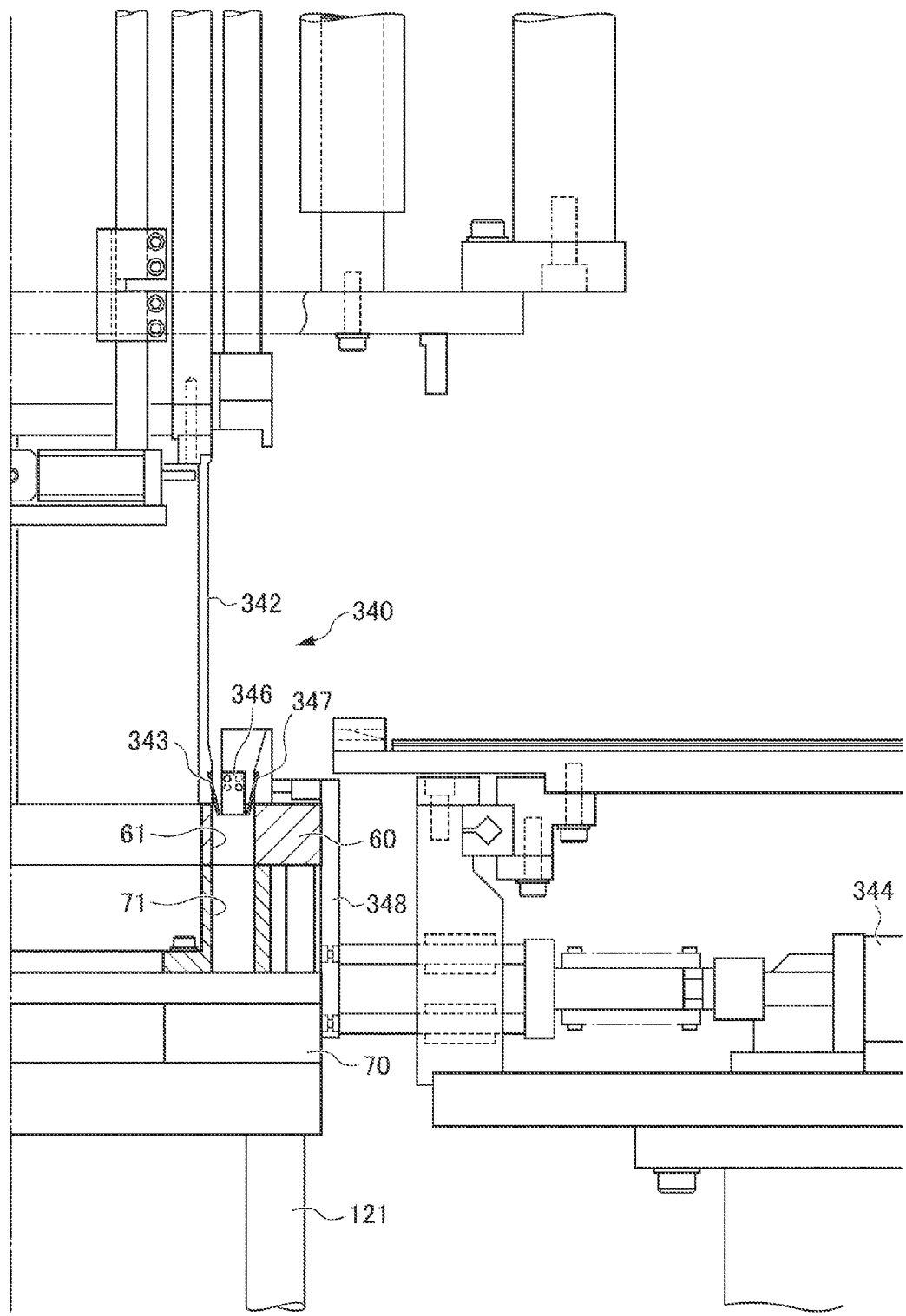
FIG. 16 is a diagram illustrating a state where a stator core according to the embodiment is installed.

The guiding plate 343 and the spreader plates 346 and 347 are formed to have lengths so that, when the stator core 60 raised by the lift mechanism 120 of the stator core transport device 10 is in contact with the lower end of the inner circumferential guide 342, the lower end portions can be inserted into the slot 61 of the stator core 60 (refer to FIG. 16).

As illustrated in FIGS. 1 and 2, an arch-shaped guide 348 is installed under the support portion 341 of the guiding portion 345 for each of the four divided guiding portions 345. When the jig 70 to which the stator core 60 is fixed is raised by the lift mechanism 120 of the stator core transport device 10, the arch-shaped guide 348 drives a piston to move the rod in the inner diameter direction, and the arch-shaped guide 348 is in contact with the outer circumference of the stator core 60. According to this, the positions of the divided guiding portions are finely adjusted so that a pair of the first spreader plates 346 and the second spreader plate 347 can be inserted into the slot 61 of the stator core 60.

Operation of Stator Manufacturing Apparatus 1

Next, operations of the stator manufacturing apparatus 1 according to the embodiment will be described.

Figure 15:
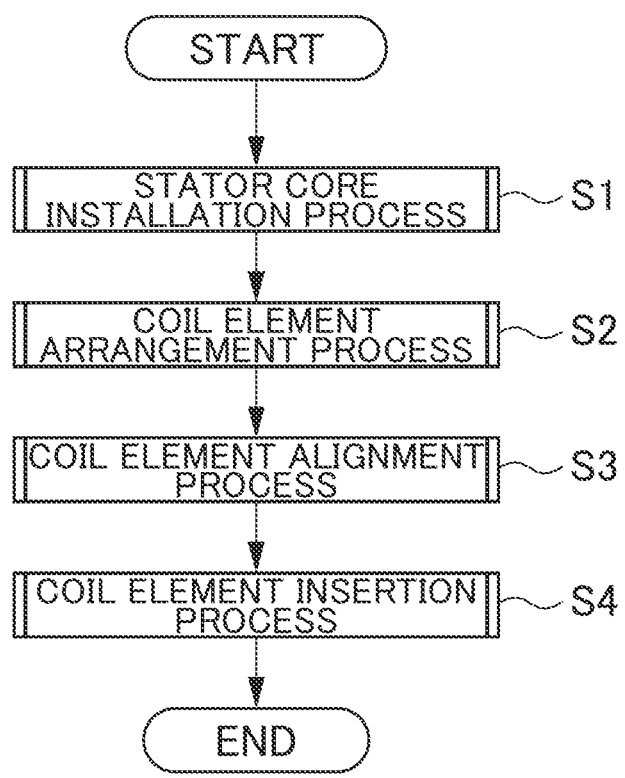
FIG. 15 is a flowchart illustrating the operations of the stator manufacturing apparatus according to the embodiment.

FIG. 15 is a flowchart illustrating the operations of the stator manufacturing apparatus 1 according to the embodiment.

As illustrated in FIG. 15, the stator manufacturing apparatus 1 performs a stator core installation process S1, a coil element arrangement process S2, a coil element alignment process S3, and a coil element insertion process S4.

Next, each process will be described.

Stator Core Installation Process S1

In the stator core installation process S1, the jig 70 to which the stator core 60 is fixed is installed at a predetermined position of the stator manufacturing apparatus 1.

At first, the operator mounts the jig 70 to which the stator core 60 is fixed onto the transport mount 112 at the front-left-side end portion of the stator manufacturing apparatus 1 and pushes a manufacturing start button (not illustrated).

After the manufacturing start button is pushed, the stator manufacturing apparatus 1 starts. Next, the stator manufacturing apparatus 1 drives the ball screw mechanism 113 using the servo motor 114 of the horizontal direction transport mechanism 110 to move the transport mount 112 in the horizontal direction. According to this, the transport mount 112 on which the jig 70 to which the stator core 60 is fixed is mounted is moved from the front-left-side end portion to the center of the stator manufacturing apparatus 1 on the slide rails 111.

FIG. 16 is a diagram illustrating a state where the stator core 60 according to the embodiment is installed.

Next, the stator manufacturing apparatus 1 drives the ball screw mechanism 123 using the servo motor 124 of the lift mechanism 120 to raise four rods 121. According to this, the jig 70 to which the stator core 60 is fixed is pushed up by the four rods 121. The four rods 121 pushing up the jig 70 to which the stator core 60 is fixed are stopped at the position where the upper surface of the stator core 60 is in contact with the lower end of the inner circumferential guide 342 of the guiding device 340.

Herein, during the pushing-up of the jig 70 to which the stator core 60 is fixed by using the four rods 121, the stator manufacturing apparatus 1 drives the piston of the cylinder mechanism of the guiding device 340 to move the rods in the inner diameter direction to be in contact with the outer circumference of the stator core 60 by the arch-shaped guides 348. According to this, the positions of a pair of the first spreader plates 346 and the second spreader plate 347 are finely adjusted so that the guiding plate 343, a pair of the first spreader plates 346, and the second spreader plate 347 are position-aligned. Next, the lower portions of the guiding plate 343, a pair of the first spreader plates 346, and the second spreader plate 347 of the guiding device 340 are inserted into the slots 61 of the stator core 60 in which the insulating sheets 62 are disposed.

As illustrated in FIG. 13, the end portion of the insertion side (upward) of the insulating sheet 62 disposed inside the slot 61 of the stator core 60 is slightly protruded from the slot 61. Therefore, when the jig 70 to which the stator core 60 is fixed is pushed upward by the four rods 121 and the arch-shaped guides 348 are in contact with the outer circumference of the stator core 60, the lower end portions of the guiding plate 343, a pair of the first spreader plates 346, and the second spreader plate 347 are inserted between the inserting sheets 62 disposed inside the slots 61 of the stator core 60.

Coil Element Arrangement Process S2

In the coil element arrangement process S2, the plurality of coil elements 40 is arranged to be aligned in a ring shape in the circumferential direction.

FIG. 17 is a flowchart illustrating the operations of the coil element arrangement process S2 according to the embodiment.

As illustrated in FIG. 17, in step S21, the stator manufacturing apparatus 1 allows the first robot arm 210a to grip the coil element 40 from the coil molding device 270a and arranges the coil element 40 at the arrangement point P1 of the turntable 220 (refer to FIG. 3).

At the arrangement point P1, the coil element 40 is inserted into the chuck mechanism in the open state between the pair of claws 232g1 and 232g2 of the first gripping device 230a.

Figure 18A:
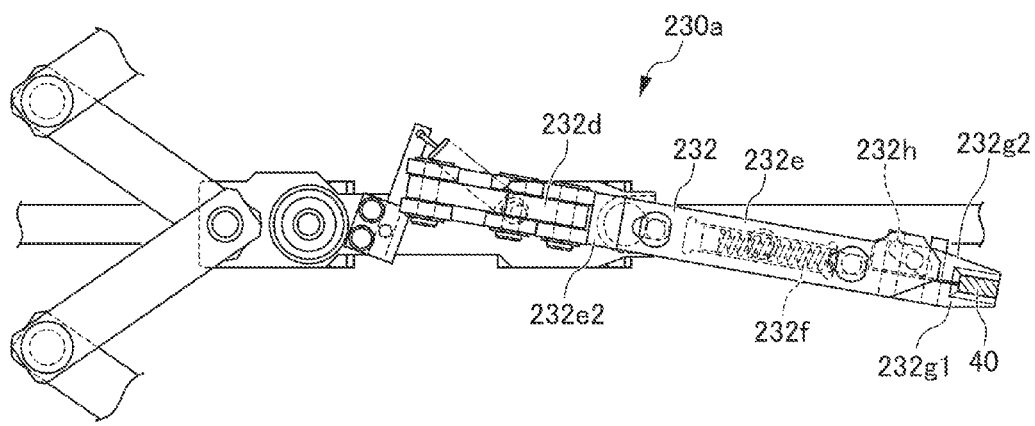
FIGS. 18A and 18B are diagrams illustrating a state where the first gripping device according to the embodiment grips a coil element.
Figure 18B:
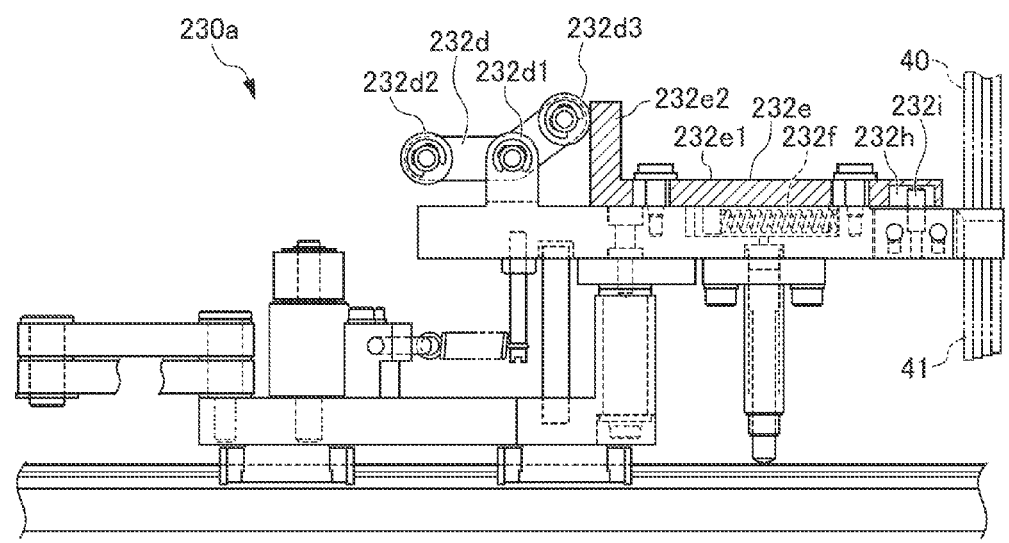

FIGS. 18A and 18B are diagrams illustrating a state when the first gripping device 230a according to the embodiment grips the coil elements 40.

In step S22, the stator manufacturing apparatus 1 drives the piston of the switch device 240 to push down the base end portion 232d2 of the lever 232d of the first gripping device 230a existing at the arrangement point P1 by using the pushing-down member 241. According to this, as illustrated in FIGS. 18A and 18B, the first gripping device 230a grips the coil element 40.

More specifically, when the pushing-down member 241 of the switch device 240 pushes down the base end portion 232d2 of the lever 232d of the first gripping device 230a, the distal end portion 232d3 of the lever 232d is raised so that the L-shaped member 232e is biased to the base end side by the spring 232f. According to this, the long hole 232h of the L-shaped member 232e is moved to the base end side so that the protrusion 232i of the movable claw 232g2 is arranged at the distal end portion which is shifted to the right toward the central axis C1 of the long hole 232h. Next, the movable claw 232g2 is pressed to the left side wall surface toward the central axis C1 of the long hole 232h so that the chuck mechanism of a pair of claws 232g1 and 232g2 is in the pinching state, and thus, the one-side leg portion 41 of the coil element 40 is gripped.

In addition, after the pushing-down member 241 of the switch device 240 pushes down the base end portion 232d2 of the lever 232d, the pushing-down member 241 retracts upward by the force of the spring. After the pushing-down member 241 retracts, since the first gripping device 230a is fixed to the short piece 232e2 of the L-shaped member 232e in the state where the distal end portion 232d3 of the lever 232d is raised to be higher than the central portion 232d1, the pinching state of the chuck mechanism is maintained.

In this manner, the function of the switch device 240 is received by the short piece 232e2 to move the main piece 232e1 so that the main piece 232e1 is moved along the fixed claw 232g1 to move the movable claw 232g2. In this manner, the linear movement of the main piece 232e1 can be converted to the gripping forces of the pair of claws 232g1 and 232g2. Therefore, the stator manufacturing apparatus 1 can arrange the coil elements 40 to be aligned in a ring shape by only repeating the simple operations. In addition, the first gripping device 230a and the switch devices 240 have inexpensive, simple, and small-sized configurations.

In step S23, the stator manufacturing apparatus 1 allows the second robot arm 210b to grip the coil element 40 from the coil molding device 270b so as to arrange the coil element 40 at the arrangement point P2 on the turntable 220 (refer to FIG. 3).

In the arrangement point P2, the coil element 40 is inserted into the open-state chuck mechanism between the pair of claws 232g1 and 232g2 of the second gripping device 230b.

Figure 19A:
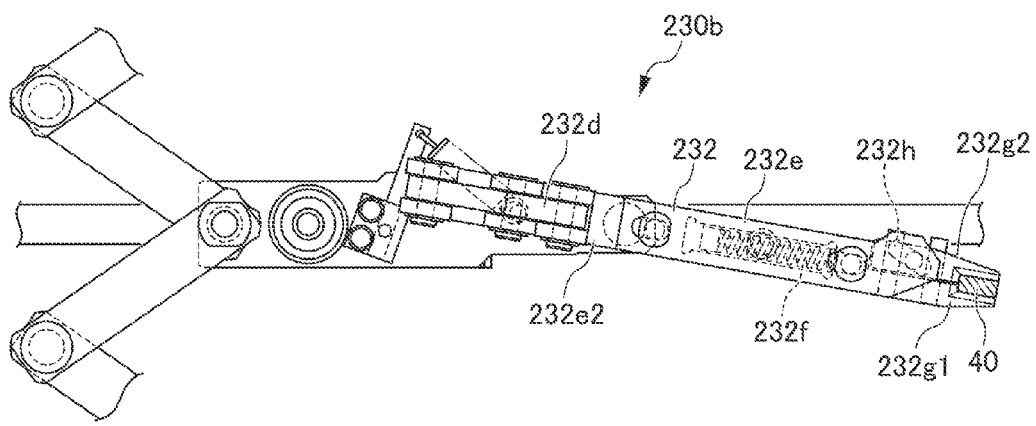
FIGS. 19A and 19B are diagrams illustrating a state where the second gripping device according to the embodiment grips a coil element.
Figure 19B:
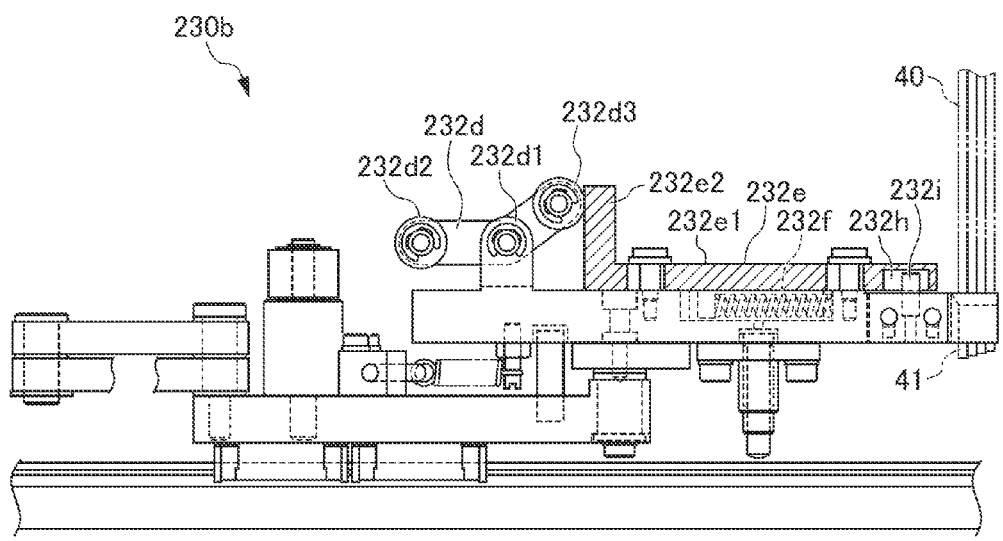

FIGS. 19A and 19B are diagrams illustrating a state where the second gripping device 230b according to the embodiment grips the coil elements 40.

In step S24, the stator manufacturing apparatus 1 drives the piston of the switch device 240 to push down the base end portion 232d2 of the lever 232d of the second gripping device 230b existing at the arrangement point P2 using the pushing-down member 241. According to this, as illustrated in FIGS. 19A and 19B, the second gripping device 230b grips the coil elements 40.

More specifically, when the pushing-down member 241 of the switch device 240 pushes down the base end portion 232d2 of the lever 232d of the second gripping device 230b, the distal end portion 232d3 of the lever 232d is raised so that the L-shaped member 232e is biased to the base end side by the spring 232f. According to this, the long hole 232h of the L-shaped member 232e is moved to the base end side so that the protrusion 232i of the movable claw 232g2 is arranged at the distal end side which is shifted to the right toward the central axis C1 of the long hole 232h. Next, the movable claw 232g2 is pressed to the left side wall surface toward the central axis C1 of the long hole 232h so that the chuck mechanism of the pair of claws 232g1 and 232g2 is in the pinching state so as to grip the one-side leg portion 41 of the coil element 40. Herein, since the second gripping device 230b is lower than the first gripping device 230a in terms of the height in the axial direction of the central axis C1, the second gripping device 230b grips the portion lower than the one-side leg portion 41 of the coil element 40.

In addition, after the pushing-down member 241 of the switch device 240 pushes down the base end portion 232d2 of the lever 232d, the pushing-down member 241 retracts upward by the force of the spring. After the pushing-down member 241 retracts, since the second gripping device 230b is fixed to the short piece 232e2 of the L-shaped member 232e in the state where the distal end portion 232d3 of the lever 232d is raised to be higher than the central portion 232d1, the pinching state of the chuck mechanism is maintained.

In this manner, the function of the switch device 240 is received by the short piece 232e2 to move the main piece 232e1 so that the main piece 232e1 is moved along the fixed claw 232g1 to move the movable claw 232g2. In this manner, the linear movement of the main piece 232e1 can be converted to the gripping forces of the pair of claws 232g1 and 232g2. Therefore, the stator manufacturing apparatus 1 can arrange the coil elements 40 to be aligned in a ring shape by repeating only the simple operations. In addition, the second gripping device 230b and the switch devices 240 have inexpensive, simple, and small-sized configurations.

After the process of step S24, the plurality of gripping devices 230 is biased by the spring 233 so as to be in the state before the coil elements 40 are rotated by 10° to the right side toward the central axis C1 around the rotation shaft 231e parallel to the ring-shaped central axis C1. Therefore, while the coil elements 40 are moved toward the center of the ring shape, the coil elements 40 can be rotated around the rotation shaft 231e parallel to the ring-shaped central axis C1.

In step S25, the stator manufacturing apparatus 1 drives the servo motor 262 of the table driving device 260 to shift only the two teeth 224 of the lower surface of the turntable 220. According to this, the same-type gripping devices 230a and 230b, one of which becomes empty from the first and second gripping devices 230a and 230b completing the gripping of the coil elements 40 and which do not yet grip the coil elements 40, are arranged at the two arrangement points P1 and P2 of the turntable 220.

At this time, when the teeth 224 of the lower surface of the turntable 220 are shifted by 1 tooth, the rollers 231c which are engaged with the recess portions 256 of the plates 255 of the four driving mechanisms 250 at the position different from the two arrangement points P1 and P2 of the turntable 220 are moved from the recess portions 256 in the circumferential direction in accordance with the movement of the gripping devices 230 in the circumferential direction according to the rotation of the turntable 220 so that the engagement of the rollers 231c and the recess portions 256 is released. Next, the gripping devices 230 having the rollers 231c are moved from the four driving mechanisms 250.

In addition, the gripping devices 230 adjacent to the gripping devices 230 which are moved from the four driving mechanisms 250 are moved to the four driving mechanisms 250. Next, the rollers 231c of the gripping devices 230 which are moved to the four driving mechanisms 250 are inserted into the recess portions 256 from the circumferential direction in accordance with the movement of the gripping devices 230 in the circumferential direction according to the rotation of the turntable 220 so that the rollers 231c and the recess portions 256 are engaged with each other.

In step S26, the stator manufacturing apparatus 1 determines whether or not the turntable 220 rotates one time. In the case when it is determined in step S26 that the turntable 220 has rotated one time, since the plurality of coil elements 40 is arranged in a ring shape, the coil element arrangement process S2 is ended. In the case when it is determined in step S26 that the turntable 220 has not yet rotated one time, the process proceeds to step S21.

In this manner, in the coil element arrangement process S2, steps S21 to S24 for allowing the first and second gripping devices 230a and 230b to grip the coil elements 40 and step S25 for integrally rotating the plurality of gripping devices 230 to arrange different gripping devices 230 which do not yet grip the coil elements 40 to the arrangement points P1 and P2 where the coil elements 40 are to be gripped are repeated so that the plurality of coil elements 40 is arranged in a ring shape.

According to this, the gripping devices 230 are rotated by the turntable 220 where the plurality of gripping devices 230 is aligned in a ring shape so that the coil elements 40 are supplied to the same arrangement points P1 and P2 by the robot arms 210a and 210b, and the plurality of coil elements 40 can be arranged to be aligned in a ring shape while gripped by the gripping devices 230.

Therefore, by repeating only simple operations by using inexpensive, simple, and small-sized configurations, the plurality of coil elements 40 can be gripped by the plurality of gripping devices 230.

Coil Element Alignment Process S3

In the coil element alignment process S3, the assembly body 50 is formed by assembling the plurality of coil elements 40.

Figure 20:
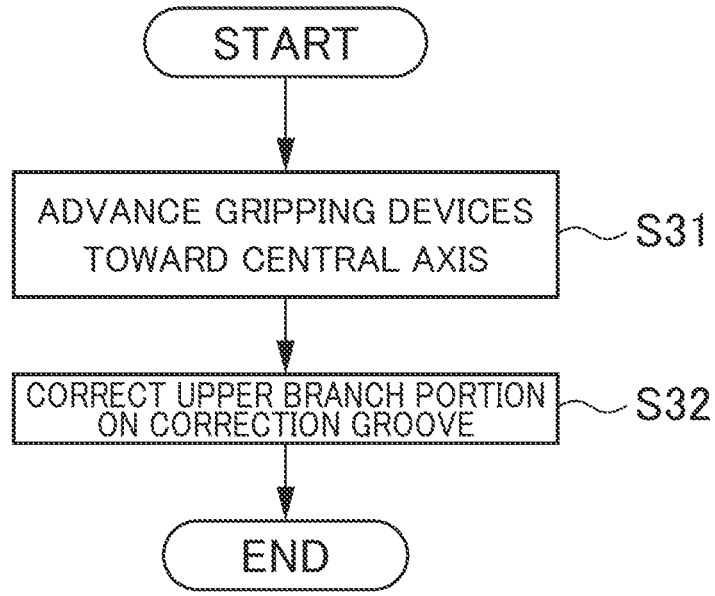
FIG. 20 is a flowchart illustrating operations of a coil element alignment process according to the embodiment.
Figure 21A:
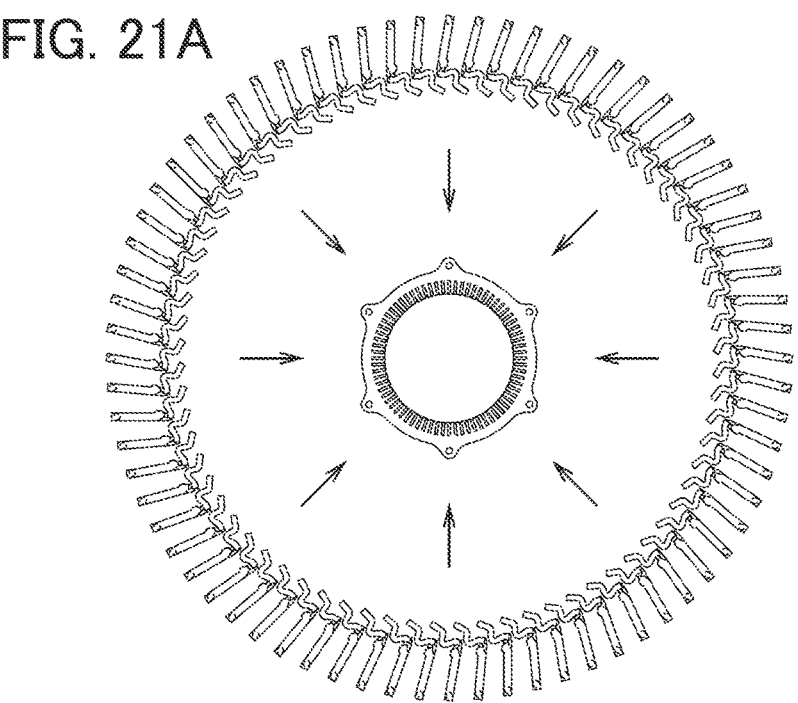
FIGS. 21A to 21C are diagrams illustrating the formation of an assembly body by assembling a plurality of coil elements according to the embodiment.
Figure 21B:
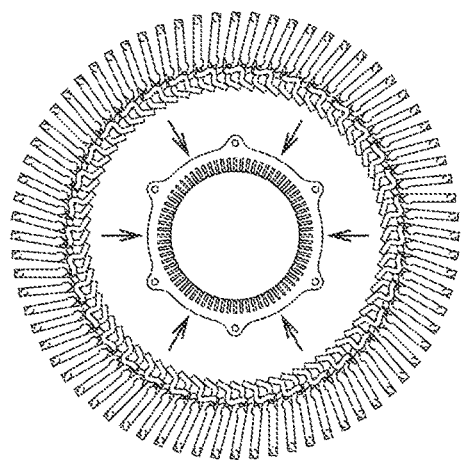
Figure 21C:
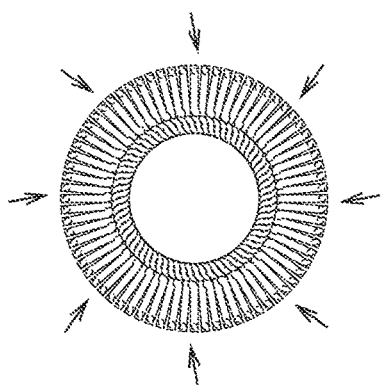

FIG. 20 is a flowchart illustrating the operations of the coil element alignment process S3 according to the embodiment. FIGS. 21A to 21C are diagrams illustrating the formation of the assembly body by assembling the plurality of coil elements 40 according to the embodiment.

As illustrated in FIG. 20, in step S31, the stator manufacturing apparatus 1 drives the servo motors 253 of the four driving mechanisms 250 to move plates 255 mounted on the slide rails 254 in the inner diameter direction. According to this, by applying driving forces to the plurality of gripping devices 230, the plurality of gripping devices 230 are advanced toward the ring-shaped central axis C1. According to this, with respect to the plurality of coil elements 40 arranged in a ring shape, the diameter of the ring shape is reduced from the state of FIG. 21A to the state of FIG. 21B.

In step S32, the stator manufacturing apparatus 1 also drives the servo motors 253 of the four driving mechanisms 250 to move the plates 255 mounted on the slide rails 254 in the inner diameter direction. At this time, before the plurality of gripping devices 230 is assembled toward the ring-shaped central axis C1, the pins 232c of the upper branch portions 232 of the gripping devices 230 are guided to the correction grooves 223. According to this, while the plurality of gripping devices 230 is advanced toward the ring-shaped central axis C1, the upper branch portions 232 of the plurality of gripping devices 230 are corrected by 10° to the left side toward the central axis C1 around the rotation shaft 231e parallel to the ring-shaped central axis C1. As illustrated in FIG. 21C, the corrected upper branch portion 232 corrects the gripped coil element 40 by 10° to the left side toward the central axis C1 around the rotation shaft 231e parallel to the ring-shaped central axis C1 to allow the coil element 40 to be in contact with the inner circumferential guide 342.

The pins 232c are guided on the correction grooves 223 to rotate the upper branch portions 232 gripping the coil elements 40 so that the coil elements 40 are moved toward the center of the ring shape and are rotated around the rotation shaft 231e parallel to the ring-shaped central axis C1.

According to this, since the plurality of coil elements 40 is rotated by 10° to the left side toward the central axis C1 around the rotation shaft 231e parallel to the ring-shaped central axis C1 so that the diameter of the ring shape where the plurality of coil elements 40 is arranged becomes smaller than that of the state where the coil elements 40 are not rotated and the interference between the adjacent coil elements 40 is avoided.

Therefore, when the one-side leg portions 41 of the coil elements 40 are gripped and aligned, the leg portions 41 of the adjacent coil elements 40 do not interfere with each other just before the alignment.

Figure 22A:
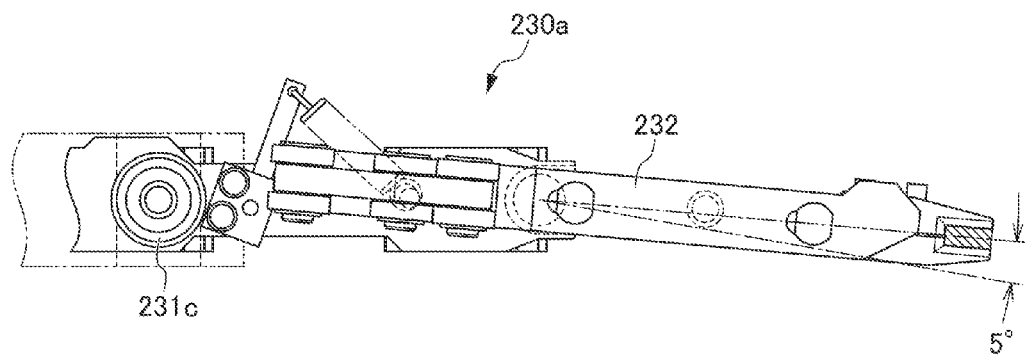
FIGS. 22A and 22B are diagrams illustrating a state where an upper branch portion of the first gripping device according to the embodiment is corrected by 5° to the left side toward the central axis.
Figure 22B:
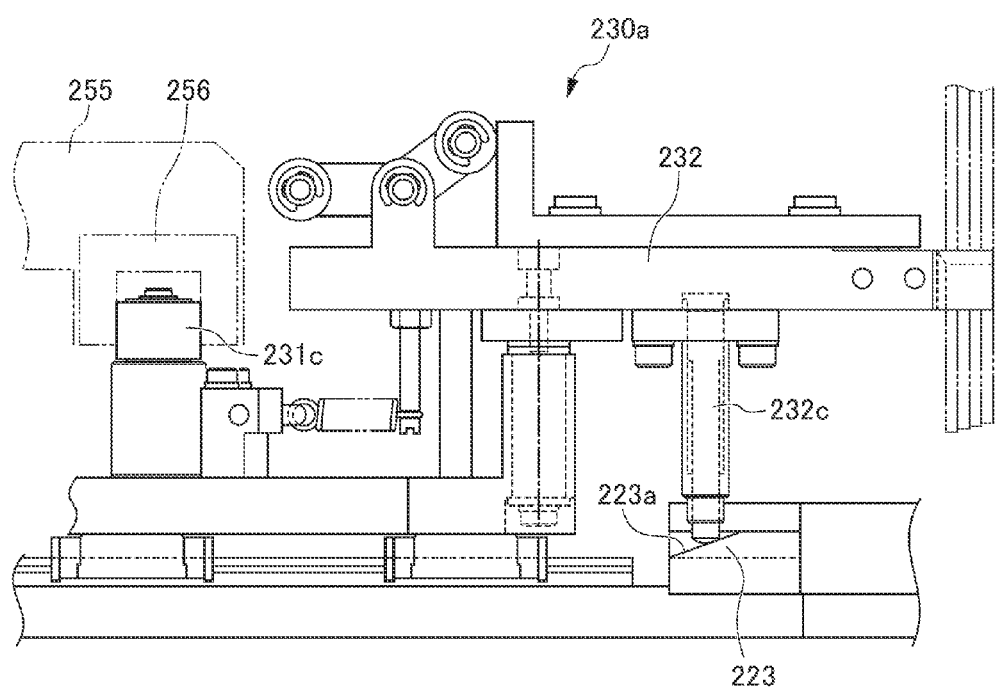
Figure 23A:
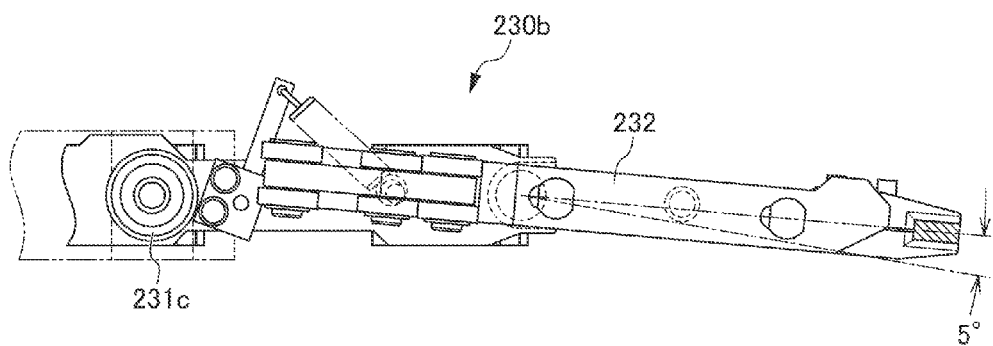
FIGS. 23A and 23B are diagrams illustrating a state where an upper branch portion of the second gripping device according to the embodiment is corrected by 5° to the left side toward the central axis.
Figure 23B:
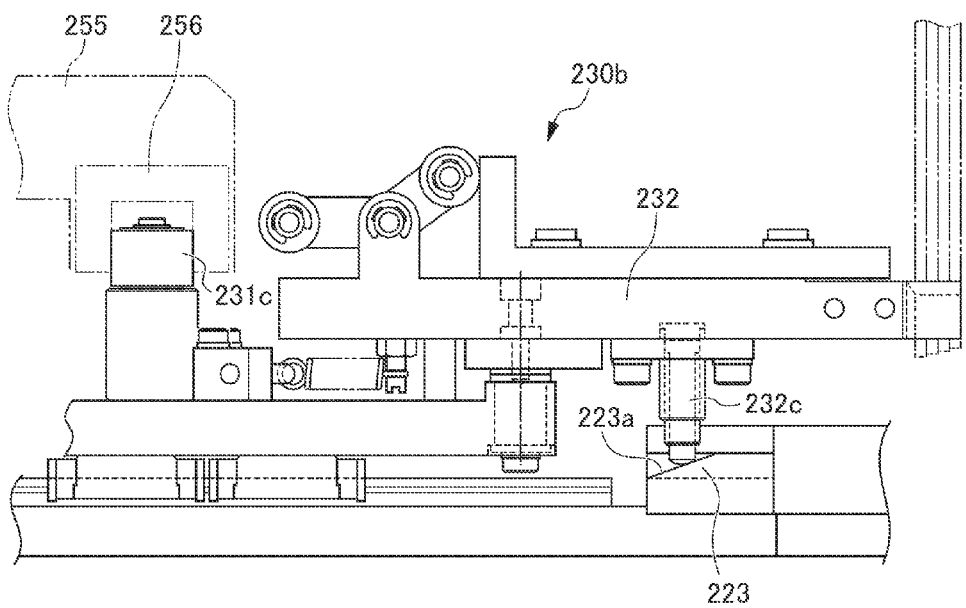

FIGS. 22A and 22B are diagrams illustrating a state where the upper branch portion 232 of the first gripping device 230a according to the embodiment is corrected by 5° to the left side toward the central axis C1. FIGS. 23A and 23B are diagrams illustrating a state where the upper branch portion 232 of the second gripping device 230b according to the embodiment is corrected by 5° to the left side toward the central axis C1.

As illustrated in FIGS. 22A to 23B, when the pins 232c of the upper branch portions 232 of the first and second gripping devices 230a and 230b are guided to the correction grooves 223, the pins 232c ride up on the inclined surfaces 223a and are corrected to the left side toward the central axis C1 by the regulation wall surfaces 223b.

Figure 24A:
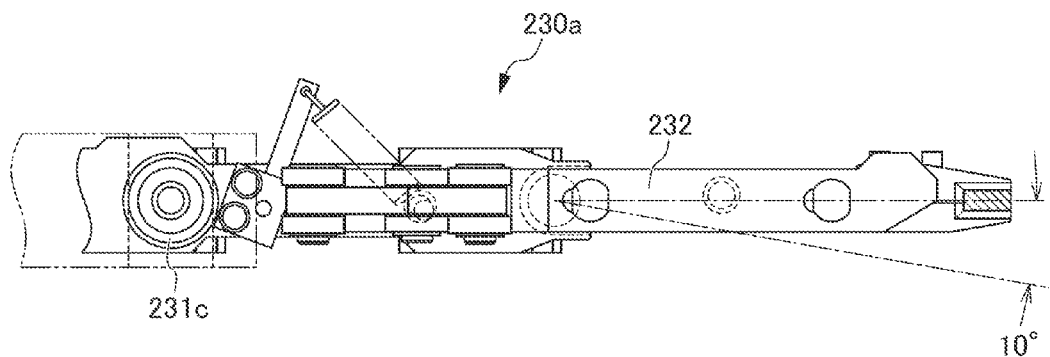
FIGS. 24A and 24B are diagrams illustrating a state where an upper branch portion of the first gripping device according to the embodiment is corrected by 10° to the left side toward the central axis.
Figure 24B:
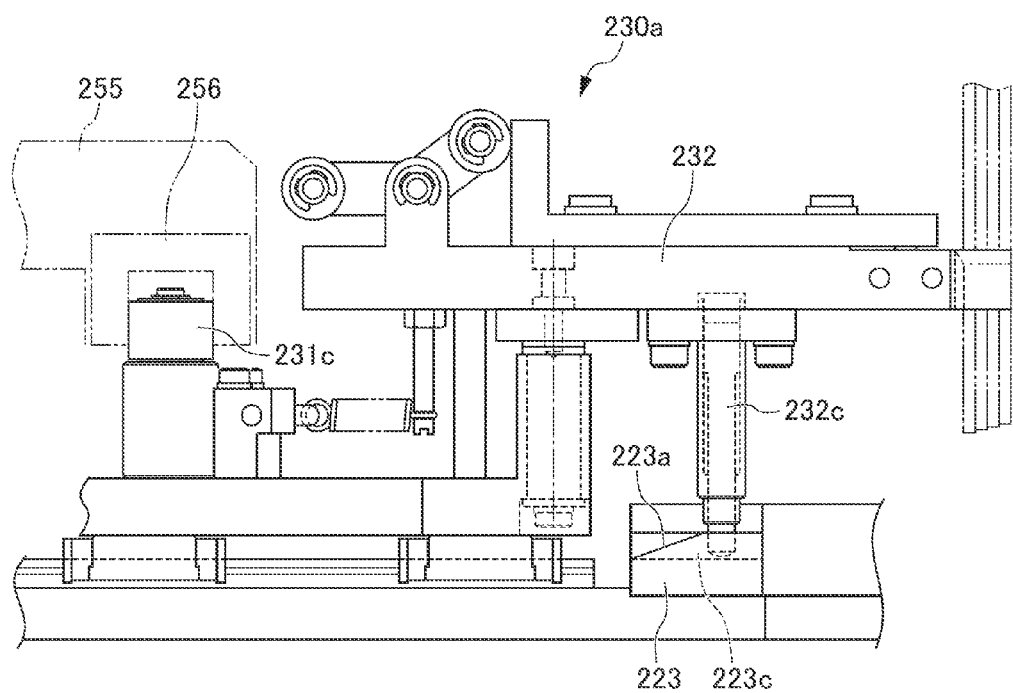
Figure 25A:
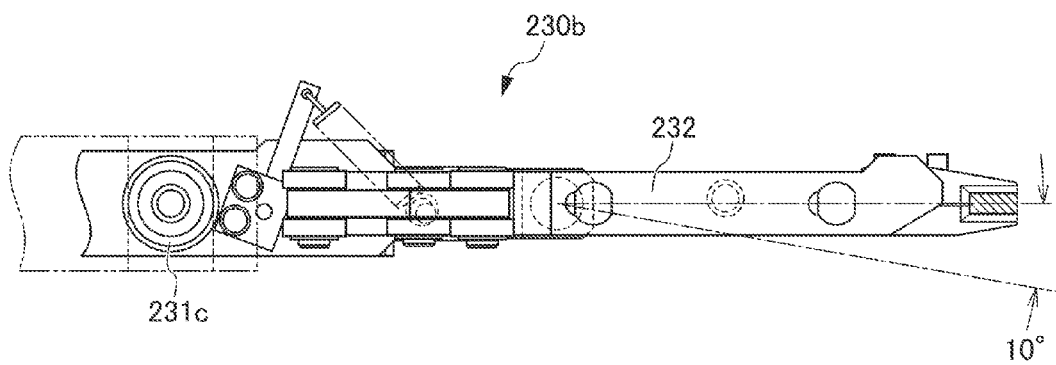
FIGS. 25A and 25B are diagrams illustrating a state where an upper branch portion of the second gripping device according to the embodiment is corrected by 10° to the left side toward the central axis.
Figure 25B:
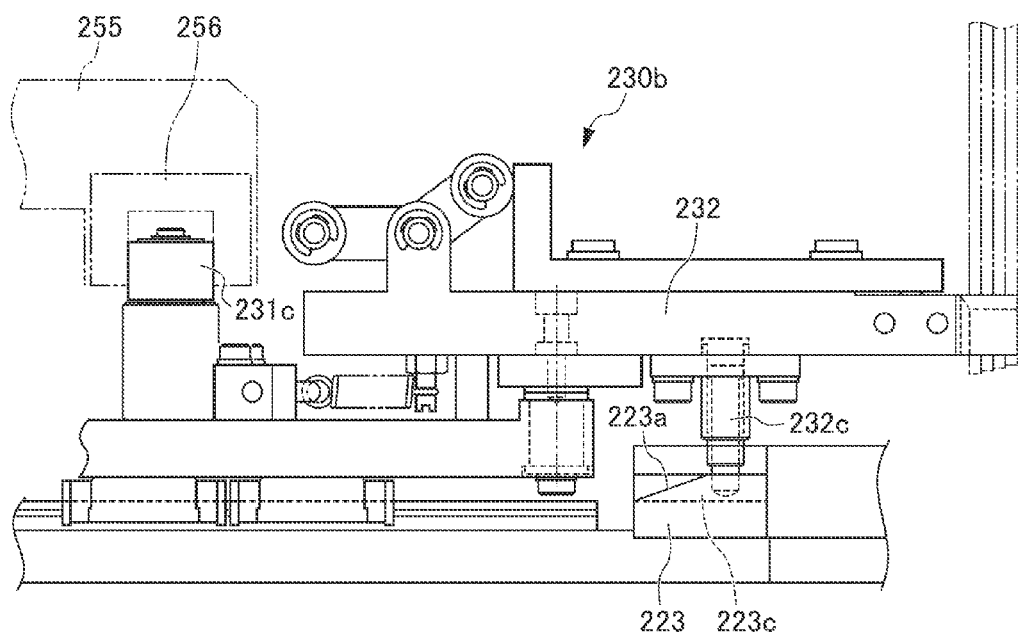

FIGS. 24A and 24B are diagrams illustrating a state where the upper branch portion 232 of the first gripping device 230a according to the embodiment is corrected by 10° to the left side toward the central axis C1. FIGS. 25A and 25B are diagrams illustrating a state where the upper branch portion 232 of the second gripping device 230b according to the embodiment is corrected by 10° to the left side toward the central axis C1.

As illustrated in FIGS. 24A to 25B, when the first and second gripping devices 230a and 230b are moved further in the direction of the central axis C1 in the state where the pins 232c are guided to the correction grooves 223, the pins 232c are corrected by 10° to the left side toward the central axis C1 by the regulation wall surfaces 223b so that the pins 232c fall from the inclined surfaces 223a to the bottom surfaces 223c. According to this, the first and second gripping devices 230a and 230b rotate the gripped coil elements 40 to be assembled by 10° toward the central axis C1 while maintaining the state where the upper branch portions 232 are corrected by 10° to the left side toward the central axis C1. At this time, the upper branch portion 232 and the main body 231 are connected to each other so as to be straight along the radial direction, and the coil elements can be assembled without interference between the adjacent gripping devices 230.

Figure 26A:
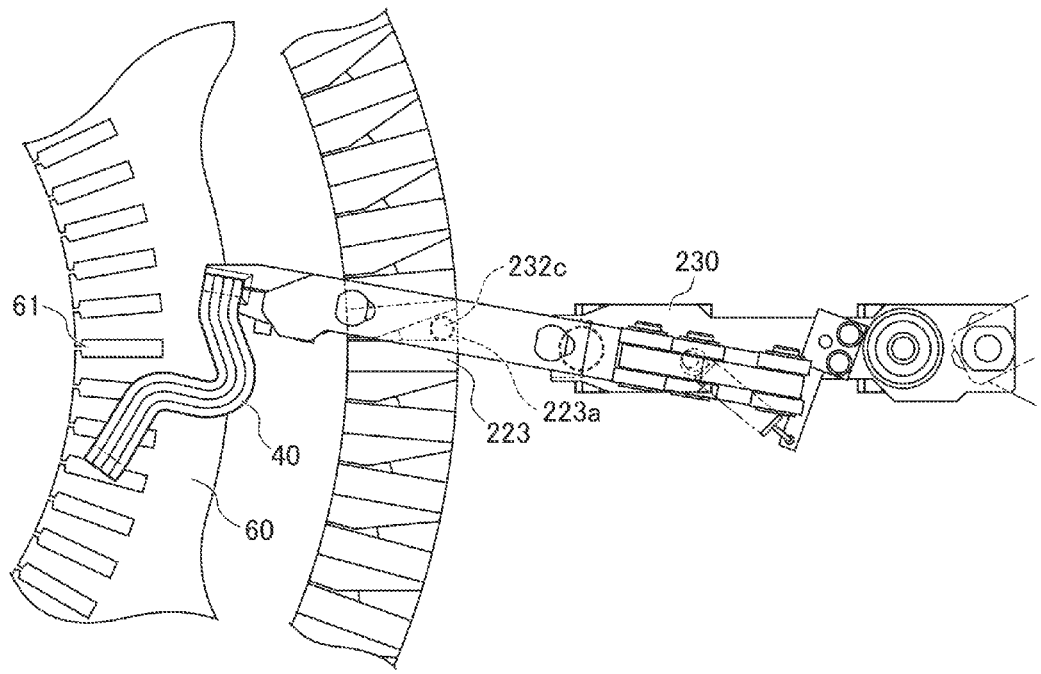
FIGS. 26A and 26B are diagrams illustrating states before and after rotation of the coil element according to the embodiment.
Figure 26B:
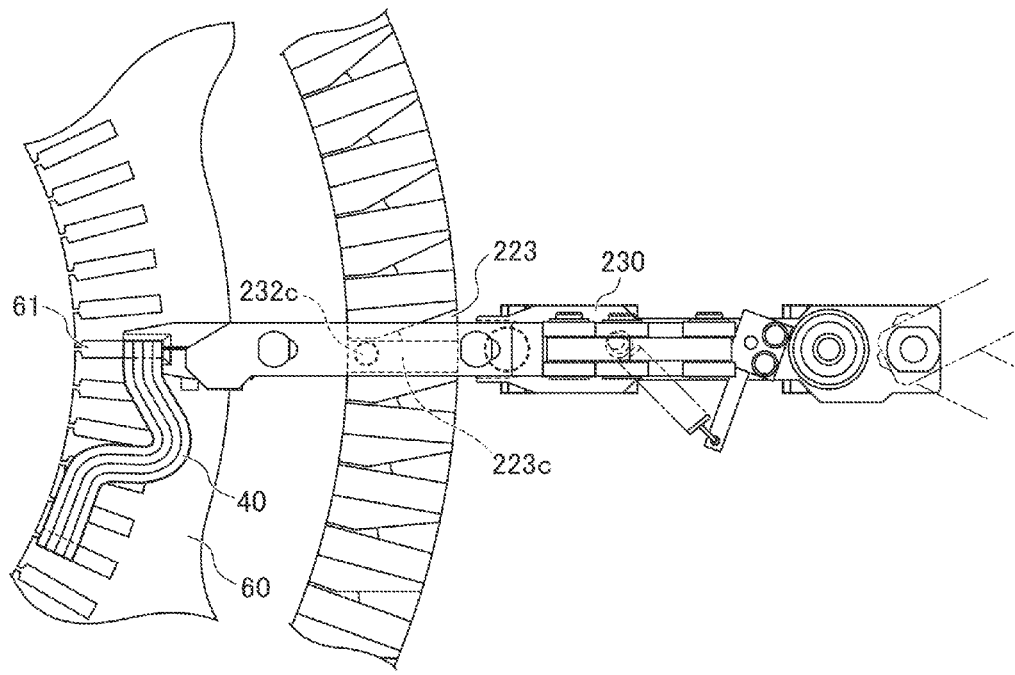

FIGS. 26A and 26B are diagrams illustrating the states before and after the rotation of the coil element 40 according to the embodiment.

In this manner, with respect to each of the plurality of coil elements 40, the plurality of coil elements 40 is moved in the direction of reducing the diameter of the ring shape so that the plurality of coil elements 40 is aligned in the state where the turn portions 42 installed at substantially apex portions alternately overlap each other. At this time, as seen from the state before the rotation illustrated in FIG. 26A and the state after the rotation illustrated in FIG. 26B, the coil elements 40 are arranged in the state where the coil elements 40 are rotated by 10° to the left side toward the central axis C1 around the rotation shaft 231e parallel to the ring-shaped central axis C1.

Figure 27A:
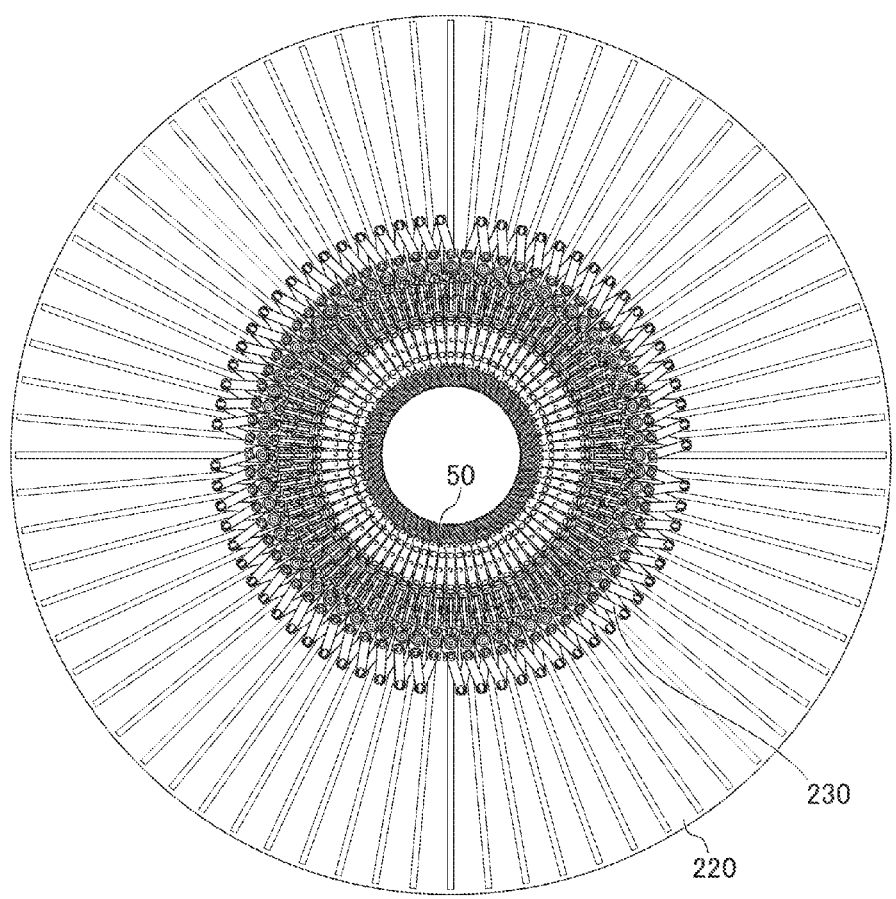
FIGS. 27A and 27B are diagrams illustrating a state where the assembly body according to the embodiment is formed.
Figure 27B:
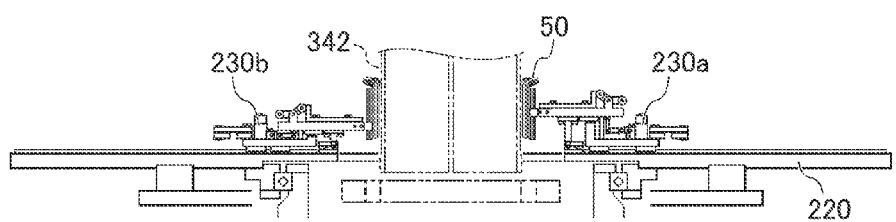

FIGS. 27A and 27B are diagrams illustrating the state where the assembly body 50 according to the embodiment is formed.

As illustrated in FIGS. 27A and 27B, the assembly body 50 is formed in a ring shape in the state where the turn portions 42 of the plurality of coil elements 40 alternately overlap each other and are in contact with the inner circumferential guide 342 at the inner diameter side.

Coil Element Insertion Process

In the coil element insertion process S4, the leg portions 41 of the coil elements 40 of the assembly body 50 are inserted into the respective slots 61 of the stator core 60.

FIG. 28 is a flowchart illustrating the operations of the coil element insertion process S4 according to the embodiment.

Figure 29:
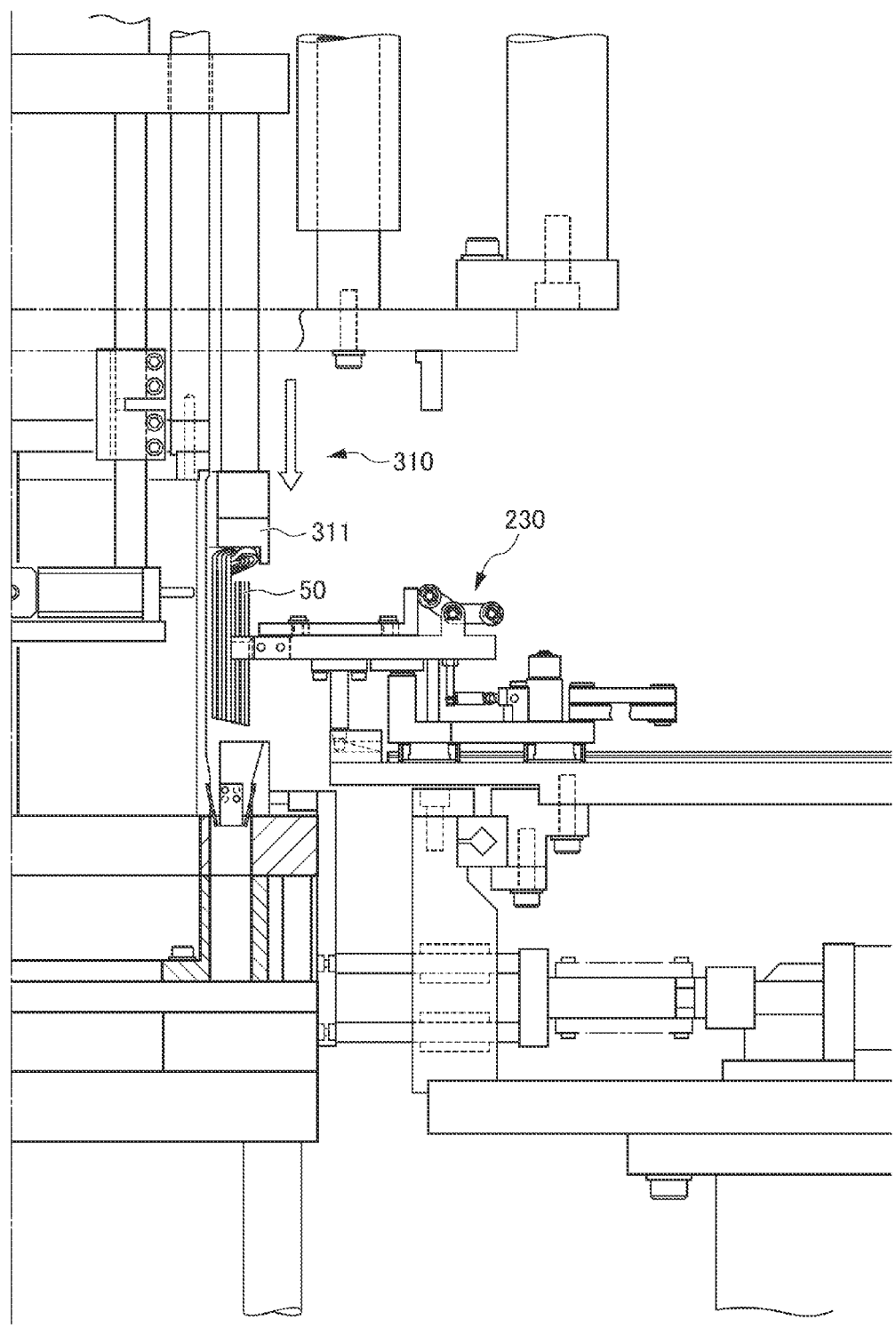
FIG. 29 is a diagram illustrating a state where a pushing-down member according to the embodiment is lowered.

FIG. 29 is a diagram illustrating the state where the pushing-down member 311 according to the embodiment is lowered.

As illustrated in FIG. 29, in step S41, the stator manufacturing apparatus 1 drives the piston of a cylinder mechanism 350 for the coil element pushing-down mechanism to lower the pushing-down member 311 of the coil element pushing-down mechanism 310 so that the lower surface of the pushing-down member 311 is in contact with the assembly body 50.

Figure 30:
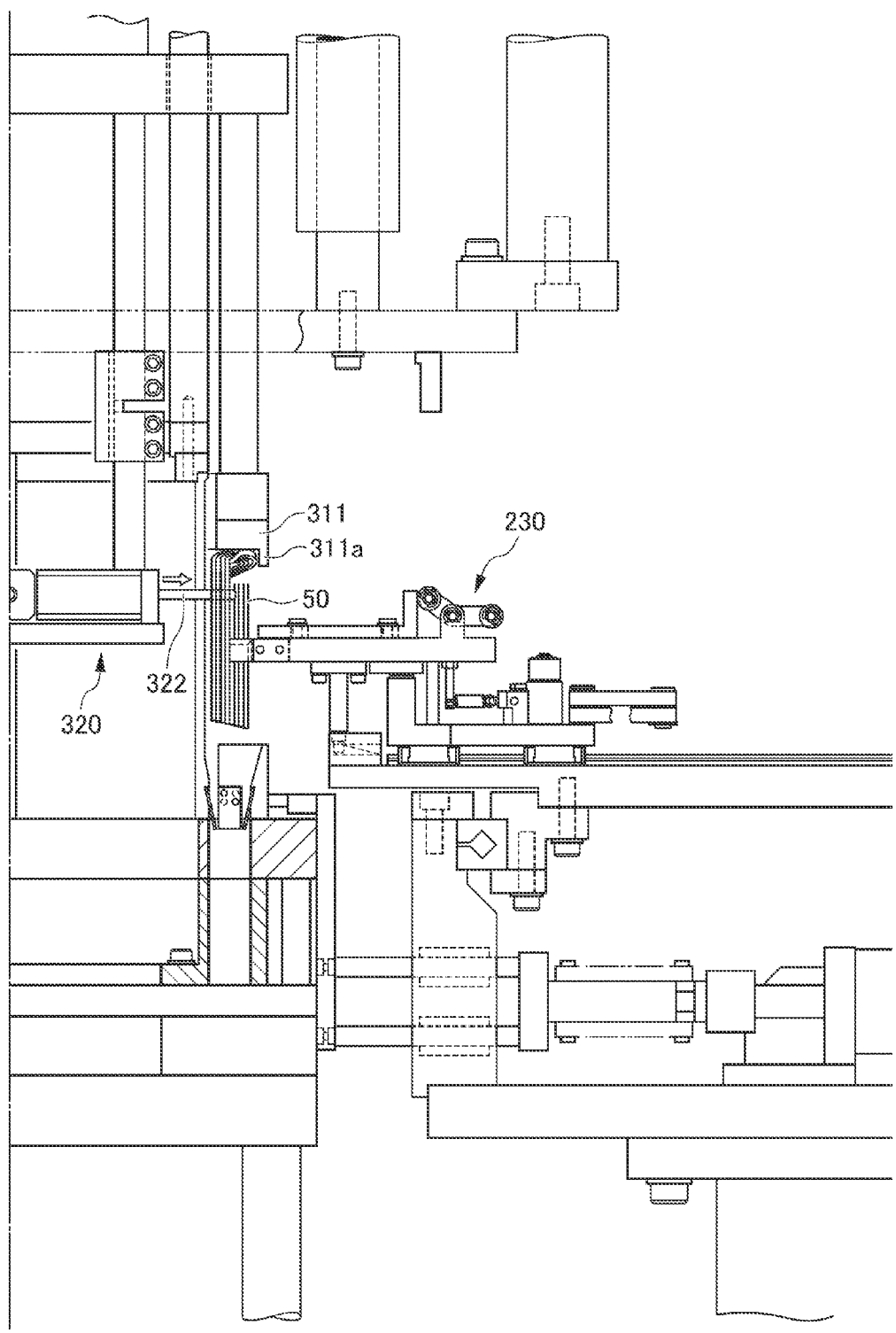
FIG. 30 is a diagram illustrating a state where a pin according to the embodiment protrudes.

FIG. 30 is a diagram illustrating the state in which the pin 322 according to the embodiment protrudes.

As illustrated in FIG. 30, in step S42, when the lower surface of the lowered pushing-down member 311 is in contact with the assembly body 50, the stator manufacturing apparatus 1 allows the pins 322 of the pin protruding mechanism 320 to protrude. According to this, the four pins 322 protrude in the outer diameter direction, are in contact with the lower portions of the turn portions 42 of predetermined coil elements 40 of the assembly body 50, and insert the turn portions 42 into spaces with respect to the pushing-down member 311, and the assembly body 50 can be supported by supporting the turn portions 42 from the lower portions by using the shapes of the turn portions 42. In addition, since the assembly body 50 is supported by supporting the turn portions 42 from the lower portions, the leg portions 41 of the coil elements 40 of the assembly body 50 are in the free state.

In the case when the lower surface of the lowered pushing-down member 311 is in contact with the assembly body 50, the pins 322 of the pin protruding mechanism 320 protrude so that the pins 322 protrude at the optimal timing when the pins are in contact with the lower portions of the turn portions 42 of predetermined coil elements 40 of the assembly body 50.

At this time, the lower surface of the lowered pushing-down member 311 is in contact with the assembly body 50 so that the annular projection 311a of the lower surface of the pushing-down member 311 guides the outer circumferential side of the turn portions 42 of the coil elements 40 of the assembly body 50 from the outer diameter side. In this manner, in the case when the four pins 322 protrude in the outer diameter direction, since the annular projection 311a of the lower surface of the pushing-down member 311 guides the turn portions 42 of the coil elements 40 of the assembly body 50 from the outer diameter side, although the protruded pins 322 press the assembly body 50 to the outer diameter side, the shape of the assembly body 50 can be maintained.

Figure 31:
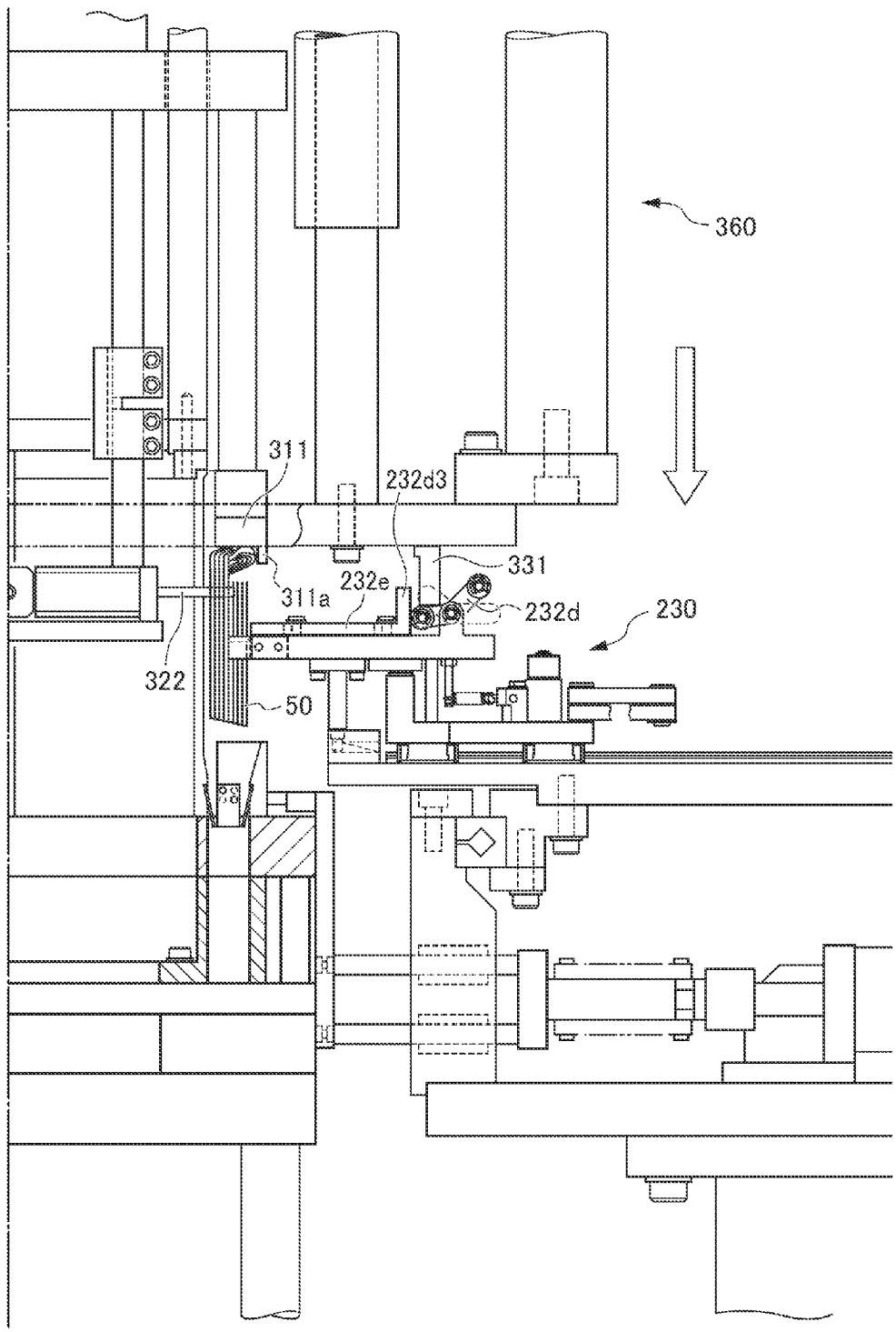
FIG. 31 is a diagram illustrating a state where the grip on the coil elements with the plurality of gripping devices according to the embodiment is simultaneously released.

FIG. 31 is a diagram illustrating the state where the gripping of the plurality of gripping devices 230 according to the embodiment on the coil elements 40 is simultaneously released.

As illustrated in FIG. 31, in step S43, the stator manufacturing apparatus 1 drives the pistons of the two cylinder mechanisms 360 for the lever pushing-down mechanism to lower the plurality of pushing-down pins 331 of the lever pushing-down mechanism 330 so that the distal end portions 232d3 of the levers 232d of the plurality of gripping devices 230 are simultaneously pushed down by the plurality of pushing-down pins 331. According to this, the plurality of gripping devices 230 simultaneously releases the grip on the coil elements 40.

More specifically, when the distal end portions 232d3 of the levers 232d of the plurality of gripping devices 230 are simultaneously pushed down by the plurality of pushing-down pins 331, the distal end portions 232d3 of the levers 232d are lowered so that the L-shaped member 232e is moved to the distal end side against the spring 232f. According to this, the long hole 232h of the L-shaped member 232e is moved to the distal end side so that the protrusion 232i of the movable claw 232g2 is arranged at the base end side which is shifted to the left toward the central axis C1 of the long hole 232h. Next, the movable claw 232g2 is pressed to the right side wall surface of the long hole 232h so that the chuck mechanism of the pair of claws 232g1 and 232g2 is in the opened state, and thus, the one-side leg portion 41 of the coil element 40 is released.

After the plurality of pushing-down pins 331 simultaneously pushes down the distal end portions 232d3 of the levers 232d of the plurality of gripping devices 230, the stator manufacturing apparatus 1 drives the pistons of the two cylinder mechanisms 360 for the lever pushing-down mechanism to lower the plurality of pushing-down pins of the lever pushing-down mechanism 330. When the plurality of pushing-down pins 331 is lowered, since the plurality of gripping devices 230 is fixed to the short piece 232e2 of the L-shaped member 232e in the state where the distal end portion 232d3 of the lever 232d is lowered to be lower than the central portion 232d1, the open state of the chuck mechanism is maintained.

Next, while the turn portions 42 of the coil elements 40 of the assembly body 50 are guided from the outer diameter side to the annular projection 331a of the lower surface of the pushing-down pins 331, the assembly body 50 is supported by the four pins 322.

Figure 32:
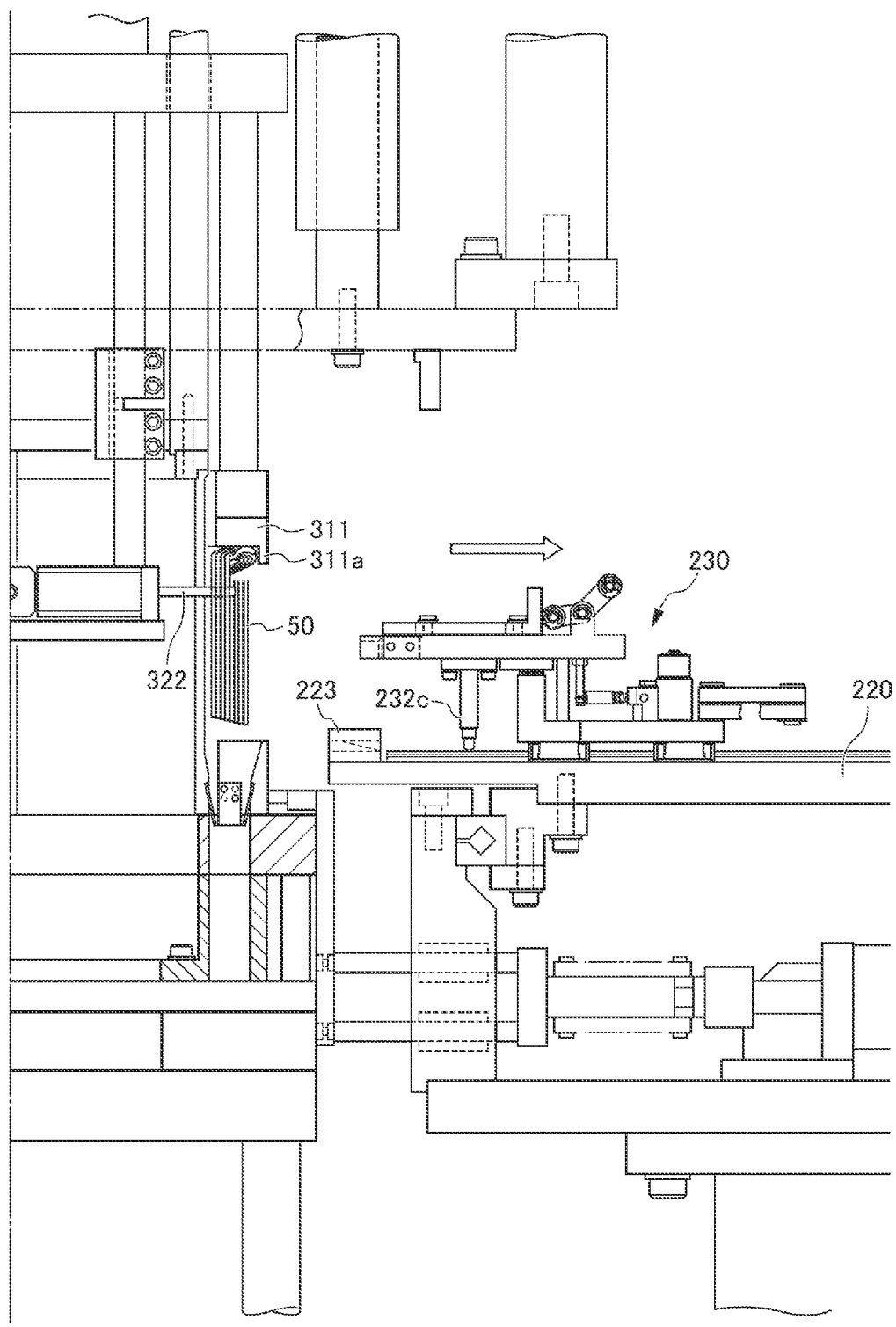
FIG. 32 is a diagram illustrating a state where the plurality of gripping devices according to the embodiment recedes in the outer diameter direction.

FIG. 32 is a diagram illustrating the state where the plurality of gripping devices 230 according to the embodiment is retracted in the outer diameter direction.

As illustrated in FIG. 32, in step S44, the stator manufacturing apparatus 1 drives the servo motors 253 of the four driving mechanisms 250 to move the plates 255 mounted on the slide rails 254 in the outer diameter direction so as to exert the driving force to the plurality of gripping devices 230 so that the plurality of gripping devices 230 retracts in the outer diameter direction to be dispersed.

At this time, when the pin 232c of each of the gripping devices 230 is extracted from the correction groove 223 in the outer diameter direction in the state where the pin is arranged on the bottom surface 223c of the correction groove 223 to be corrected to the side wall of the inclined surface 223a, the pin 232c of each of the gripping devices 230 is returned to the state where the upper branch portion 232 is shifted to the right toward the central axis C1 with respect to the main body 231 due to the bias of the spring 233. In this manner, the plurality of gripping devices 230 is retracted in the outer diameter direction while maintaining the state of being corrected by the correction grooves 223 in the meantime so that the interference between the adjacent gripping devices 230 does not occur when the plurality of assembled gripping devices 230 is retracted in the outer diameter direction.

Figure 33:
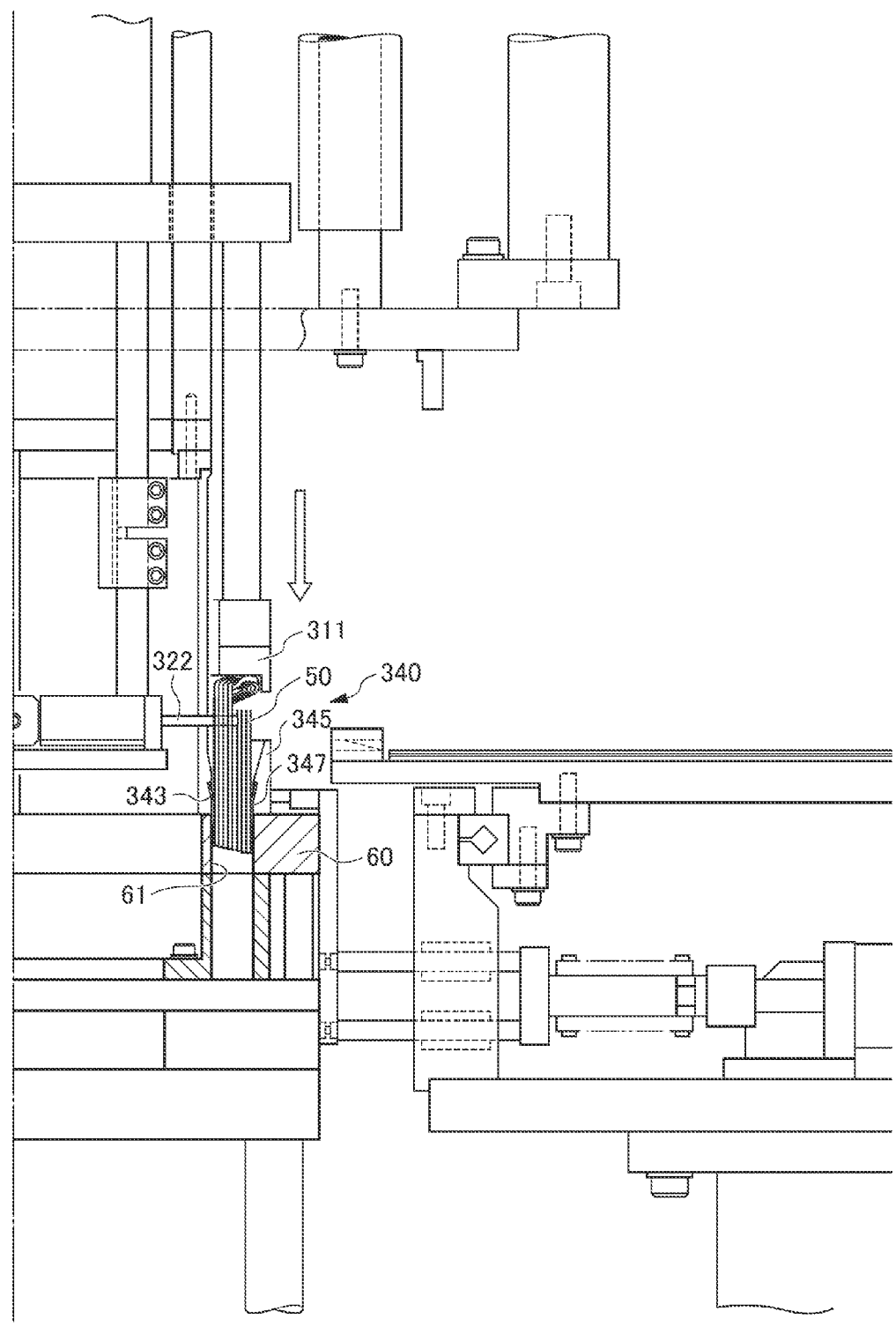
FIG. 33 is a diagram illustrating a state where the leg portions of the coil elements of the assembly body according to the embodiment are inserted into the respective slots of the stator core.

FIG. 33 is a diagram illustrating a state where the leg portions 41 of the coil elements 40 of the assembly body 50 according to the embodiment are inserted into the respective slots 61 of the stator core 60.

As illustrated in FIG. 33, in step S45, the stator manufacturing apparatus 1 lowers the assembly body 50 by using the lowered pushing-down member 311 to guide the leg portions 41 of the coil elements 40 of the assembly body 50 to the guiding plate 343, a pair of the first spreader plates 346, and the second spreader plate 347 so as to insert the leg portions 41 into the respective slots 61 of the stator core 60. In other words, the lower end portions of the guiding plate 343, a pair of the first spreader plates 346, and the second spreader plate 347 are already inserted into the slots 61 of the stator core 60 installed in the stator core installation process S1, in which the insulating sheets 62 are disposed. Next, when the assembly body 50 is lowered by the lowered pushing-down member 311, the leg portions 41 of the coil elements 40 of the assembly body 50 are guided to the guiding plate 343, a pair of the first spreader plates 346, and the second spreader plate 347. According to this, the leg portions 41 of the coil elements 40 of the assembly body 50 are inserted into the respective slots 61 of the stator core 60 without rolling-up of the insulating sheets 62.

FIGS. 34A to 34C are diagrams for explaining the operations of the guiding plate 343, a pair of the first spreader plates 346, and the second spreader plate 347 according to the embodiment and are diagrams as the guiding portions 345 are seen from the inner diameter direction.

As illustrated in FIG. 34A, since the guiding portion 345 has a tapered structure 345a which is spread in the direction opposite to the insertion direction, even in the case when the position of the leg portion 41 of the coil element 40 and the position of the guiding portion 345 are somewhat shifted from each other, the leg portion 41 of the coil element 40 is securely guided between the guiding plate 343, a pair of the first spreader plates 346, and the second spreader plate 347.

Next, as illustrated in FIG. 34B, the leg portion 41 of the coil element 40 is inserted between the guiding plate 343, a pair of the first spreader plates 346, and the second spreader plate 347.

Next, as illustrated in FIG. 34C, when the leg portion 41 of the coil element 40 is inserted into the lower end portions of the guiding plate 343, a pair of the first spreader plates 346, and the second spreader plate 347, the lower end sides of the guiding plate 343, a pair of the first spreader plates 346, and the second spreader plate 347 are spread. According to this, the space between the end portions of the insulating sheet 62 is spread, and in this state, the leg portion 41 of the coil element 40 is inserted into the slot 61.

FIGS. 35A to 35C are diagrams for explaining the operations of the guiding plate 343, a pair of the first spreader plates 346, and the second spreader plate 347 according to the embodiment and is a plan view illustrating the vicinity of the slot 61.

As illustrated in FIG. 35A, the insulating sheets 62 are arranged inside the slots 61 in advance.

Next, as illustrated in FIG. 35B, if the guiding portions 345 are assembled at the end time of the previous stator manufacturing, the guiding portions 345 are arranged on the slots 61. At this time, the gaps of the lower end sides of the guiding plate 343, a pair of the first spreader plates 346, and the second spreader plate 347 are narrow.

Next, as illustrated in FIG. 35C, when the leg portion 41 of the coil element 40 is guided by the guiding portion 345 to be inserted between the guiding plate 343, a pair of the first spreader plates 346, and the second spreader plate 347, the lower end sides of the guiding plate 343, a pair of the first spreader plates 346, and the second spreader plate 347 are spread so that the end portion of the insulating sheet 62 is spread.

As a result, the end portion of the insulating sheet 62 is spread so that the leg portion of the coil element 40 is securely inserted into the slot 61.

Herein, as illustrated in FIG. 33, when the leg portions 41 of the coil elements 40 of the assembly body 50 are inserted into the respective slots 61 of the stator core 60, the annular projection 311a of the lower surface of the pushing-down member 311 guides the outer circumferential portion of the turn portions 42 of the coil elements 40 of the assembly body 50 from the outer diameter side. In this manner, while the annular projection 311a of the lower surface of the pushing-down member 311 guides the outer circumferential side of the turn portions 42 of the coil elements 40 of the assembly body 50 from the outer diameter side, the leg portions 41 of the coil elements 40 of the assembly body 50 are inserted into the respective slots 61 of the stator core 60 so that the shape of the assembly body 50 can be maintained even when insertion resistance occurs in the case when the lower end sides of the guiding plate 343, a pair of the first spreader plates 346, and the second spreader plate 347 are spread.

Figure 36:
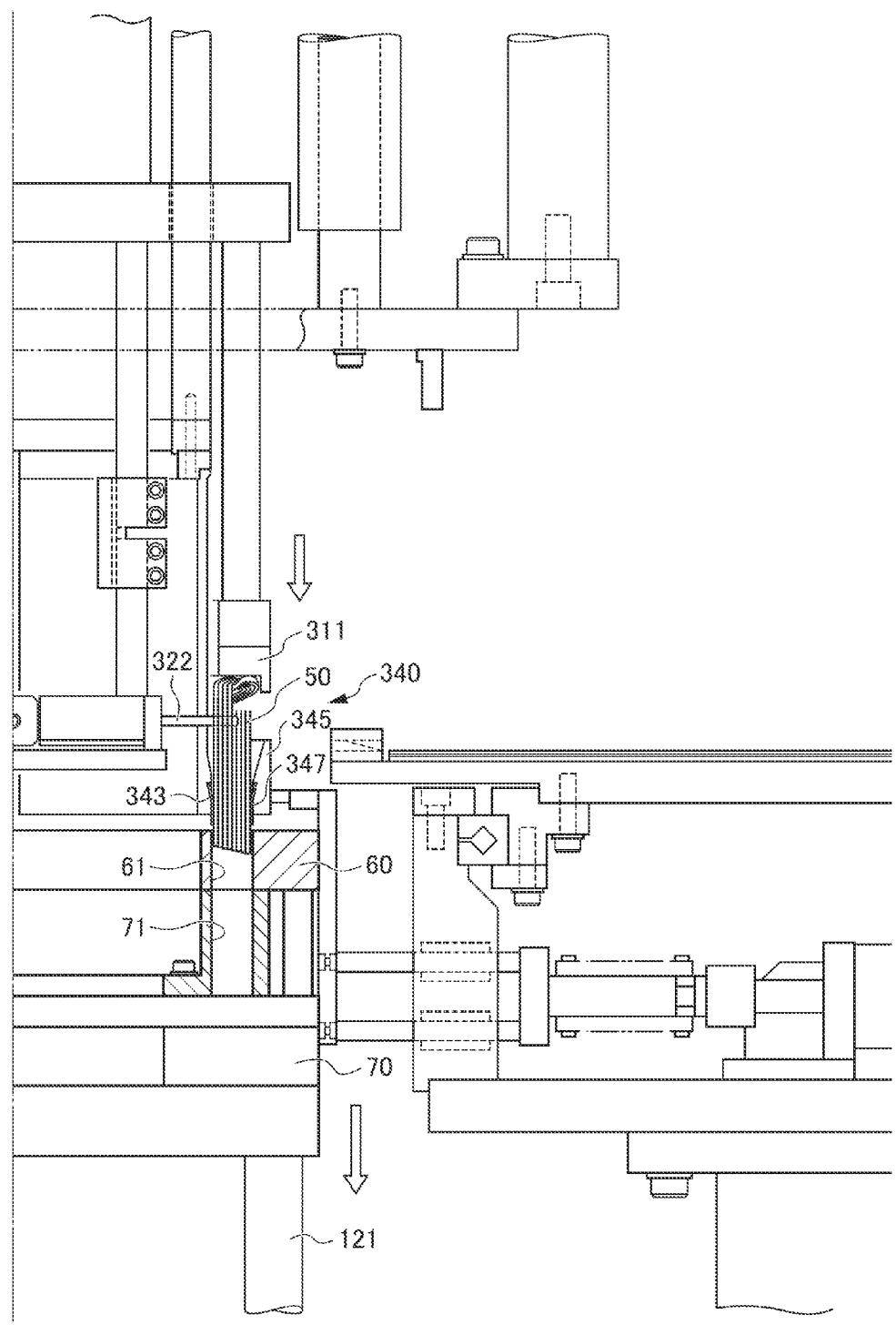
FIG. 36 is a diagram illustrating a state where the stator core according to the embodiment is lowered.

FIG. 36 is a diagram illustrating a state where the stator core 60 according to the embodiment is lowered.

As illustrated in FIG. 36, in step S46, the stator manufacturing apparatus 1 lowers the assembly body 50 by using the pushing-down member 311 while lowering the four rods 121 of the lift mechanism 120 so that the stator core 60 where the leg portions 41 are inserted into the respective slots 61 is also lowered. According to this, the lower end portions of the guiding plate 343, a pair of the first spreader plates 346, and the second spreader plate 347 are extracted from the lowering stator core 60 to be exposed.

Figure 37:
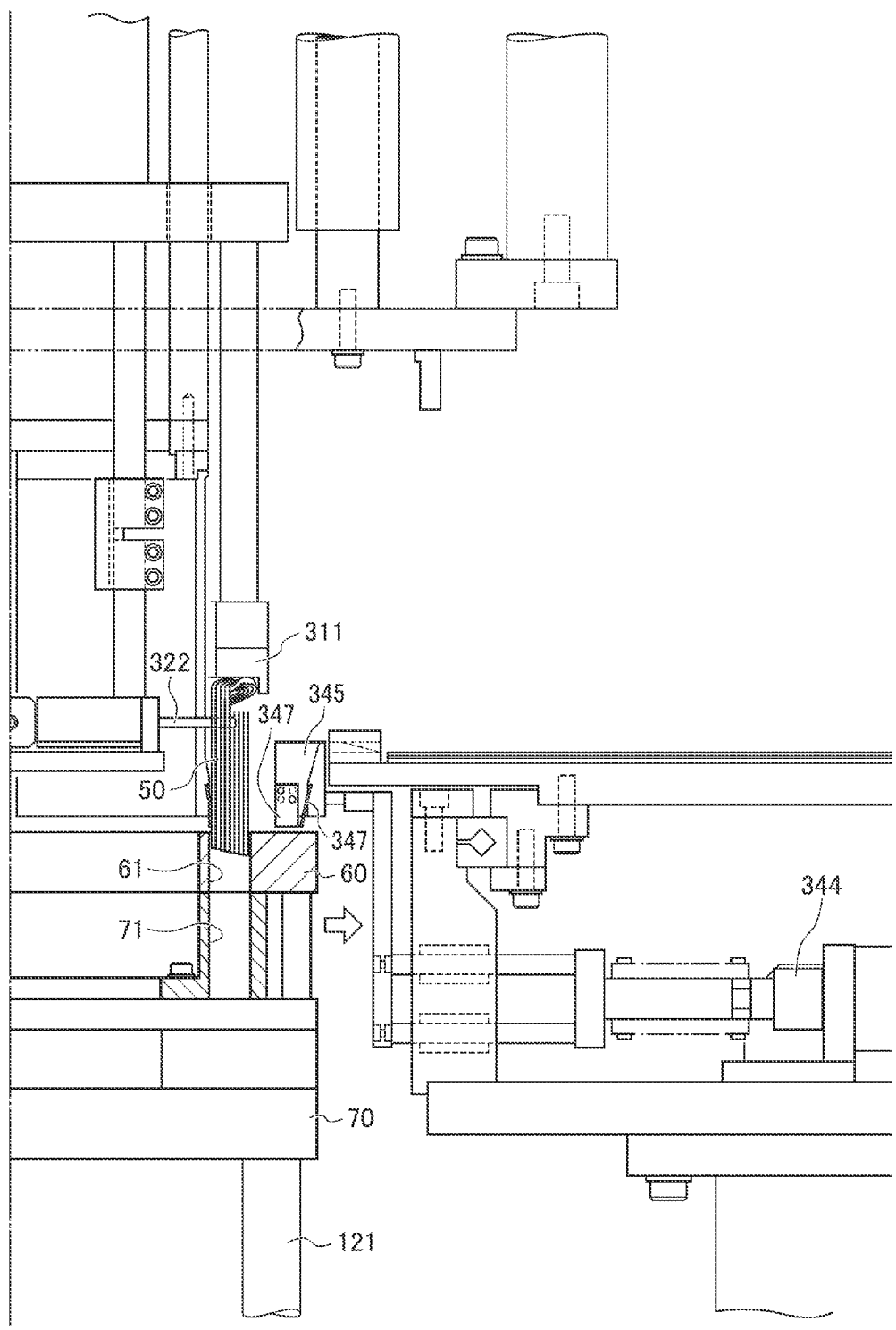
FIG. 37 is a diagram illustrating a state where the guiding portion according to the embodiment is retracted to the outer diameter side.

FIG. 37 is a diagram illustrating the state where the guiding portion 345 according to the embodiment is retracted to the outer diameter side.

As illustrated in FIG. 37, in step S47, when the lower end portions of the guiding plate 343, a pair of the first spreader plates 346, and the second spreader plate 347 are extracted from the lowering stator core 60 to be exposed, the stator manufacturing apparatus 1 drives the piston of the cylinder mechanism to slide the guiding portion 345 in the outer diameter direction so that the guiding portion 345 is retracted from the descending locus range of the assembly body 50 to the outer diameter side.

Figure 38:
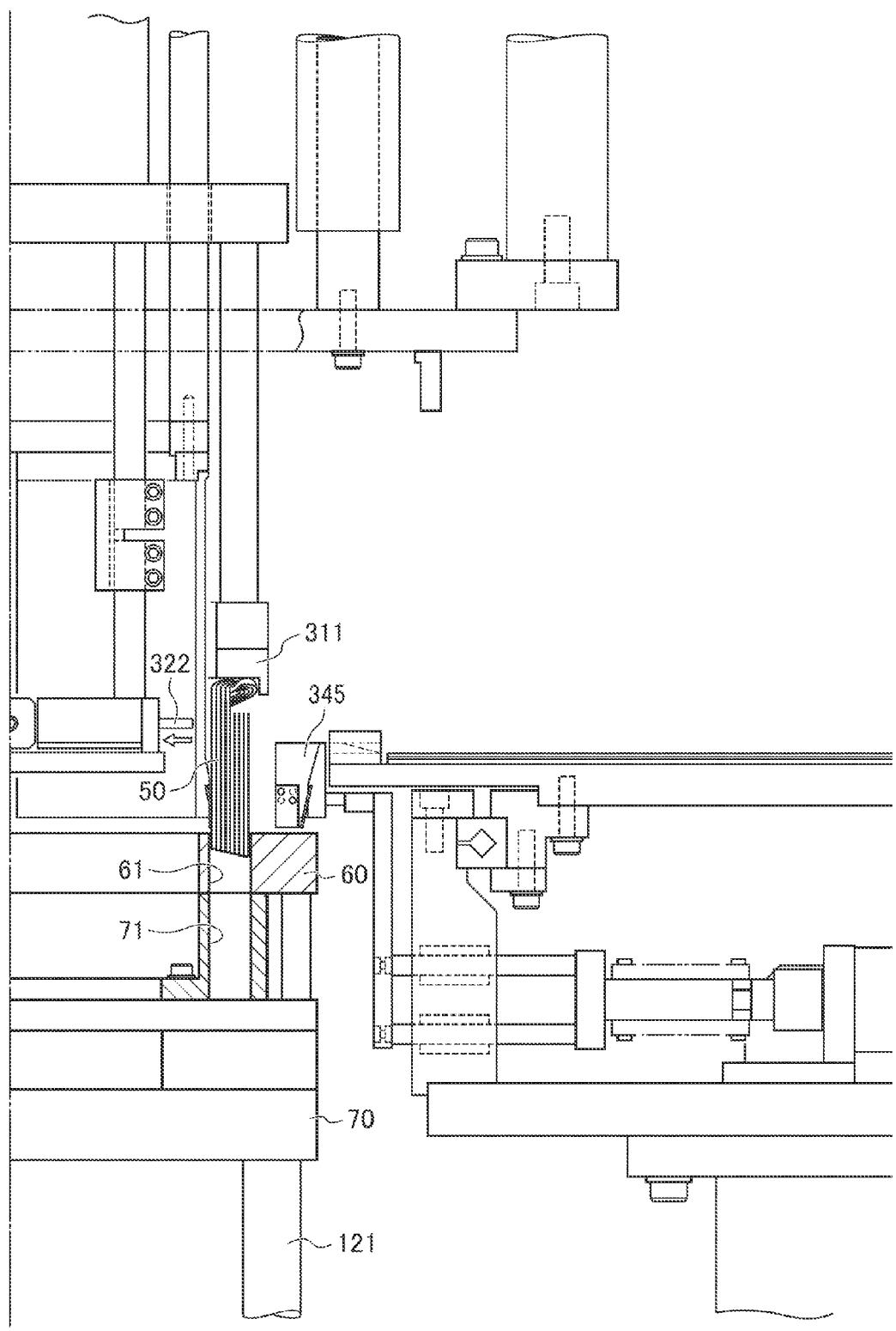
FIG. 38 is a diagram illustrating a state where the pin according to the embodiment is retracted in the inner diameter direction.

FIG. 38 is a diagram illustrating the state where the pin 322 according to the embodiment is retracted in the inner diameter direction.

As illustrated in FIG. 38, in step S48, the stator manufacturing apparatus 1 retracts the pin 322 protruded in order to support the assembly body 50 in the inner diameter direction. According to this, the assembly body 50 is in the state where the turn portions 42 of the coil elements 40 of the assembly body 50 are guided from the outer diameter side to the annular projection 311a of the lower surface of the pushing-down member 311 and the leg portions 41 are inserted into the respective slots 61 of the stator core 60.

Figure 39:
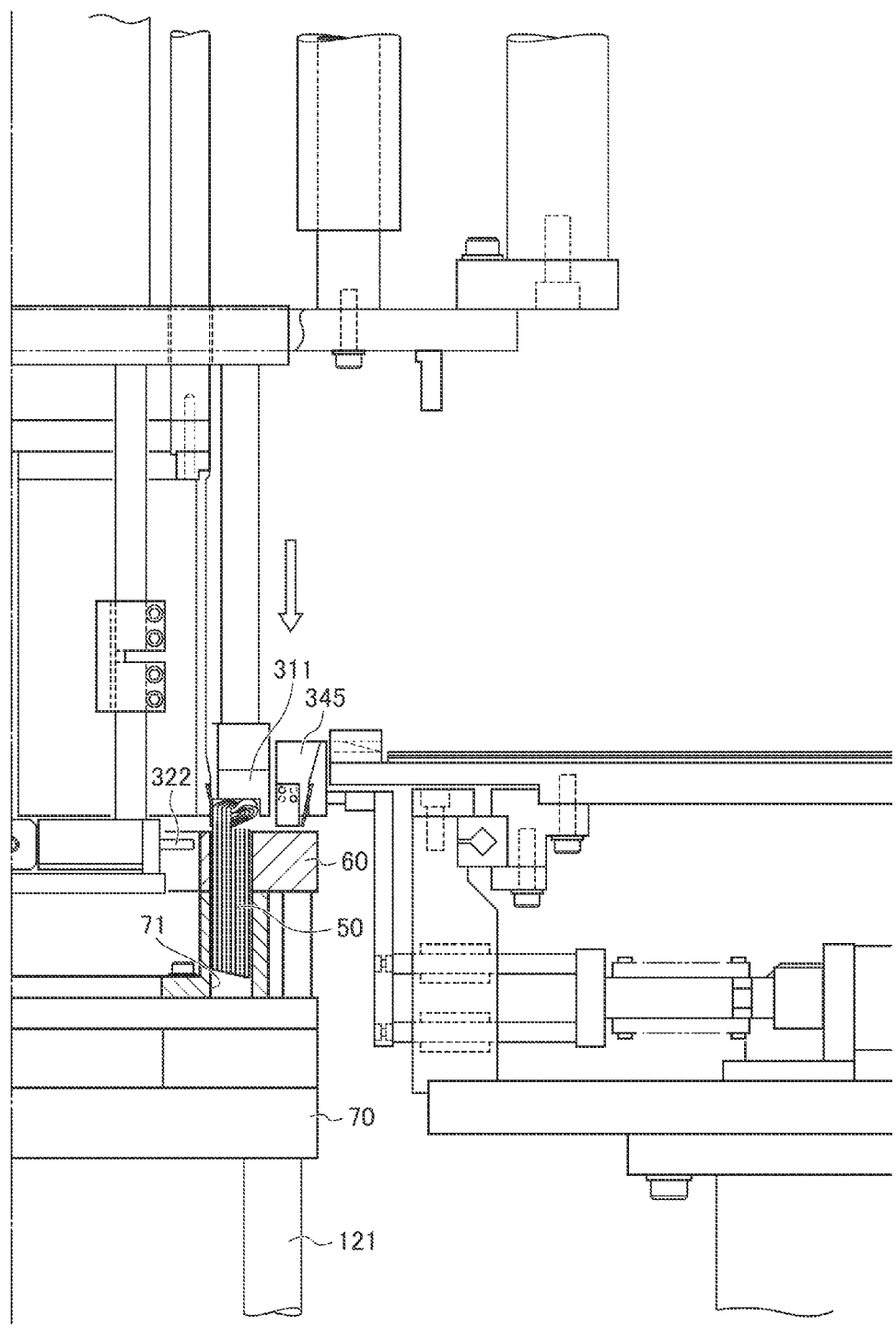
FIG. 39 is a diagram illustrating a state where the leg portions of the coil elements of the assembly body according to the embodiment are completely inserted into the respective slots of the stator core.

FIG. 39 is a diagram illustrating the state where the leg portions 41 of the coil elements 40 of the assembly body 50 according to the embodiment are completely inserted into the respective slots 61 of the stator core 60.

As illustrated in FIG. 39, in step S49, the stator manufacturing apparatus 1 completely inserts the leg portions 41 of the coil elements 40 of the assembly body 50 into the respective slots 61 of the stator core 60 by lowering the assembly body 50 by using the pushing-down member 311 which lowers the four rods 121 of the lift mechanism 120 while fixing the four rods 121.

At this time, the pushing-down member 311 is lowered along the inner diameter side of the guiding portion 345 retracted in the outer diameter direction.

Accordingly, the stator where the leg portions 41 of the plurality of coil elements 40 are inserted into the respective slots 61 of the stator core 60 is manufactured.

Next, the stator manufacturing apparatus 1 mounts the jig 70 to which the stator core 60 is fixed on the transport mount 112 by lowering the four rods 121 of the lift mechanism 120 pushing up the jig 70 to which the stator core 60 is fixed. In addition, the stator manufacturing apparatus 1 transports the transport mount 112 on which the jig 70 to which the stator core 60 is fixed is mounted from the center to the front-left-side end portion of the stator manufacturing apparatus 1. Finally, when the transport mount 112 on which the jig 70 to which the stator core 60 is fixed is mounted reaches the front-left-side end portion of the stator manufacturing apparatus 1, the operator extracts the jig 70 from the stator manufacturing apparatus 1.

In addition, after the stator manufacturing apparatus 1 transports the transport mount 112 on which the jig 70 to which the stator core 60 is fixed is mounted to the front-left-side end portion of the stator manufacturing apparatus 1, the stator manufacturing apparatus 1 drives the piston of a cylinder mechanism to slide the guiding portion 345 in the inner diameter direction so that the guiding portion 345 is advanced at the inner diameter side to the position where the arch-shaped guides 348 are not yet in contact with the outer circumference of the stator core 60 to allow the lower end portions of the pair of the first spreader plates 346 and the second spreader plate 347 to stand by insertably into the slots 61 of the next stator core 60.

According to the stator manufacturing apparatus 1 according to the embodiment, the following effects can be obtained.

(1) In the coil element alignment process S3, the assembly body 50 is formed by assembling the coil elements in a ring shape in the state where the turn portions 42 of the plurality of coil elements 40 alternately overlap each other, in the supporting process S42, the assembly body 50 is supported by using the turn portions 42, and in the insertion process S45, the assembly body 50 and the stator core 60 are allowed to be close to each other, and then, the leg portions 41 of the coil elements 40 of the assembly body 50 are inserted into the slots 61.

According to this, in the supporting process S42, the assembly body 50 can be supported by using the turn portions 42, and after that, in the insertion process S45, the assembly body 50 and the stator core 60 can be allowed to be close to each other so that the leg portions 41 of the coil elements 40 of the assembly body 50 can be inserted into the slots 61. In this manner, in the supporting process S42, the assembly body 50 can be supported by using the turn portions 42 so that the leg portions 41 of the coil elements 40 of the assembly body 50 are in the free state.

Accordingly, it is possible to efficiently and reliably insert the plurality of coil elements 40 aligned in a ring shape into the respective slots 61 of the stator core 60 by lowering the coil elements.

(2) In the supporting process S42, while the pushing-down members 311 are in contact with the turn portions 42, the pins 322 are inserted so that the turn portions 42 are supported from the lower portions. According to this, in the supporting process S42, the assembly body 50 can be supported by supporting the turn portions 42 from the lower portions so that the leg portions 41 of the coil elements 40 of the assembly body 50 are in the free state.

(3) In the supporting process S42, in the state where the turn portions 42 are in contact with the pushing-down members 311, the pins 322 are inserted so that the pins 322 the distances of which relative to the pushing-down members 311 are adjusted can be optimally inserted into the turn portions 42, and the shape of the assembly body 50 can be maintained at the time of insertion of the pins 322.

(4) In the insertion process S45, the insertion is performed while the outer circumferential sides of the turn portions 42 are supported so that the shape of the assembly body 50 can be maintained even when resistance occurs at the time of insertion.

In addition, the present invention is not limited to the above-described embodiment, but modifications and changes are included in the present invention in the scope where the object of the present invention can be achieved.

For example, in the above-described embodiment, although substantially U-shaped coil elements for a rotary electric machine are used as electrical conductors, the present invention is not particularly limited to the electrical conductors.

What is claimed is:
1. An insertion method of inserting substantially U-shaped electrical conductors, each of which is constructed with a turn portion installed at a substantially apex portion and linearly shaped leg portions installed at two ends of the turn portion, into slots aligned in a ring shape in a core, the insertion method comprising:
   a gripping process of gripping the leg portions of the U-shaped electrical conductors utilizing a gripping mechanism;

an assembling process of forming an assembly body by assembling the plurality of electrical conductors in a ring shape in a state where the turn portions alternately overlap each other;

a supporting process of supporting the assembly body by supporting the turn portions from lower portions thereof utilizing a supporting mechanism;

a releasing process of releasing the leg portions of the U-shaped electrical conductors by retracting the gripping mechanism; and an insertion process of allowing the assembly body and the core to be close to each other and inserting the leg portions of the electrical conductors of the assembly body into the slots while maintaining the support of the supporting mechanism so that the turn portions are supported from lower portions thereof.

2. The insertion method according to claim 1, wherein in the supporting process, while pressing members are in contact with the turn portions, pins are inserted so that the turn portions are supported.

3. The insertion method according to claim 2, wherein in the supporting process, in a state where the pressing members are in contact with the turn portions, the pins are inserted.

4. The insertion method according to claim 1, wherein in the insertion process, insertion is performed while outer circumferential portions of the turn portions are supported.

* * * * *